US008340381B2

(12) United States Patent
Franaszek et al.

(10) Patent No.: US 8,340,381 B2
(45) Date of Patent: Dec. 25, 2012

(54) HYBRID SEGMENTATION OF ANATOMICAL STRUCTURE

(75) Inventors: Marek Franaszek, Gaithersburg, MD (US); Ronald M. Summers, Potomac, MD (US)

(73) Assignee: The United States of America as represented by the Secretary, Department of Health and Human Services, Washington, DC (US)

( * ) Notice: Subject to any disclaimer, the term of this patent is extended or adjusted under 35 U.S.C. 154(b) by 0 days.

(21) Appl. No.: 13/113,849

(22) Filed: May 23, 2011

(65) Prior Publication Data
US 2011/0222749 A1    Sep. 15, 2011

Related U.S. Application Data

(63) Continuation of application No. 11/482,682, filed on Jul. 6, 2006, now Pat. No. 8,023,703.

(51) Int. Cl.
G06K 9/00 (2006.01)
(52) U.S. Cl. .................. 382/128; 382/173; 382/190
(58) Field of Classification Search .............. 382/128, 382/173, 190
See application file for complete search history.

(56) References Cited

U.S. PATENT DOCUMENTS

| | | | |
|---|---|---|---|
| 6,018,499 A | 1/2000 | Sethian et al. | |
| 6,246,784 B1 | 6/2001 | Summers et al. | |
| 6,345,112 B1 | 2/2002 | Summers et al. | |
| 6,556,696 B1 | 4/2003 | Summers et al. | |
| 6,785,409 B1 | 8/2004 | Suri | |
| 7,440,601 B1 | 10/2008 | Summers et al. | |
| 8,023,703 B2 | 9/2011 | Franaszek et al. | |
| 2001/0031920 A1 | 10/2001 | Kaufman et al. | |
| 2002/0039400 A1 | 4/2002 | Kaufman et al. | |
| 2002/0045153 A1 | 4/2002 | Kaufman et al. | |
| 2002/0048401 A1 | 4/2002 | Boykov et al. | |
| 2002/0097320 A1 | 7/2002 | Zalis | |
| 2003/0208116 A1 | 11/2003 | Liang et al. | |
| 2004/0049474 A1 | 3/2004 | Shankar et al. | |

(Continued)

FOREIGN PATENT DOCUMENTS
WO    WO03058553    12/2002

OTHER PUBLICATIONS

Bitter et al., "Penalized-Distance volumetric skeleton algorithm," *IEEE Trans. Vis. Comput. Grapchics*, vol. 7, No. 3, (Jul.-Sep. 2001), pp. 195-206.

(Continued)

*Primary Examiner* — Chan S Park
*Assistant Examiner* — Mark Roz
(74) *Attorney, Agent, or Firm* — Klarquist Sparkman, LLP

(57) ABSTRACT

An image of an anatomical structure can be analyzed to determine an enclosing three-dimensional boundary when the anatomical structure is filled with two substances, such as air and a fluid. Various techniques can be used to determine the enclosing boundary including: analyzing the virtual structure to segment the structure into air and fluid pockets, determining if there are multiple fluid pockets whose surface touches a single air-fluid boundary, determining a separate threshold for respective fluid pockets, resegmenting the virtual anatomical structure using the separate threshold for different fluid pockets, forming a hierarchical pocket tree which represents the relationship between the fluid and air pockets, pruning the pocket tree based on various criteria which corresponds to deleting those pruned portions from the virtual anatomical structure, and resegmenting the remaining virtual anatomical structure using one or more of fuzzy connectedness, two-dimensional gap filling, and level set segmentation.

25 Claims, 37 Drawing Sheets
(7 of 37 Drawing Sheet(s) Filed in Color)

U.S. PATENT DOCUMENTS

| | | |
|---|---|---|
| 2004/0064029 A1 | 4/2004 | Summers et al. |
| 2004/0109603 A1 | 6/2004 | Bitter et al. |
| 2004/0125103 A1 | 7/2004 | Kaufman et al. |
| 2005/0027188 A1 | 2/2005 | Metaxas et al. |
| 2005/0078858 A1 | 4/2005 | Yao et al. |
| 2005/0107691 A1 | 5/2005 | Zalis |
| 2005/0185838 A1 | 8/2005 | Bogoni et al. |
| 2006/0008143 A1 | 1/2006 | Truyen et al. |
| 2006/0062450 A1 | 3/2006 | Yoakum-Stover et al. |
| 2007/0003131 A1 | 1/2007 | Kaufman |

OTHER PUBLICATIONS

Franaczek et al., "Hybrid Segmentation of Colon Filled with Air and Opacified Fluid for CT Colonography," Radiological Society of North America, *Scientific Assembly and Annual Meeting Program*, $91^{st}$ Scientific Assembly and Annual Meeting, McCormick Place, Chicago, (Nov. 27-Dec. 2, 2005), possibly published as early as Oct. 2005, 3 pages.

Franaczek et al., "Hybrid Segmentation of Colon Filled with Air and Opacified Fluid for CT Colonography," *IEEE Transactions of Medical Imaging*, vol. 25, No. 3, (Mar. 2006), pp. 358-368.

Iannoccone et al., "Computed tomographic colonography without cathartic preparation for the detection of colorectal polyps," *Gastroenterology*, vol. 127, . (2004) pp. 1300-1311.

Ibanez et al., "The ITK Software Guide," Clifton Park, NY: Kitware, Inc. (2003) 1 page.

Iordanescu et al., "Automated centerline for computed tomography colonography," *Academic Radiol.*, vol. 10, (2003), pp. 1291-1301.

Iordanescu et al., "Automated seed placement for colon segmentation in computed tomography colonography," *Academic Radiol.*, vol. 12, (2005) pp. 182-190.

Jeon et al., Unsupervised hierarchical image segmentation with level set and additive operator splitting, *Elseiver*, available online Dec. 18, 2004, 9 pages.

Kasvand, "Iterative Edge Detection," *Academic Press*, (1975), 8 pages.

Lakare et al., "3D digital cleansing using segmentation rays," in *Proc. IEEE Visualization*, (2000), pp. 37-44, 538.

Lecture Notification: "Topics in CT Colonography Computer-Aided Detection and Image Processing," May 24, 2005, 5 pages.

Lemarechal et al., "Comments on Geodesic saliency of watershed contours and hierarchical segmentation," *IEEE*, (1998) 2 pages.

Liang et al., "On segmentation of colon lumen for virtual colonoscopy," *Proc. SPIE (Medical Imaging)*, (1999), 9 pages.

Libutti et al., "Cancer of the colon," in *Cancer, Principles and Practice of Oncology*, S.H.VT. De-Vita and S. A. Rosenburg, Eds. Philadelphia, PA: Lippincott, Williams and Wilkins, (2005) Ch. 29.8, pp. 1061-1109.

Lorenson et al., "Marching cubes: A high resolution 3D surface construction algorithm," *Comput. Graphics*, vol. 21, No. 4 (1987), pp. 163-169.

Nappi et al., "Feature-guided analysis for reduction of false positives in CAD of polyps for computed tomographic colonography," *Med. Phys.*, vol. 30, (2003), pp. 1592-1601.

Oto, "CT attenuation of colorectal polypoid lesions," *RSNA*, (2001) 7 pages.

Pham et al., "A survey of current methods in medical image segmentation," *Annual Review of Biomedical Engineering*, (1998) 27 pages.

Pickhardt et al, "Computer tomographic virtual colonoscopy to screen for eolorectal neoplasia in asymptomatic adults," *New Engl. J Med.*, vol. 349, (2003), pp. 2191-2200.

Pickhardt et al, "Electronic cleansing and stool tagging in CT colonograpny: Advantages and pitfalls with primary three-dimensional evaluation," *AJR*, vol. 181, (2003) pp. 799-805, found at www.ajronline.org/cgi/content/full/181/3/799.

Pineau et al., "Virtual colonoscopy using oral contrast compared with colonoscopy for the detection of patients with colorectal polyps," *Gastroenterology*, vol. 125 (2003), pp. 304-310.

Rosenfiled, "Fuzzy Geometry: An Overview," *IEEE*, (1992) 5 pages.

Sahoo et al., "A survey of thresholding techniques," *Comput. Vis. Graphics Image Process*, vol. 41 (1988), pp. 233-260.

Sato et al., "An automatic colon segmentation for 3D virtual colonoscopy," *IEICE Trans. Info &Syst.*, vol. E84-D, (2001), pp. 201-208.

Serlie et al., "A probabilistic method for virtual colonoscopy cleansing," in *Proc. SPIE*, vol. 5031 (2003), pp. 405-412.

Serlie et al., "Computed cleansing for virtual colonoscopy using a three-material transition model," in *Lecture Notes in Computer Science*, Berlin, Germany: Springer-Verlag, vol. 2879 (2003), pp. 175-183.

Sethian, "Level Set Methods and Fast Marching Methods: Evolving Interfaces in Computational Geometry, Fluid Mechanics, Computer Vision, and Materials Science," Cambridge Univ. Press, 1999, 205 pages.

Shapiro, "Computer Vision," *Prentice Hall*, (2001) 3 pages.

Shapiro, "Data Structures for Picture Processing," *SIGGRAPH*, (1978) 7 pages.

Summers et al, "Computer-aided detection of polyps on oral contrast-enhanced CT colonography," *AJR*, Vo. 184 (2005), pp. 105-108.

Summers et al., "Assessment of bowel opacification on oral contrast-enhanced CT colongraphy—multi-institutional trial," in *Abdominal Radiology Course Syllabus*, Society of Gastrointestinal Radiologists and Society of Uroradiology (2004), pp. 34-35.

Udupa et al., "A new automatic mode of visualizing the colon via cine CT," *Visualization, Display, and Image-Guided Procedures, Proceedings of SPIE*, (2001), 4319:237-243.

Udupa et al., "Fuzzy connectedness and object definition: theory, algorithms, and applications in image segmentation," *Graphical Models Image Process*, vol. 58, (1996), pp. 246-261.

Udupa, "Fuzzy connectedness and object definition," *SPIE*, (1995), 10 pages.

Wirjadi, "A survey of 3d image segmentation methods," *Fraunhofer Institute*, (2007), 29 pages.

Wyatt et al., "Automatic segmentation of the colon for virtual colonoscopy," *Computized Medical Imaging Graphics*, (2000), 24(1):1-9.

Wyatt et al., "Automatic segmentation of the colon," *SPIE Conference on Physiology and Function from Multidimensional Images*, SPIE vol. 3660, San Diego, CA, (Feb. 1999), pp. 139-148.

Yoo, "Insight into images principles and practice for segmentation, registration, and image analysis," Wellesley MA: A.K. Peters, 2004, 223 pages.

Zalis et al, "Digital substraction bowel cleansing for CT colonography using morphological and linear filtration methods," *IEEE Trans. Med. Imag.*, vol. 23, No. 11, (Nov. 2004), pp. 1335-1343.

Zalis et al., "CT colonography: Digital subtraction bowel cleansing with mucosal reconstruction—initial observations," *Radiology*, vol. 226 (2003) pp. 911-917.

Zalis et al., "Digital subtraction bowel cleansing in CT colonography," *AJR*, vol. 176, (2001), pp. 646-648.

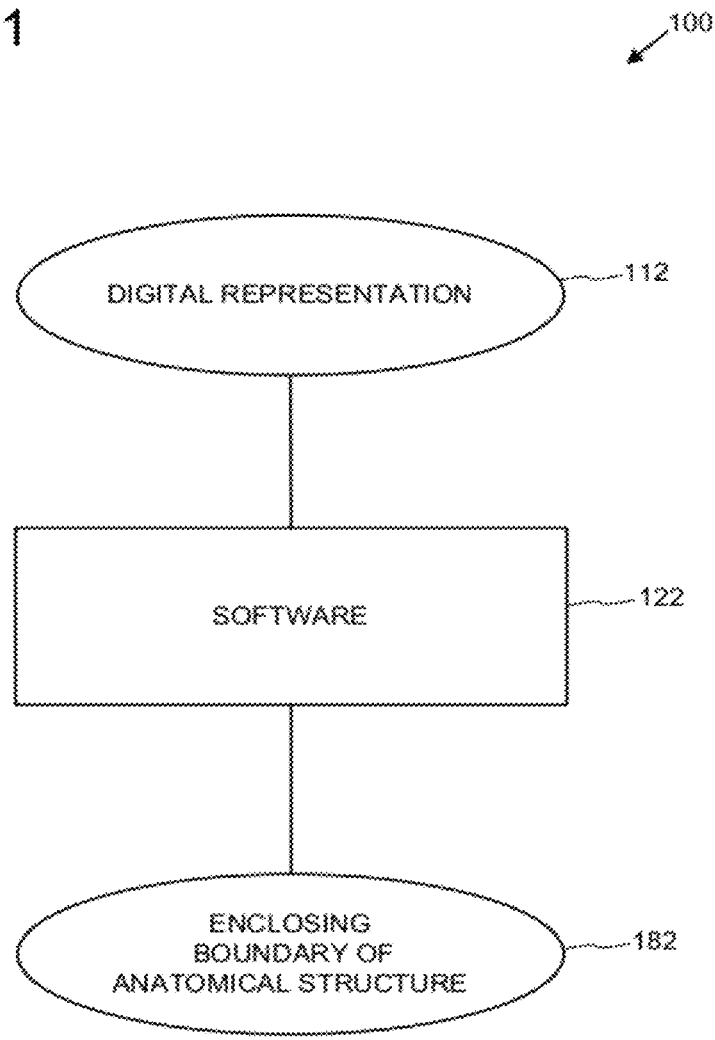

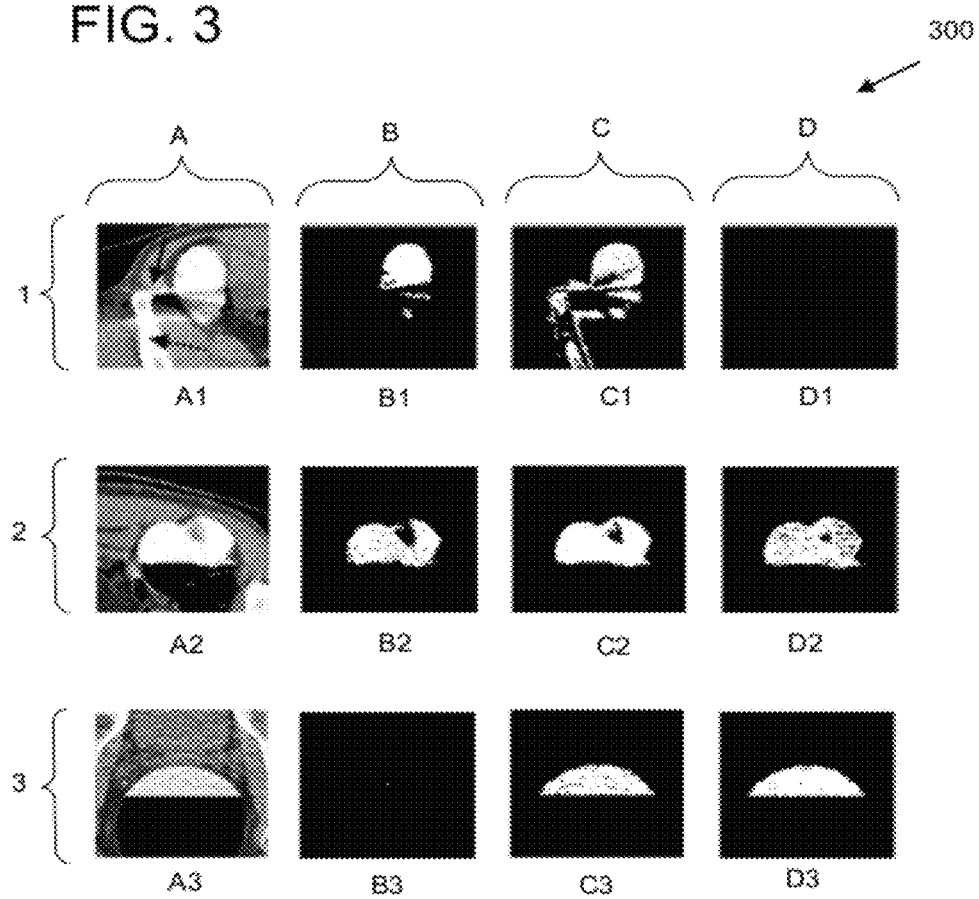

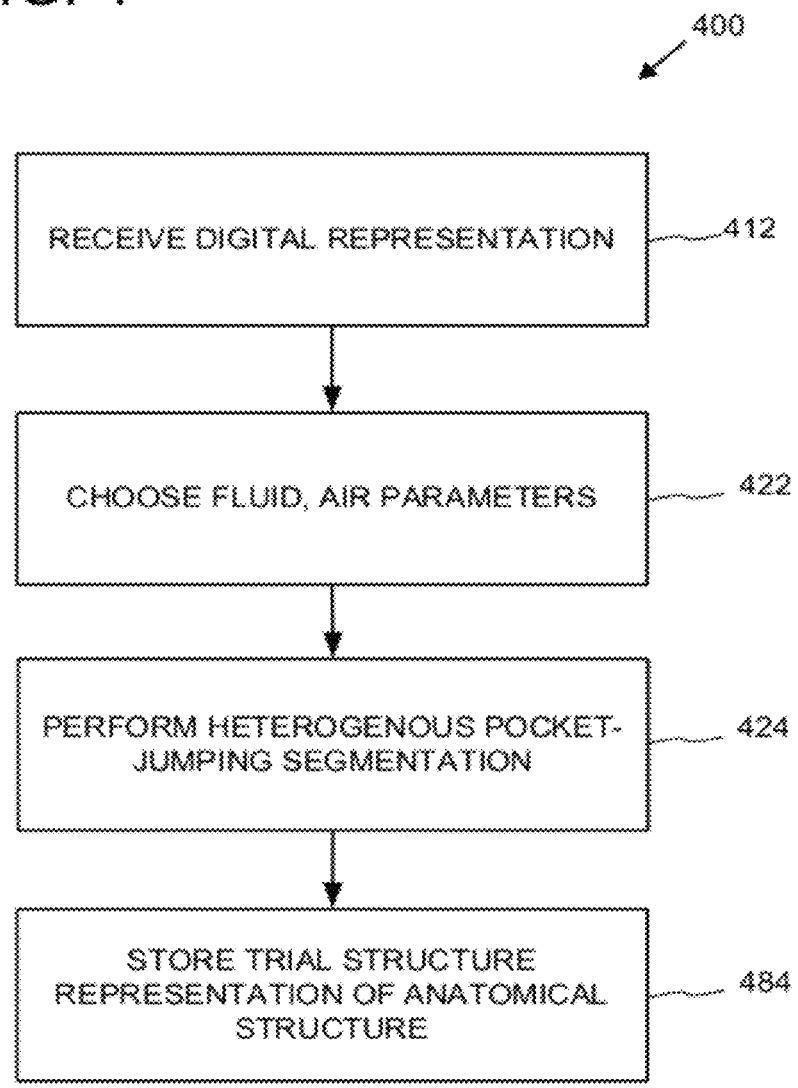

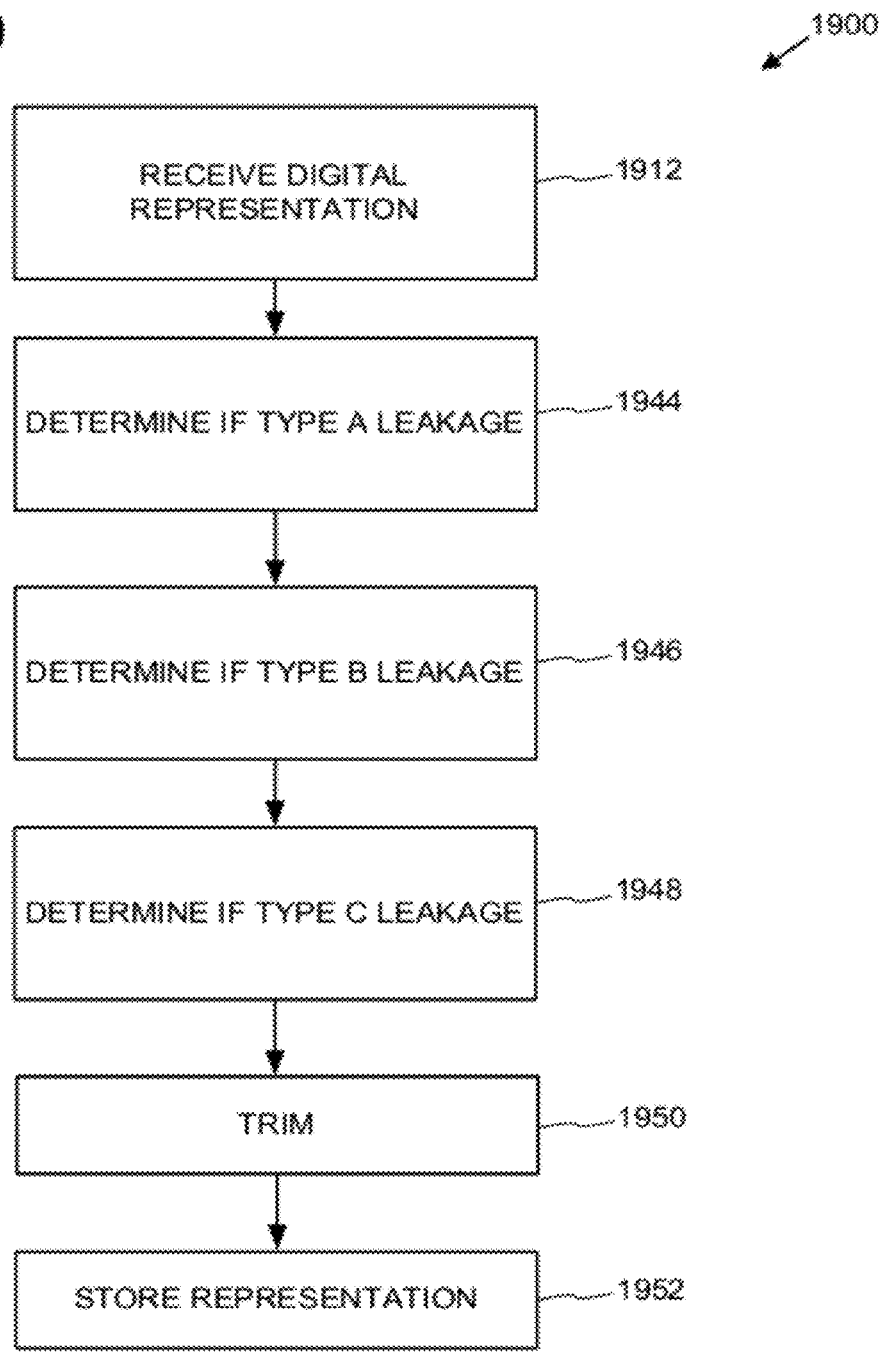

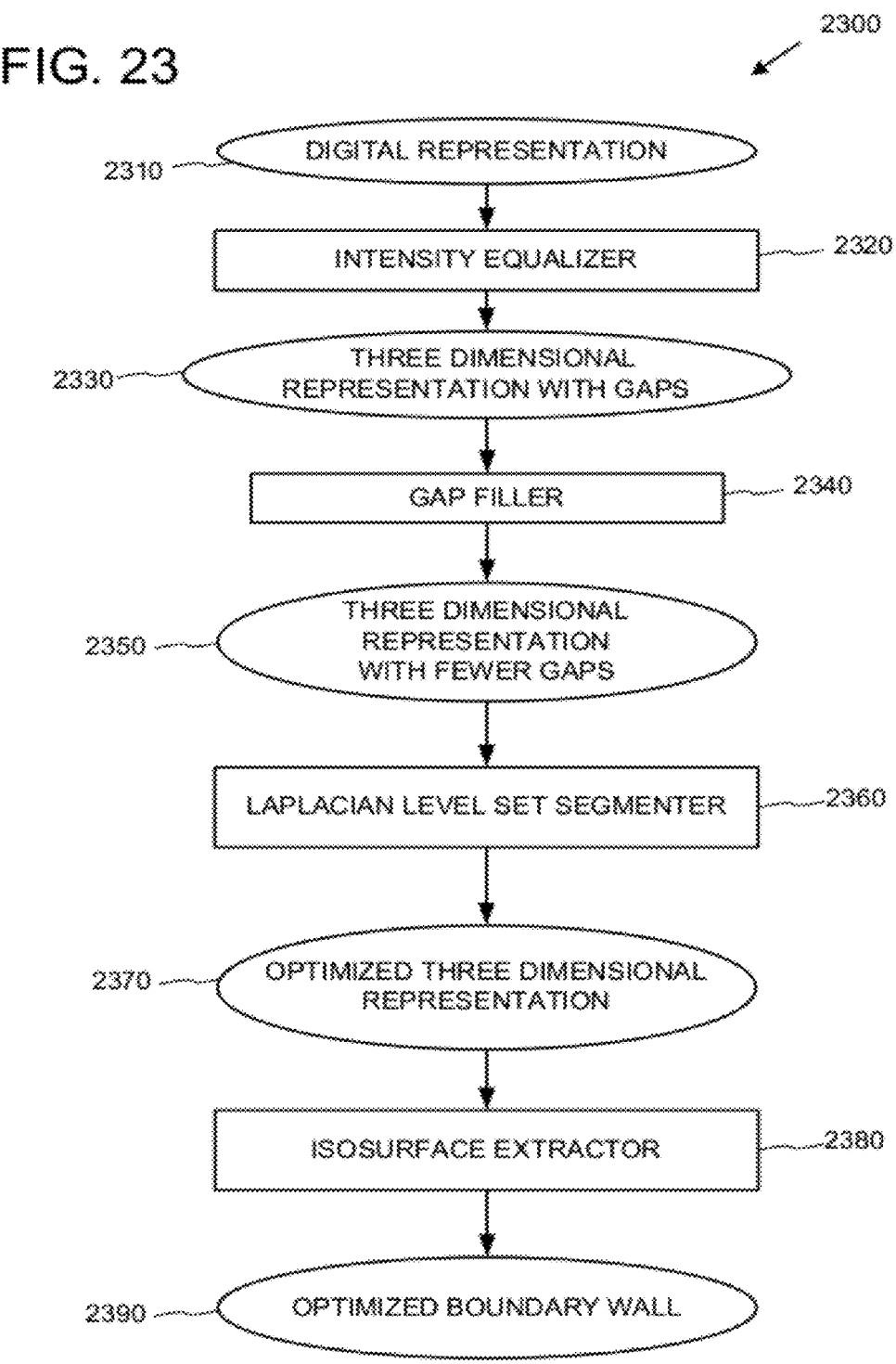

FIG. 29A
FIG. 29B
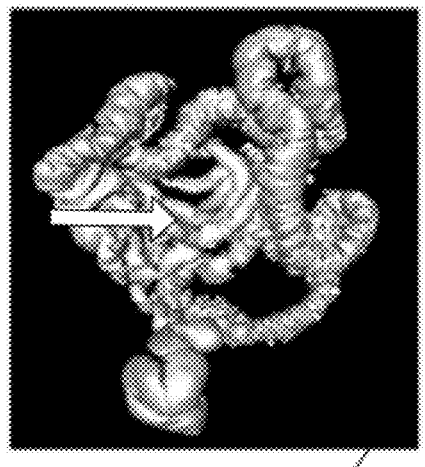
2910
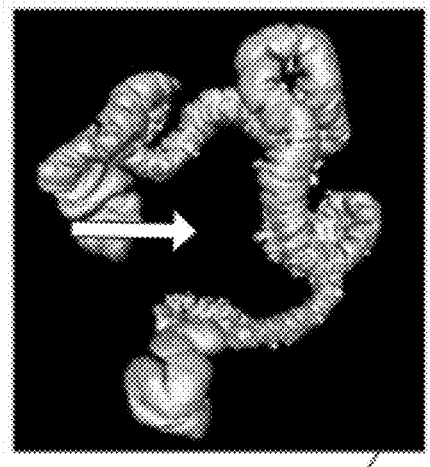
2950

HYBRID SEGMENTATION OF ANATOMICAL STRUCTURE

CROSS REFERENCE TO RELATED APPLICATION

This application is a continuation of U.S. patent application Ser. No. 11/482,682, filed on Jul. 6, 2006, which is incorporated herein by reference.

TECHNICAL FIELD

The field relates to software analysis of images.

BACKGROUND

Technology for non-invasive observation of soft tissues of the body has provided significant advances in the field of medicine. For example, a number of techniques now make it possible to routinely image anatomical structures such as the heart, blood vessels, colon, bronchus, and esophagus within the body.

The widespread availability of skilled technicians and reduction in cost of the necessary equipment has encouraged the use of non-invasive imaging as a part of routine preventive care. Non-invasive imaging reduces the risk of observation-related injury or complication and reduces discomfort and inconvenience for the observed patient. These advantages encourage patients to undergo more frequent screening and permits earlier detection of potentially life-threatening conditions. For example, malignant or premalignant conditions can be identified and diagnosed at an early stage, when treatment is more likely to be successful.

Although progress has been made in employing software to assist in detection of anatomical features, there are significant limitations to the current automated techniques. For example, one problem plaguing such systems is created when an anatomical structure, such as a colon, contains two different sorts of material, such as air and fluid. Common methods of visualizing such structures often have difficulty correctly locating the surface inner wall, especially near the air-fluid boundary; if a wall boundary is missed, leakage can occur. That is, nearby structures can be incorrectly segmented as portions of the structure of interest. As an example, a portion of the small bowel lying right next to the colon can be segmented as a portion of the colon.

This leakage leads to the creation of false positive artifacts, as when a portion of a nearby structure is incorrectly assumed to be a flaw in the structure of interest. False negatives can also be generated when entire portions of the structure of interest are left out, as can happen, for example, if a segmentation threshold is set to an incorrect value. Even when the correct structure is created, the quality can still be too low to adequately diagnose existing problems.

False positives are troublesome because any identified positives must be considered and evaluated by a human classifier (such as the physician or a technician). Even if a feature can be quickly dismissed as a false positive, too many false positives consume an inordinate amount of time and limit the usefulness of the software-based approach. False negatives, which can be generated by, for example, leaving out portions of a desired structure, or generating a digital representation of too low a quality to adequately diagnose a disease condition, are even more troubling, as they could result in disease being missed entirely.

There thus remains a need for a way to improve the computer-based approaches for correctly segmenting anatomical structures.

SUMMARY

Digital representations of portions of an anatomical structure can be processed to determine an enclosing boundary of a virtual anatomical structure corresponding to a real-world anatomical structure comprising fluid and air pockets. For example the inner wall of a colon can be determined by software.

Processing can be performed by first performing a trial segmentation whose thresholds are deliberately chosen so that the resultant image can have leakage, but also so that the entire image is initially segmented. Thresholds tailored for different fluid pockets can be determined. Then, a subsequent segmentation can be performed using tailored thresholds to generate a more accurate segmentation.

A hierarchical pocket tree for the virtual anatomical structure can be created which shows the relationships between pockets. Then the pocket tree can be trimmed by checking for leakage within a pocket; pockets hierarchically below a pocket with detected leakage can be deleted from the virtual anatomical structure to eliminate further leaked pockets. The leakage can be checked by resegmenting the pocket using the tailored threshold, and then comparing the volume of the initial trial segmentation pocket with the volume of the resegmented pocket.

Various other techniques can be deployed when determining the boundary. For example, fuzzy segmentation can be performed to determine the boundary; two-dimensional region growing can be utilized to fill any gaps in the determined boundary, and level set segmentation can also be used to generate an optimized anatomical structure boundary.

Additional features and advantages of the technologies described herein will be made apparent from the following detailed description of illustrated embodiments, which proceeds with reference to the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 is a block diagram of an exemplary system for processing a digital representation of at least a portion of an anatomical structure with software to determine an enclosing boundary of at least a portion of the anatomical structure represented in the digital representation.

FIG. 3 is a series of screen shots of views of a portion of a virtual colon, including screen shots showing the difference in final representation depending on initial threshold values.

FIG. 4 is a flowchart showing an exemplary method for performing trial segmentation.

FIG. 12 is a screen shot showing an exemplary threshold voxel location.

FIG. 18A-D are screen shots showing a CT image of a colon, representative pocket tree, and results after pruning a pocket tree.

FIG. 19 is a flowchart showing an exemplary system for trimming a pocket tree.

FIG. 23 is a block diagram of an exemplary system for determining an enclosing boundary in a digital representation of at least a portion of a virtual anatomical structure, via using a series of segmentation methods.

FIGS. 24A-D are screen shots showing examples of leakage removal using described embodiments.

FIGS. 27A-F are screen shots showing a CT image of a colon and differences in the virtual colon representation between a first and a last segmentation using embodiments disclosed herein.

FIGS. 28A-F are screen shots showing a CT image of a colon and differences in the virtual colon representation between a first and a last segmentation using embodiments disclosed herein.

FIGS. 29A-B are screen shots of a colon showing leakage after a first segmentation and showing considerably less leakage after a final segmentation.

DETAILED DESCRIPTION

Overview of Technologies

Figure 2A:
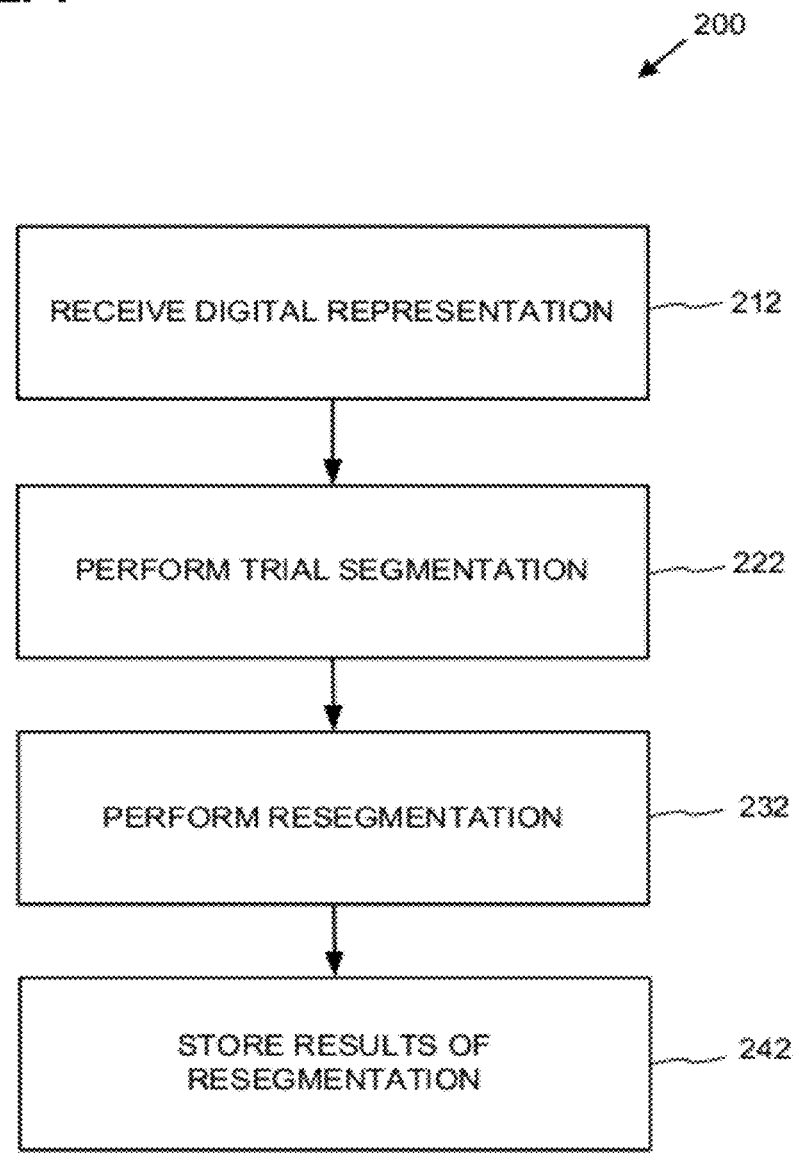
FIG. 2A is a flowchart showing an exemplary method for processing a digital representation of at least a portion of an anatomical structure with software to determine an enclosing boundary of at least a portion of the anatomical structure represented in the digital representation.

The technologies described herein can be used in any of a variety of scenarios in which accurate reconstruction of the boundary of an anatomical structure is useful. For example, when performing computer-aided detection of polyps in a CT scan of the colon, properly segmenting a colon can be used to reduce the number of false positives to be reviewed when reviewing the CT scan data (for example, in a graphical depiction of the CT scan data) especially when anomalies of interest, such as polyps, exist at an air-fluid boundary within the colon.

A digital representation includes any digital representation of an anatomical structure (or portion thereof) stored for processing in a digital computer. For example, representations can include two- or three-dimensional representations (e.g., one or more images) of portions of an anatomical structure stored via a variety of data structures. Representations can be composed of pixels, voxels, or other elements. A digital representation of an anatomical structure is sometimes called "virtual" (e.g., a "virtual colon") because it is a digital representation that can be analyzed to learn about the represented anatomical structure.

A component of a digital representation includes any two- or three-dimensional element that composes a part of a representation of a portion of an anatomical structure stored as an image. For example, pixels and voxels can be components.

Segmenting includes the process of dividing a digital representation of an anatomical structure into constituent parts into which a body, entity, or quantity is divided or marked off by or as if by natural boundaries. Common types of segmentation include freehand segmentation, region-based (or region-growing) segmentation, fuzzy connectedness segmentation, K-means clustering segmentation, level set segmentation, active contours segmentation, expectation-maximization segmentation, and so on.

Segmentation leakage or leakage includes any portion of a segmented image which is not properly a part of the desired anatomical structure, but which is included as a portion of the digital representation of the anatomical structure. Segmentation is generally performed by defining the difference between the inside of an anatomical structure, and a boundary, such as a wall around the anatomical structure. When this natural boundary is thin, or where the boundary is obscured, the boundary may be missed by the segmenter, and areas outside the anatomical structure may be incorrectly included as a portion of the anatomical structure. For example, a portion of a small bowel could be incorrectly segmented as a portion of a colon. If so, the incorrectly segmented small bowel would be segmentation leakage.

Imaging includes any techniques for obtaining an image of the inside of a body by transmitting electromagnetic or sonic waves through the body. Imaging includes radiographic images (with X-rays, for example computer tomography or "CT"), sonic energy (such as ultrasound) and magnetic fields (such as magnetic resource imaging, or "MRI"). Although representations of an anatomical structure using such technology are sometimes called an "image," in practice, the representation can be a series of image slices.

Exemplary anatomical structures in any of the examples herein include such structures as the colon, heart, bronchi, blood vessels, biliary tract, urinary tract, and esophagus.

EXAMPLE 1

Exemplary System for Determining Boundary of an Anatomical Structure

FIG. 1 shows an exemplary system 100 for determining an enclosing boundary 182. The digital representation 112 is processed by the software 122 to determine the enclosing boundary 182 of a virtual anatomical structure constructed to correspond to an anatomical structure represented in the digital representation 112. The software 122 can employ any combination of the technologies described herein. The digital representation 112 can be derived from any technology that takes an image of an anatomical structure and turns it into a digital representation. So, for example any of the imaging technologies described herein can be used to generate the digital representations 112.

In any of the examples described herein, an enclosing 3-D boundary 182 of a virtual anatomical structure corresponding to a real-world anatomical structure possessing (e.g., having at least portions filled with) two different types of substances can be determined. For example, the three-dimensional structure of a colon or other bowel which comprises both air and fluid can be determined (e.g., identified).

Further, the boundary 182 can be depicted via user interfaces.

EXAMPLE 2

Exemplary Enclosing Boundary of an Anatomical Structure

In any of the examples herein, the enclosing boundary of a virtual anatomical structure can correspond to a real world anatomical structure in a patient. In some cases, the enclosing boundary may not exactly represent the corresponding real world anatomical structure and typically is not entirely enclosing. So, for example, a representation of a colon will typically not be entirely enclosing because there are openings at either end.

In any of the examples herein, results of resegmentation (e.g., an enclosing boundary) can be analyzed to detect anomalies of interest which correspond to anomalies of interest in the represented real world anatomical structure. In practice, the enclosing boundary can be a three-dimensional enclosing boundary in that it can occupy three-dimensional space.

EXAMPLE 3

Exemplary User Interfaces

In any of the examples herein, graphical depiction of an anatomical structure via its enclosing three-dimensional boundary 182 can be displayed to a human classifier, who decides what action, if any, to take. Such interfaces can allow manipulation of the graphical depiction, such as rotation, zooming, and the like.

The interface can highlight (e.g., zoom in on or depict in a special color) areas detected as an anomaly of interest.

EXAMPLE 4

Exemplary Anomalies of Interest

Exemplary anomalies of interest include noncancerous growths, precancerous growths, and cancerous growths. Such anomalies include polyps, which are growths associated with mucus membranes. Polyps of interest include colonic, small intestine, nasal, and uterine polyps. Other exemplary anomalies of interest includes instances of hyperplasia: an abnormal growth of the lining of an organ.

It is important that polyps and other anomalies be detected because they are often premalignant and if detected can be prophylactically removed to avoid development of diseases such as gastrointestinal adenocarcinoma. Thus, early detection enables early treatment (such as removal of the polyp) of possibly life-threatening conditions.

In any of the examples herein, any of the generated images can be analyzed to detect anomalies of interest which correspond to anomalies of interest in the represented real world anatomical structure. Various software filtering mechanisms can be used on an initial list of detected anomalies of interest (e.g., polyp candidates) to provide a resulting list of anomalies of interest (e.g., confirmed candidates).

EXAMPLE 5

Exemplary Method for Determining a Boundary in a Digital Representation of an Anatomical Structure FIG. 2A shows an exemplary method 200 for determining an enclosing boundary of an anatomical structure represented in a digital representation. The method can be performed, for example, by the system 100 of FIG. 1. The method 200 and any of the other methods described herein can be performed by computer-executable instructions stored on one or more computer-readable media.

At 212, a digital representation (e.g., the digital representation 112 of FIG. 1) representing at least a portion of an anatomical structure is received. In an exemplary embodiment, the anatomical structure comprises, at least, fluid and air pockets. In any of the examples herein, the word "fluid" is meant to also indicate substances which would colloquially be considered solids, such as fecal matter, that would be found within an anatomical structure but is not part of the structure. In an exemplary implementation, the anatomical structure comprises pockets filled with a first substance and pockets filled with a second substance.

Anatomical structures, such as the colon, comprise, at some level of abstraction, a series of connected air-fluid regions. It is vitally important that the anatomical structure has a correctly reconstructed wall at the air-fluid boundary, as often anomalies of interest (e.g., polyps) are found at the air-fluid boundary, partially submerged in fluid and partially surrounded by air. This is a particularly thorny problem, as often the intensity of the digital representation of the fluid layer at the air-fluid boundary is in the same range as the digital representation of the soft tissue of the anatomical structure.

In clinical practice, an oral contrast agent may be given to patients prior to imaging. This agent can be used to reveal otherwise hidden areas when imaging scans are visually inspected by, for example, radiologists. However, the contrast agent can create difficulties for segmentation programs. Even without a contrast agent, segmentation can preferably accurately construct the anatomical structure wall at the air-fluid boundary.

Anatomical structure segmentation, such as colon segmentation, is an important component of three-dimensional visualization programs that extract a 3-D reproduction of an anatomical structure of interest (e.g., boundaries) from imaging data. In clinical practice, such visualization programs are used either for imaging interpretation or as a secondary problem solver when a primary two-dimensional reading is used. Anatomical segmentation is also very useful for computer-aided detection (CAD).

Unlike air, which remains constant throughout an anatomical structure, fluid deposits in one portion of an anatomical structure may have different characteristics than fluid deposits in a different portion of the same anatomical structure. This makes determining a segmentation threshold difficult for the entire anatomical structure.

At 222, a trial segmentation is performed to produce a trial representation. As described in the examples, a variety of techniques can be used for the trial segmentation, such as fuzzy connectedness, K-means clustering, level set, active contours, expectation-maximization, and the like. Trial segmentation uses an initial threshold that is expected to segment almost all (e.g., 95%, 99%, 99.2%, 99.4%, or some other percentage) of an anatomical structure, but which might also be 'leaky': that is, it may segment areas that are not a portion of the desired anatomical structure. For this reason, the threshold and the related segmentation process is sometimes called "leak prone."

At 232, a resegmentation is performed, using the output of the trial segmentation. Because fluid pockets and air pockets segmented during the trial segmentation may or may not be included in the resegmented image, they are sometimes called "trial fluid pockets" and "trial air pockets" respectively. Resegmentation may include determining parameters tailored for different fluid pockets, (e.g., a per-pocket tailored threshold) for the trial segmented pockets (e.g., a subset thereof) or portions thereof. When the image is resegmented, the appropriate tailored threshold is used to segment the respective fluid pocket (or at least portions thereof).

At 242, the enclosing boundary of the structure determined by the resegmentation at 232 can be stored in one or more computer-readable media.

EXAMPLE 6

Figure 2B:
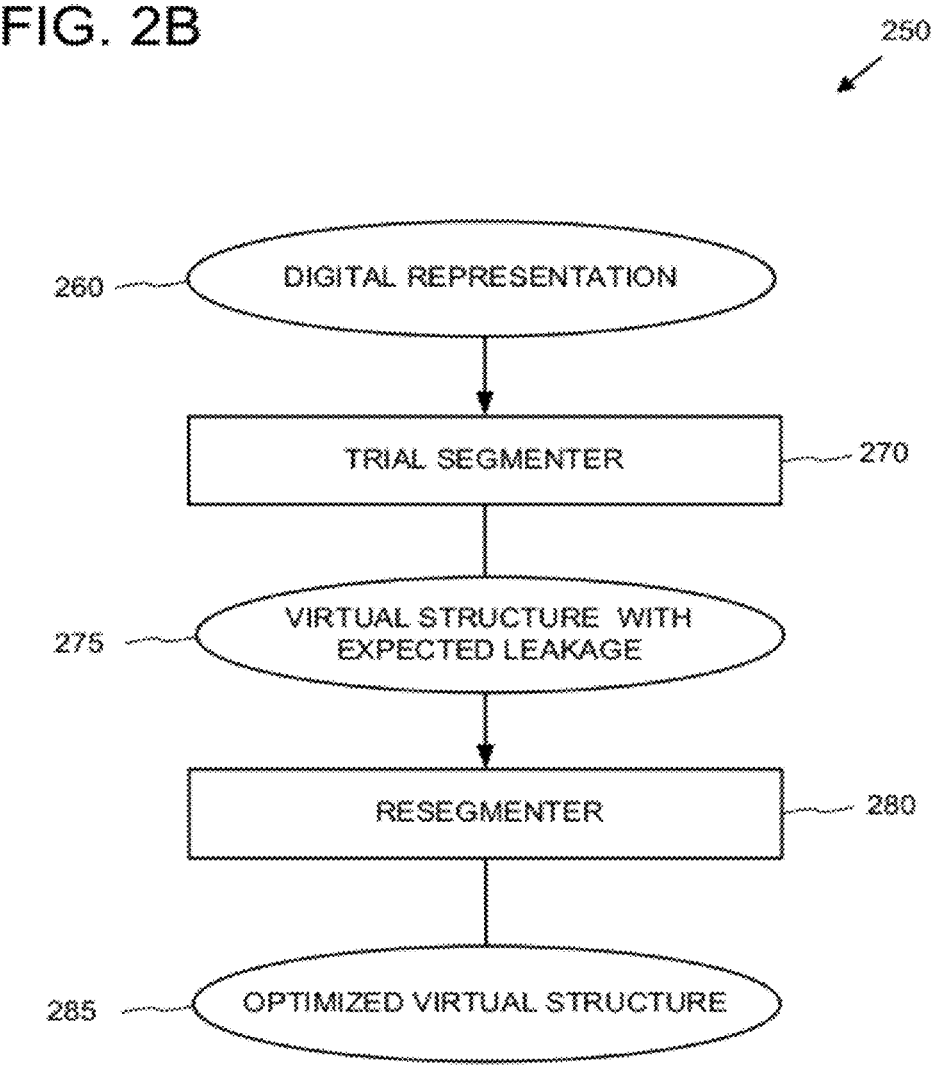
FIG. 2B is a block diagram showing an exemplary system for determining an enclosing boundary of at least a portion of the anatomical structure represented in the digital representation.

Exemplary System for Determining a Boundary in a Digital Representation of an Anatomical Structure FIG. 2B is a block diagram 250 showing an exemplary system for determining an enclosing boundary of at least a portion of the anatomical structure represented in the digital representation.

At 260 a digital representation is received (e.g., the digital representation 112 in FIG. 1). At 270 a trial segmenter creates a leak-prone first-pass segmentation using parameters that can segment essentially the entire anatomical structure while leaving minimal or no portions of the desired structure unsegmented. The parameters chosen can cause leakage; that is, areas may be segmented as part of the structure that belong to another structure altogether. This produces a virtual structure that can have expected leakage 275.

At 280, a resegmenter determines tailored parameters for respective fluid pockets, and then uses the tailored parameters to resegment the anatomical structure. This produces an optimized virtual anatomical structure 285.

EXAMPLE 7

Exemplary Screen Shots Showing the Difference in Final Representation Depending on Initial Threshold Values Screen shots of exemplary depictions of a virtual colon showing differences in outcome depending on initial threshold values are shown in FIG. 3.

Processes such as segmentation are very sensitive to the specific threshold that is used to perform the segmentation. As an example, FIG. 3 at 300 shows three different computed tomography (CT) images and three different binary maps generated by fuzzy connectedness segmentation for each image with the initial threshold set at different values. The same CT image (shown in column A) was used for each image in the same row. So, the CT image at A1 was used to generate each of the images B1, C1, and D1. Similarly, the CT image at A2 was used to generate B2, C2, and D2. Each CT image was initialized with the same seed as well, to decrease differences in the final image that could be based on specific seed location.

The image in each column B, C, and D were generated using the same set of three parameters—mean of CT attenuation, standard deviation of CT attenuation, and threshold—which were input to a fuzzy connectedness algorithm in ITK software (www.itk.org). For column B, the parameters used were 1320, 350, and 0.1. For column C, the parameters used were 1250, 350, and 0.2. For column D, the parameters used were 1214, 350, and 0.2. The means in these parameter list (e.g. 1320, 1250, 1214) can be converted to Hounsfield units by subtracting 1024.

As can be seen, the images show great variability. The segmentation for the images at B3 and at D1 failed, with only the seed being generated. C1 in FIG. 3 shows considerable leakage from a fluid pocket, more or less correctly shown at B1 in FIG. 3, to a nearby pelvis bone. The solid arrow in the image at A1 shows the site where the leakage to the bone (dashed arrow) starts due to streak artifacts.

EXAMPLE 8

Exemplary Method for Performing Trial Segmentation for a Digital Representation

FIG. 4 shows an exemplary method 400 for performing trial segmentation. The method 400 can be performed, for example, by the trial segmenter 270 of FIG. 2B. At 412, a digital representation is received, such as the digital representation 112 in FIG. 1. At 422, a fluid threshold, an air threshold, a seed, or some combination thereof, is determined. Segmentation can be started with either a manually-placed seed, or with an automatically-placed seed. The seed can be placed in either an air or a fluid region.

At 424, heterogeneous pocket-jumping segmentation is performed to segment the anatomical structure. The segmenter can jump between the air fluid boundaries following predefined pocket jumping rules, creating a trial segmented structure. This trial segmented structure is then stored at 484. The trial segmented structure is expected to have leaked segments, as discussed above, because one or more leak-prone thresholds are used.

EXAMPLE 9

Figure 5:
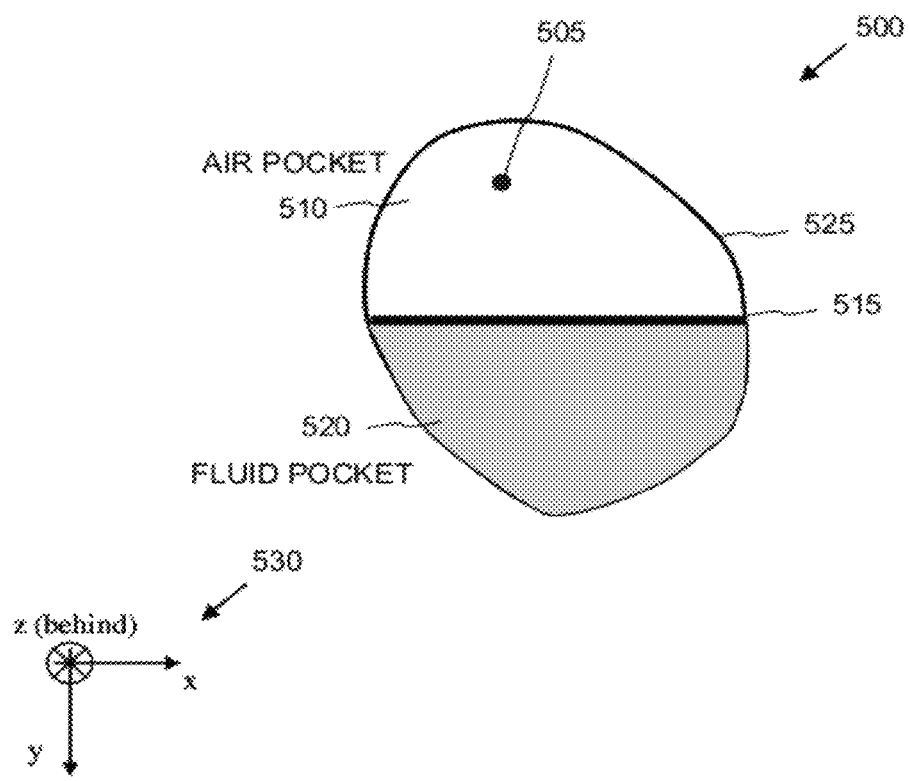
FIG. 5 is a representation of an air and fluid pocket, the boundary between them, and the coordinate system used in the representation.

Exemplary Method for Performing Trial Segmentation for a Digital Representation With reference to FIG. 5, the cross-section 500 of an exemplary virtual representation of an anatomical structure is shown, with an air pocket 510, and fluid pocket 520. The air pocket 510 is separated from the fluid pocket 520 by an air-fluid boundary 515. An exemplary seed 505, which can be used to grow a region within a pocket, is also shown. The coordinate system used for this cross-section is shown at 530.

EXAMPLE 10

Figure 6:
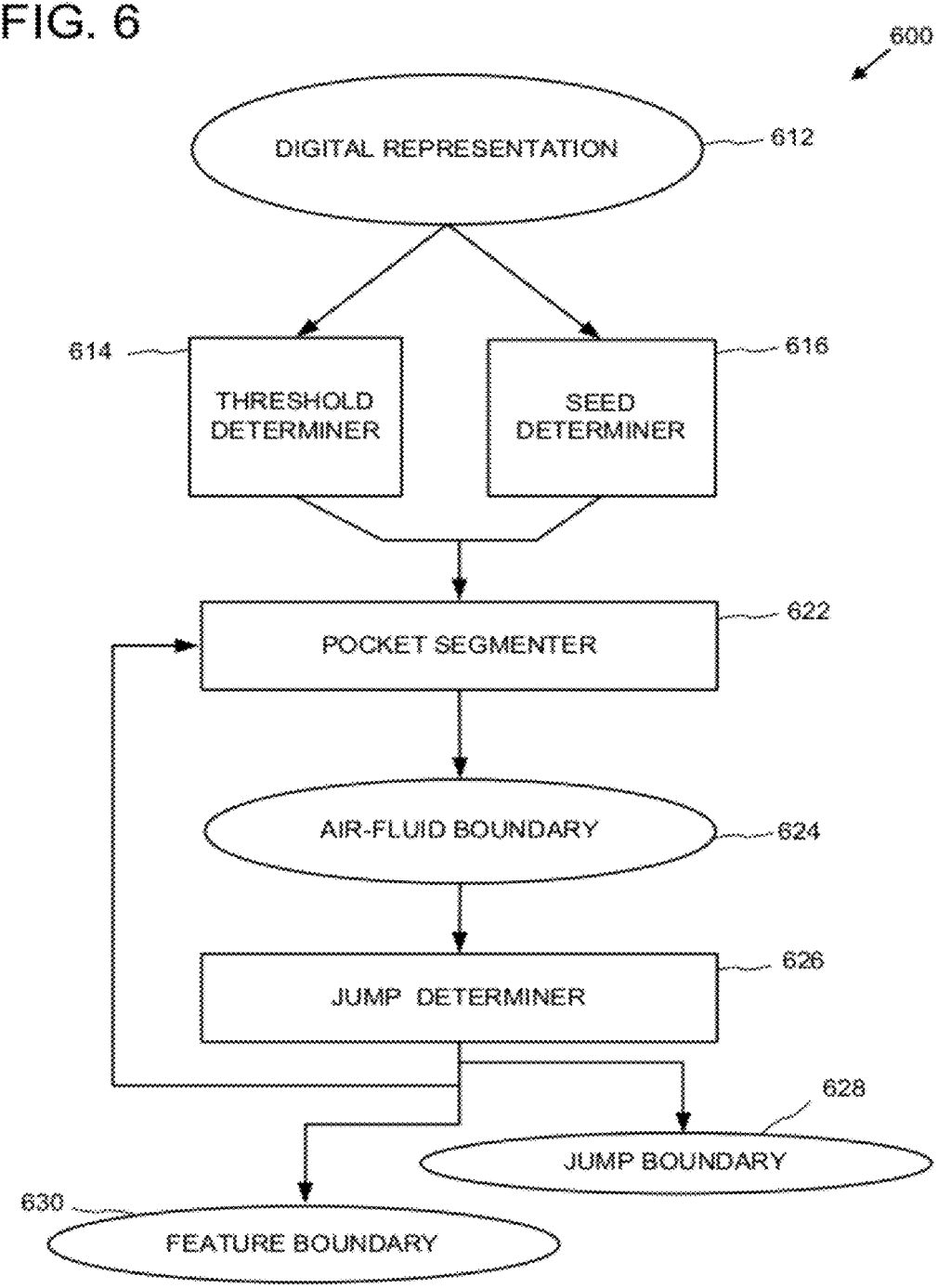
FIG. 6 is a block diagram of an exemplary system for segmenting an image of an anatomical structure with software to divide the image into fluid and air pockets.

Exemplary System for Performing Trial Segmentation in a Digital Representation FIG. 6 shows an exemplary system 600 for segmenting an image of an anatomical structure with software to divide the image 612 into fluid and air pockets.

The segmenter that is run at 622 to produce a three-dimensional image of the anatomical feature can require a threshold value to properly process the data. In the system 600, the threshold determiner 614 determines two separate thresholds, one for the fluid portions of the anatomical structure and one for the air portions. The initial thresholds can be input manually, can be input by the software such as that represented at 122, or can be input using a combination of the two. Thresholds can be selected as a tradeoff between a low fluid threshold which has a high probability of segmenting all portions of the anatomical feature of interest, but which almost inevitably will produce leakage; and a high fluid threshold which has a high probability of producing little leakage, but which could cause large portions of the anatomical feature of interest to be missed. In an exemplary embodiment, involving a colon, −800 HU can be used as an upper threshold for air voxels or pixels. 276 HU can be used for a lower threshold for fluid voxels or pixels.

To begin segmentation, a starting seed can be specified. A seed determiner 616 can be included to determine the location of the starting seed. The determiner can place the seed using human input into a graphical user interface, can place the seed automatically, or can use some combination of the two to determine the starting location of the seed. Some systems require the placement of more than one seed, in which case the multiple seeds are placed in a similar manner as a single seed.

One seed can suffice if the entire structure has contiguous air-fluid sections. An example of such a structure is a colon that has been well-extended with no collapsed segments. If the anatomical structure has intervening collapsed segments between air-fluid sections, then a new starting seed may be needed (e.g., for sections between the collapsed segment).

A segmenter, 622, segments the digital representation of an anatomical structure 612. The segmenter 622 can use any reasonable region growing scheme such as fuzzy connectedness, K-means clustering, level set, active contours, expectation-maximization, and the like. The threshold determiner 614 can choose appropriate thresholds for the segmenter 622 used in the system 600.

When a seed (such as the seed 505 of FIG. 5), determined by the seed determiner 616 of FIG. 6, is placed in an air pocket 510 (FIG. 5), the segmenter will grow an area defined by the air pocket 510. If the seed 505 is instead placed in a fluid pocket, such as the fluid pocket 520 (FIG. 5), it will grow an area defined by the fluid pocket. An air region is not directly accessible from a fluid region—there is a single layer of components (voxels, pixels, or other elements) which have attenuation greater than the air threshold and less than the fluid threshold. When the segmentation process reaches an air-fluid boundary (such as the air-fluid boundary 515 (FIG. 5), to prevent the segmenter 622 from stopping, the jump determiner 626 determines that an air-fluid boundary has been reached, rather than some other sort of boundary, such as an anatomical feature wall 525 (FIG. 5).

In an exemplary embodiment, the set of rules followed by the jump determiner 626 are as follows: Jumps are allowed only between two components with the same x and z coordinates, where the vertical y coordinates are different from each other by at most two components where components may be voxels. The x,y,z coordinate system used herein has the origin in the upper left corner, axis z parallel to the scanning direction, x pointing from left to right and y pointing from up to down, as shown at 530 (FIG. 5). For a given pair of (x, z) components to be considered in a fluid pocket 520, a jump is indicated when the pair has a larger (lower) y than the components from an adjacent air pocket 510.

Furthermore, as the fluid has a higher attenuation than the air, and as fluid is heavier than air, the jump determiner 626 only allows jumps when a low attenuation component is located at a position above a high attenuation component. Once a jump has been made from an air pocket 510 (FIG. 5) to a fluid pocket 520 (FIG. 5), the location of the jump is saved as the jump boundary 628, and the segmenter 622 continues segmenting the pocket. In an exemplary embodiment, the jump locations are saved as the location of a jump on the (x, z) plane (i.e., [$x_0$, $z_0$]) and the endpoints of the jump along the y direction, i.e., $y_{0,f}$ for fluid and $y_{0,a}$ for air.

Once the individual air or fluid pocket segmentation has been completed, the pocket boundary is saved as the feature boundary 630. The segmenter 622 continues segmenting pockets until the entire or a sufficient portion of the digital representation 612 of an anatomical structure has been segmented.

EXAMPLE 11

Figure 7:
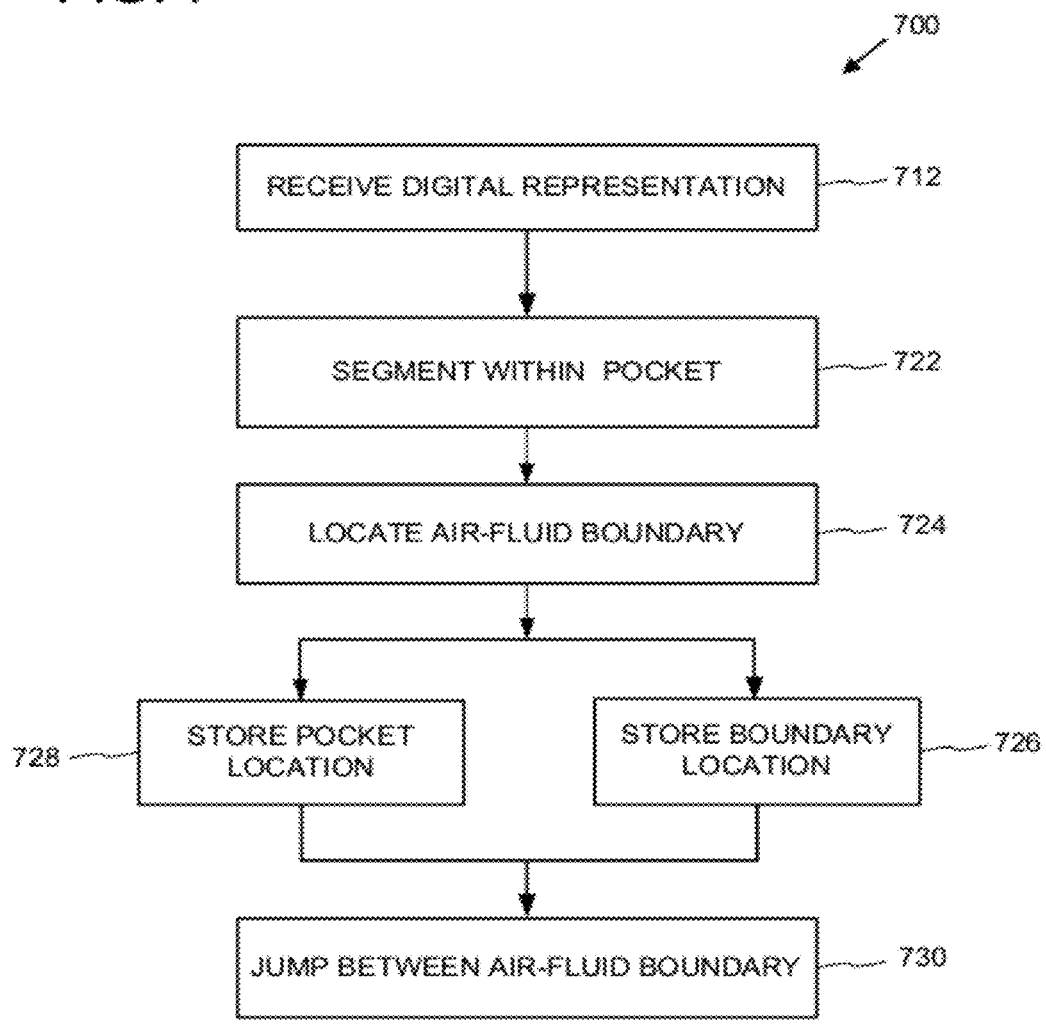
FIG. 7 is a flowchart showing an exemplary method for performing heterogeneous pocket jumping segmentation.

Exemplary Method for Performing Heterogeneous Pocket-Jumping Segmentation in a Digital Representation FIG. 7 shows an exemplary method 700 for performing heterogeneous pocket-jumping segmentation in a digital representation. The method 700 can be performed, for example, by the system 600 of FIG. 6.

At 712, a digital representation of an anatomical feature with air and fluid pockets is received. At 722, a pocket is segmented. At 724, a boundary between an air and a fluid pocket is located.

At 726, the location of the air-fluid boundary is stored. At 728, the location of the pocket, including its boundary, is stored. At 730, a jump is made across the air-fluid boundary. The method then continues at 722, where another pocket is segmented. This method continues until a plurality of the air and fluid pockets have had their air fluid boundaries and pocket locations determined.

EXAMPLE 12

Figure 8:
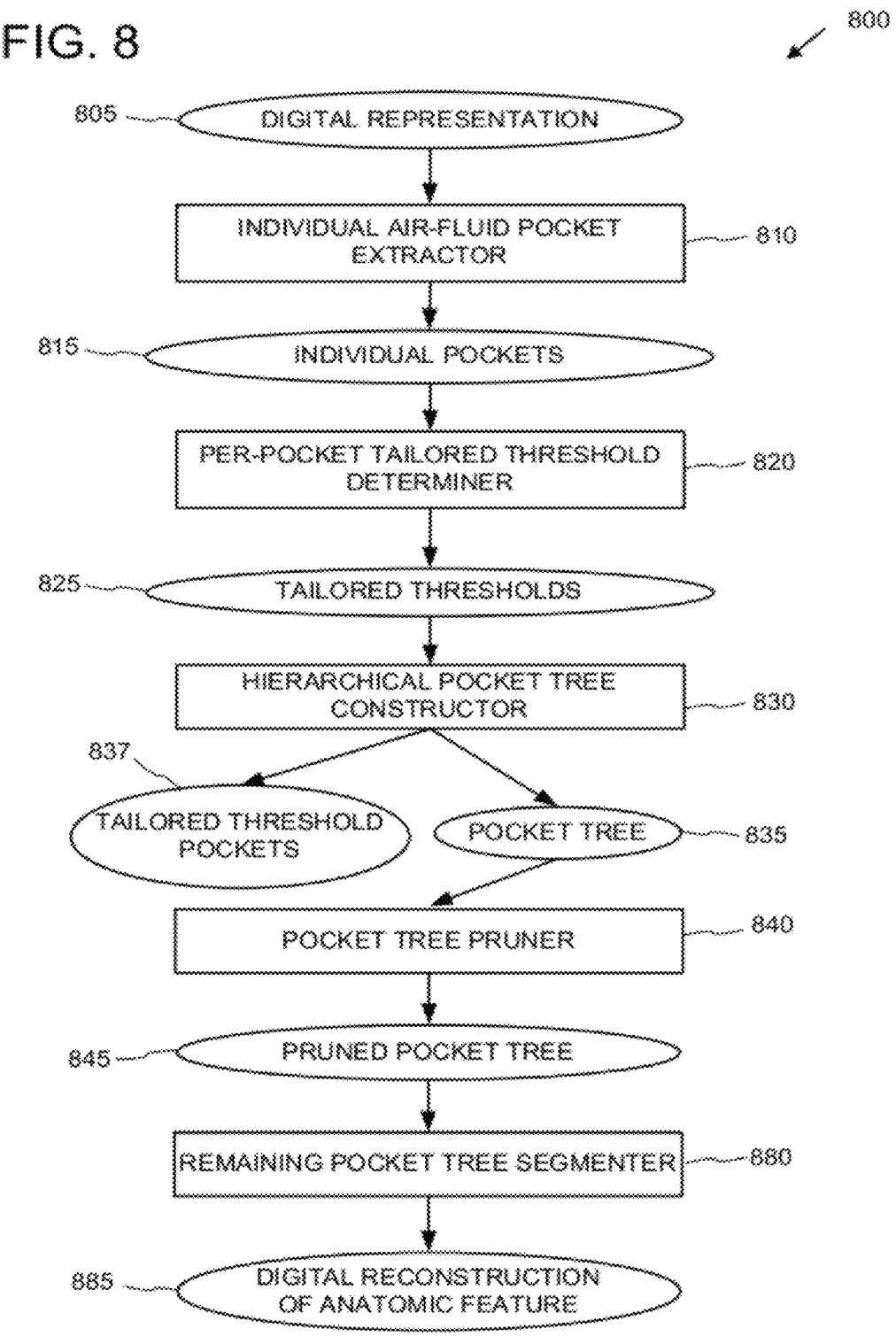
FIG. 8 is a flowchart showing an exemplary method for resegmenting an anatomical structure.

Exemplary System for Determining an Enclosing Boundary via Tailored Thresholds FIG. 8 shows an exemplary system 800 for performing resegmentation, as for example, is done by the resegmenter 280 in FIG. 2B. A potentially leaky digital representation of an anatomical structure 805 (e.g., the virtual anatomical structure 275 of FIG. 2B) is used as input for an individual air-fluid pocket extractor 810 which produces individual air and fluid pockets 815. During the segmentation process, other information is determined for at least a portion of the fluid pockets, such as the mean and standard deviation of contrast agent CT attenuation, volume of the fluid pocket, and a bounding box which encompasses substantially all of the points within the fluid pocket. This bounding box may be a three-dimensional polygon, an ellipse, or some other reasonable bounding shape.

At 820, a tailored threshold determiner is configured to determine a separate threshold 825 for respective fluid pockets determined at 815. Some of the fluid pockets determined at 815 themselves comprise multiple pockets separated by tissue bridges or peninsulas. These pockets within pockets can themselves receive a tailored threshold 825. The oral contrast resident in the fluid in the anatomical structure whose virtual representation is being segmented may be present in greater amounts in some pockets than in other pockets. If the wrong threshold is used for a given pocket, because, for example, the contrast agent is unevenly distributed among the fluid pockets in the anatomical structure, nearby bone or tissue may be incorrectly included as a portion of the fluid pocket. Creating a tailored threshold for respective fluid pockets which takes into account the specific amount of oral contrast agent within the given fluid pocket can give better segmentation results.

At 830, a hierarchical pocket tree constructor is configured to resegment the pockets 815 using the individual tailored thresholds 825 for respective associated fluid pockets to create another (e.g., resegmented) three-dimensional representation of the anatomical structure 837. Then, the fluid and air pockets 815 are arranged hierarchically to create a hierarchical pocket tree 835. This can also be done incrementally, that is a pocket is resegmented, producing a single resegmented pocket 837 and placed in the tree, then another pocket is resegmented and placed in the tree, and so on. The fluid pockets (e.g., each fluid pocket or a reasonable subset thereof) are then checked for leakage. When leakage is found, the hierarchical pocket tree pruner 840 prunes the pocket tree 835 by removing the pocket, or a portion of the pocket representing the leakage. Pockets below pockets with detected leakage in the pocket tree are pruned, as well, producing a pruned pocket tree 845. In an alternate representation, when a pocket is found to not have leakage, it is added to a pruned pocket tree 845.

After the pruned pocket tree 845 has been generated, then a remaining pocket tree segmenter 880 is configured to resegment the digital representation with only those fluid and air pockets corresponding to the pruned pocket tree being used for the resegmentation. In an exemplary embodiment, the tailored thresholds 825 are used to resegment respective associated fluid pockets during the resegmentation by the resegmenter 880. In some embodiments, this resegmentation is limited to a bounding box for the pocket determined, for example, by the system 600 of FIG. 6. The resegmenter 880 is configured to produce a three-dimensional digital representation of the anatomical structure 885.

EXAMPLE 13

Exemplary Method for Determining an Enclosing Boundary via Tailored Thresholds

Figure 9:
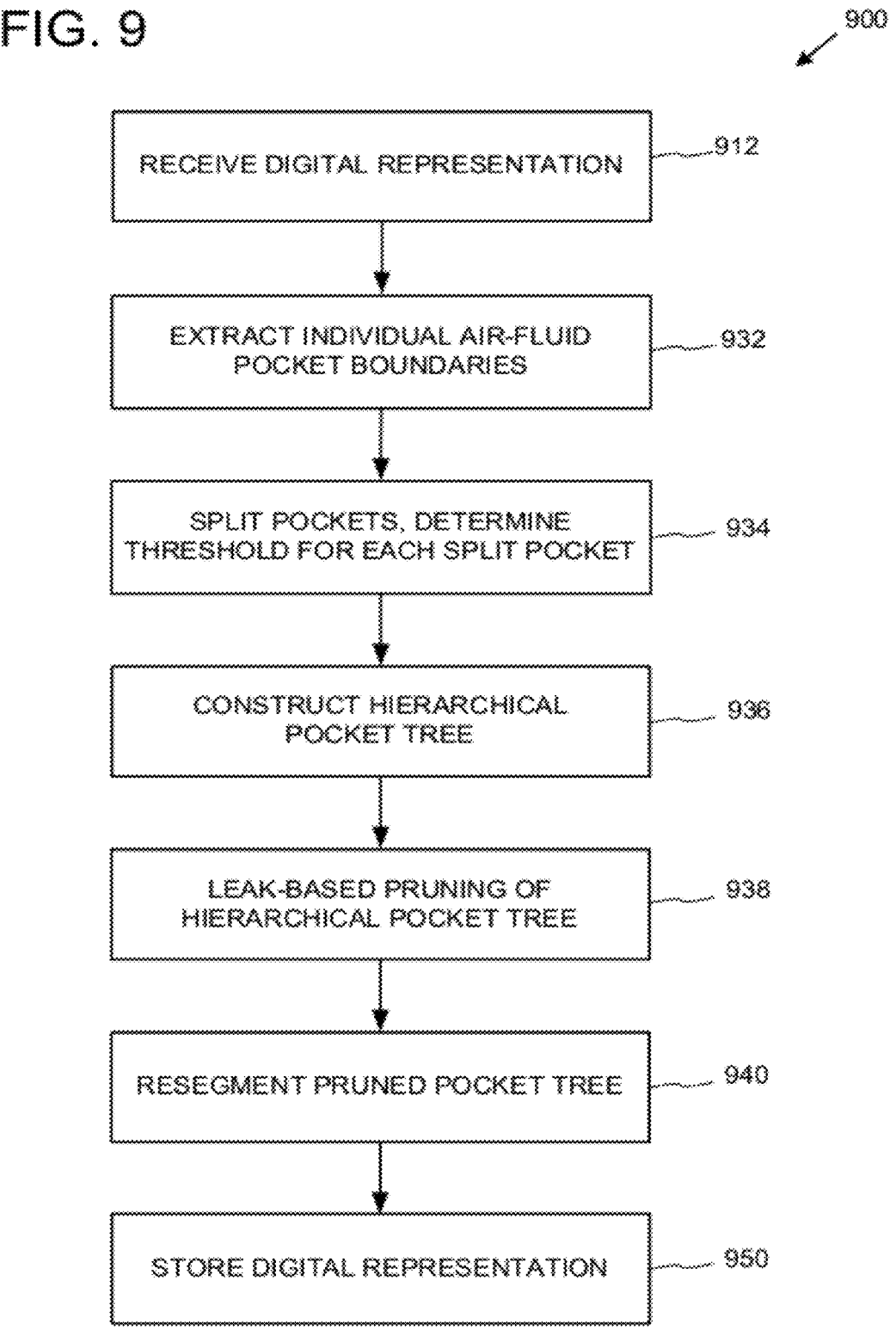
FIG. 9 is a block diagram of an exemplary system for resegmenting an anatomical structure.

FIG. 9 shows an exemplary method 900 for performing resegmentation using, as a starting point, a trial segmentation, such as that performed, for example, at 222 in FIG. 2A. The method 900 can be performed, for example by the system 800 of FIG. 8.

At 912, a digital representation, for example, the digital representation 260 of FIG. 2B, is received. This digital representation can be at least a portion of an anatomical structure which has been previously segmented using trial parameters. At 932, the digital representation is segmented such that it is decomposed into a series of air and fluid pocket boundaries. At 934, fluid pockets are examined to determine if they comprise more than one fluid pocket. Information about fluid pockets located is saved. Also, a tailored threshold can be calculated for one or more fluid pockets.

At 936, based on information on pocket connectivity, such as that determined at 726 and 728 within method 700 as shown at FIG. 7, a hierarchical pocket tree can be created. At 938, leak-based pruning is performed. At 940, the portions of the digital representation associated with pockets in the pruned pocket tree are resegmented to produce a resegmented anatomical structure. At 950, the digital representation of the resegmented anatomical structure is stored.

EXAMPLE 14

Exemplary Method for Determining Characteristics of a Specific Pocket

Figure 10:
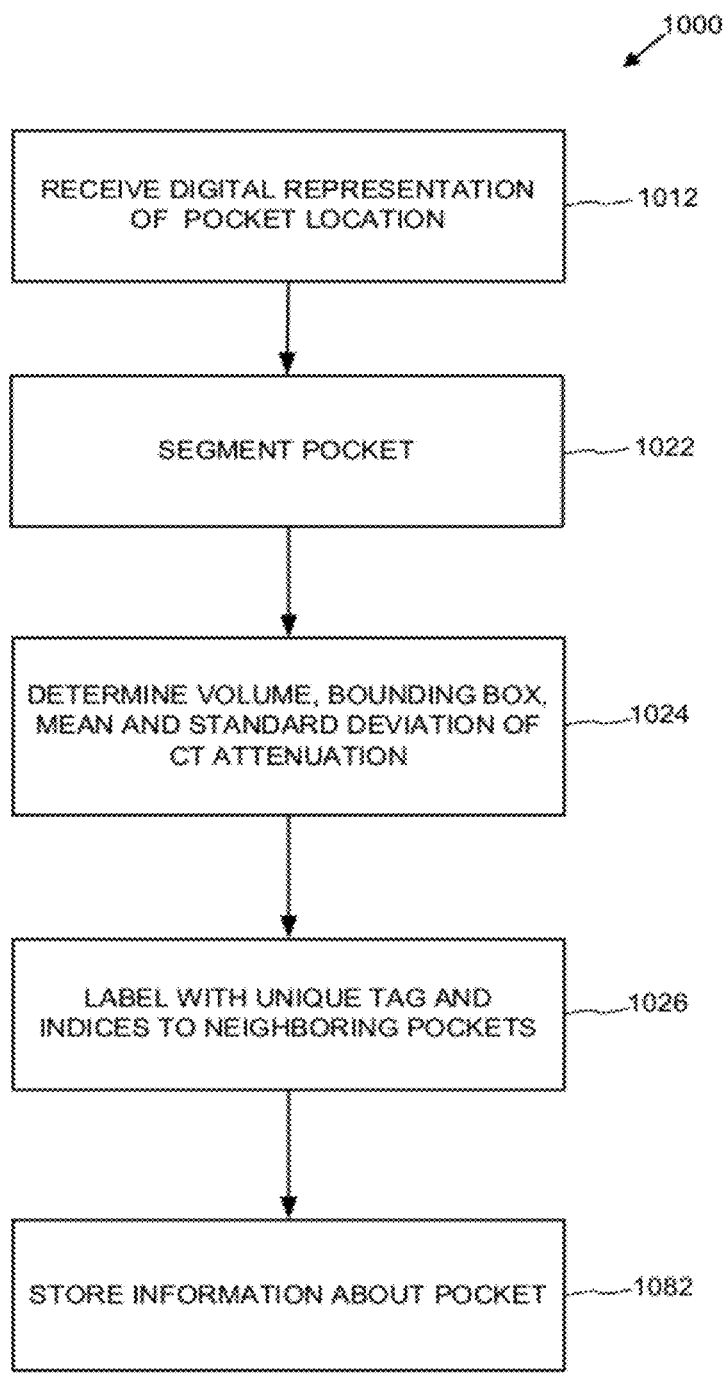
FIG. 10 is a flowchart of an exemplary method to extract individual air or fluid pockets.

FIG. 10 is a flowchart of an exemplary method to extract individual air or fluid pockets. The method 1000 can be performed, for example, by the individual air or fluid extractor 810 of FIG. 8. At 1012, a digital representation of a pocket location is received, such as that determined at 726 and 728 within method 700 as shown at FIG. 7. At 1022, the pocket is segmented. In the example, unlike the method described in connection with FIG. 7, no jumps are allowed between an air pocket and a fluid pocket and vice-versa. Thus, only a specific pocket is segmented. At 1024, various characteristics of the specific pocket can be determined such as, but not limited to, the volume, a bounding box, the mean of CT attenuation, the standard deviation of CT attenuation, appropriate thresholds for the type of segmentation used, and so on.

At 1026, the pocket is labeled with a different tag and indices to neighboring pockets from (or to) which jumps took place. At 1082, the information about the pocket is stored.

EXAMPLE 15

Figure 11A:
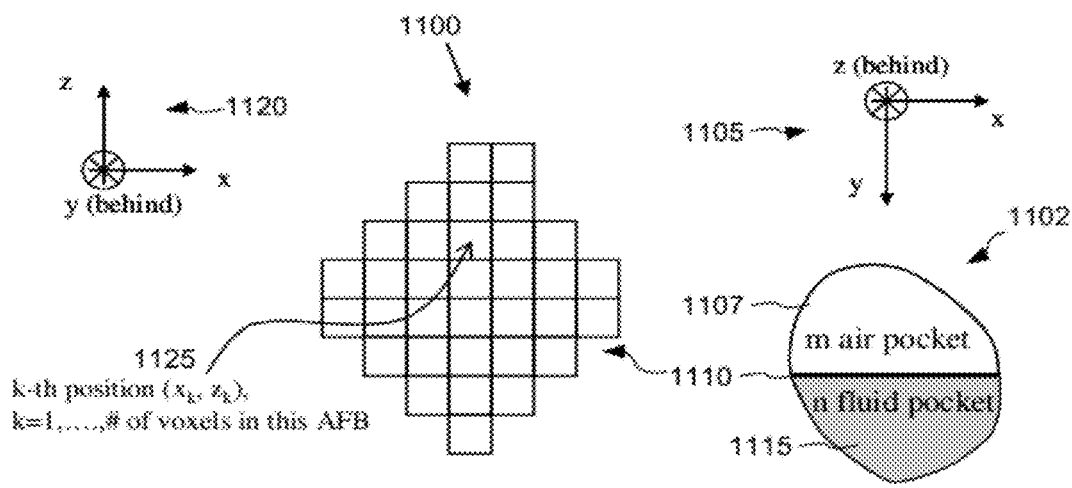
FIGS. 11A-H are schematic representations showing an exemplary air pocket, multiple fluid pockets within the same air-fluid boundary, and the voxels representing the air-fluid boundary.

Exemplary Schematic Representations Showing Multiple Fluid Pockets within the Same Air-Fluid Boundary, and the Voxels Representing the Air-Fluid Boundary FIGS. 11A-11H show an exemplary representation of fluid and air pockets and their air-fluid boundaries. FIG. 11A at 1100 shows an air and fluid pocket 1102 composed of a fluid pocket 1115, an air pocket 1107, and the air-fluid boundary between them 1110. The air-fluid boundary 1110 can be represented by a series of voxels 1100, which can be represented using an x, z coordinate system, such that the k-th voxel marked at 1125 is at $(x_k, z_k)$. This representation of the air-fluid boundary does not preclude a boundary consisting of multiple layers stacked in the y-direction.

Notice that the air pocket and fluid pocket 1102 are drawn with the coordinate system 1105 such that the y-axis is up and down, while the voxel representation coordinate system 1120 is rotated 90 degrees such that the y-axis is projecting behind the picture, with the effect that the voxels shown represent the surface of the air-fluid boundary 1110 which has only one fluid pocket 1115.

Figure 11B:
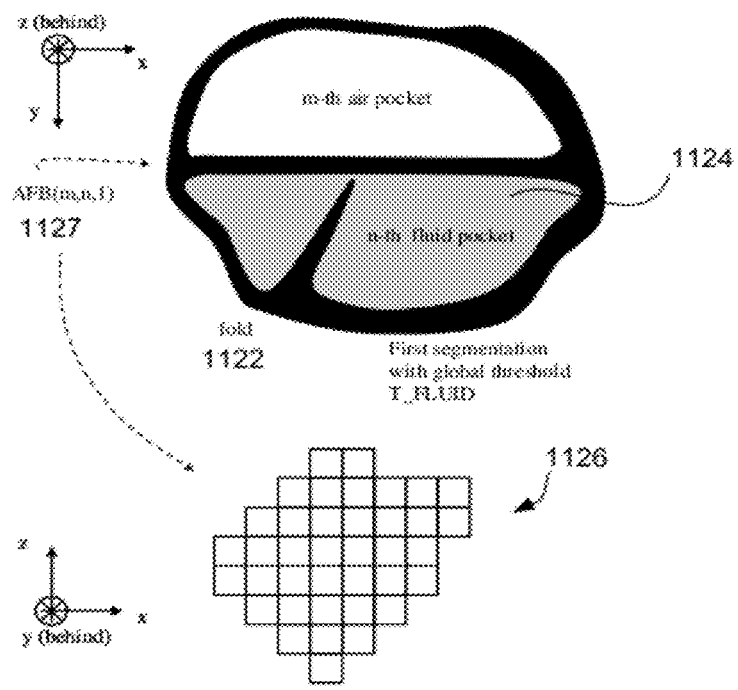
Figure 11C:
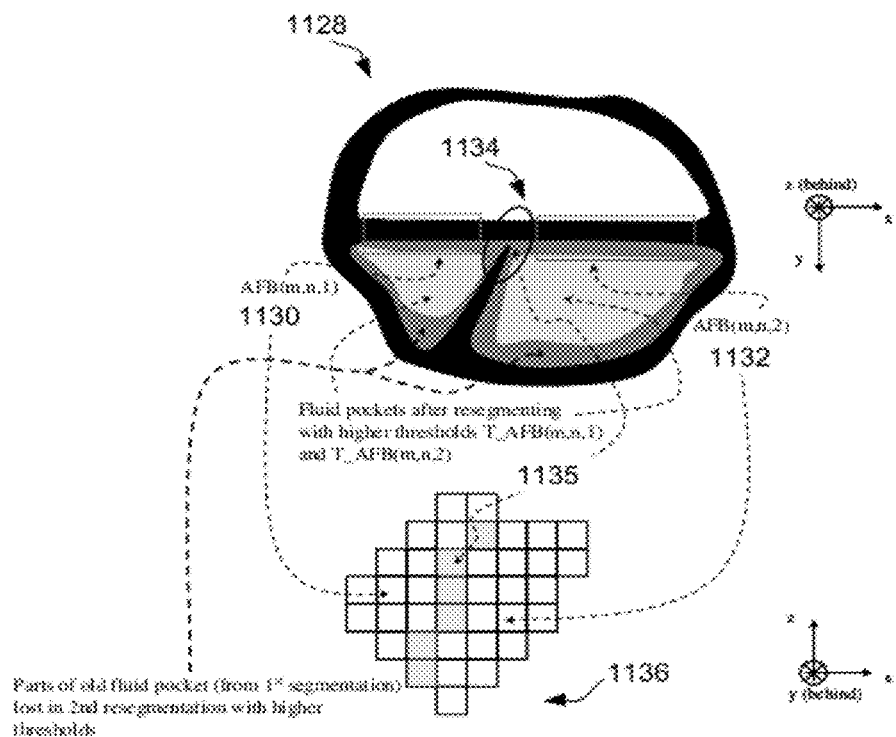

FIG. 11B shows a fluid pocket 1124 which has a fold 1122 extending into the pocket. However, because the fold does not touch the air-fluid boundary AFB(m,n,1) 1127 (the voxel representation of which is shown at 1126), this will be segmented as one pocket in the trial segmentation. FIG. 11C at 1128 shows the fluid pocket 1124 of FIG. 11B after a second segmentation with a tailored threshold. This segmentation has produced two pockets with two corresponding air-fluid boundaries, AFB(m,n,1) 1130 and AFB(m,n,2) 1132 as the resegmentation has extended the fold 1134 so that it now extends up to the air-fluid boundary; the gray area shown in the voxel representation of the air-fluid boundary at 1135 indicates the extent of the wall area after resegmenting. This pocket is also shown in the voxel representation 1136—the gray voxels represent the fold which divides the air-fluid boundary into two discrete sections.

Figure 11D:
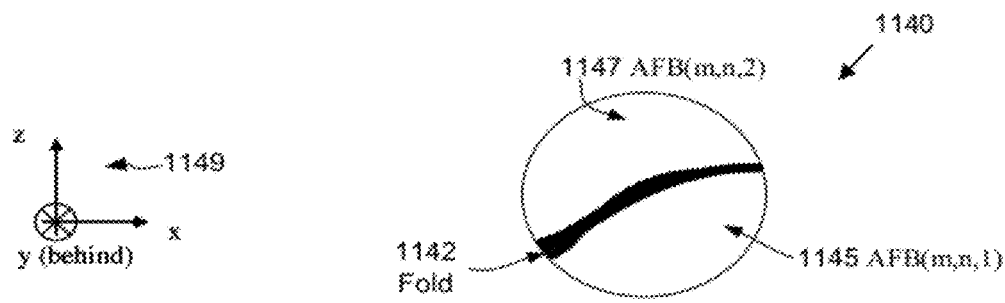

FIG. 11D at 1140 shows the surface of the air-fluid boundary 1136 shown in FIG. 11C, with the same orientation 1149 as the voxel representation 1136 (FIG. 11C). The divider 1142, which corresponds to the fold 1134 (FIG. 11C), divides the air-fluid boundary 1136 (FIG. 11B) into two distinct pockets with one of them corresponding to AFB(m,n,1) 1145 and the other to AFB(m,n,2) 1147. When a single air-fluid boundary has multiple pockets, a divider, such as the divider 1142, has the potential for being the wall of the anatomical structure being segmented, with one of the separate pockets being a leaked area.

Figure 11E:
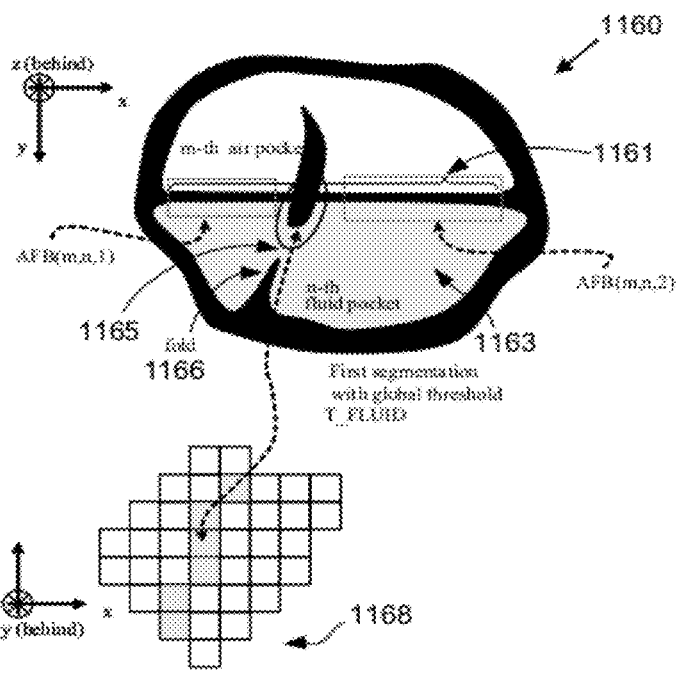

FIG. 11E 1160 shows a case when a single fluid pocket determined in the first trial segmentation is split into two fluid pockets, such as by the per-pocket tailored threshold determiner 820 of FIG. 8. In this example, the fluid pocket contains a fold 1166 which contains a break below the air-fluid boundary 1165, so that there is a connection between parts of the fluid pocket on the left and right side of the fold 1166. This is still treated as one pocket but with two different AFB's, as the air-fluid boundary voxels 1168 which represent the actual air-fluid boundary 1161 of the m$^{th}$ air fluid pocket are completely divided by the fold 1166 at the air-fluid boundary.

Figure 11F:
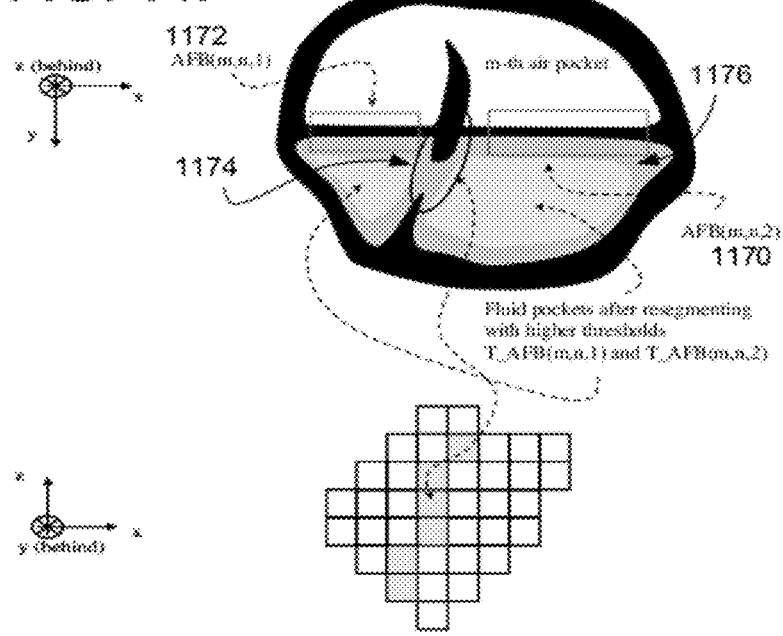

FIG. 11F shows the fluid pocket of FIG. 11E after resegmentation with a tailored threshold such as may be performed by the hierarchical pocket tree constructor 830. As can be seen, there are now two discrete AFB's: AFB(m,n,1) 1172, and AFB(m,n,2) 1170 with a full wall 1174 between two corresponding fluid pockets confined to the previous n-th fluid pocket—the darker gray area 1176 indicates the extent of the anatomical structure boundaries after the resegmentation.

Figure 11G:
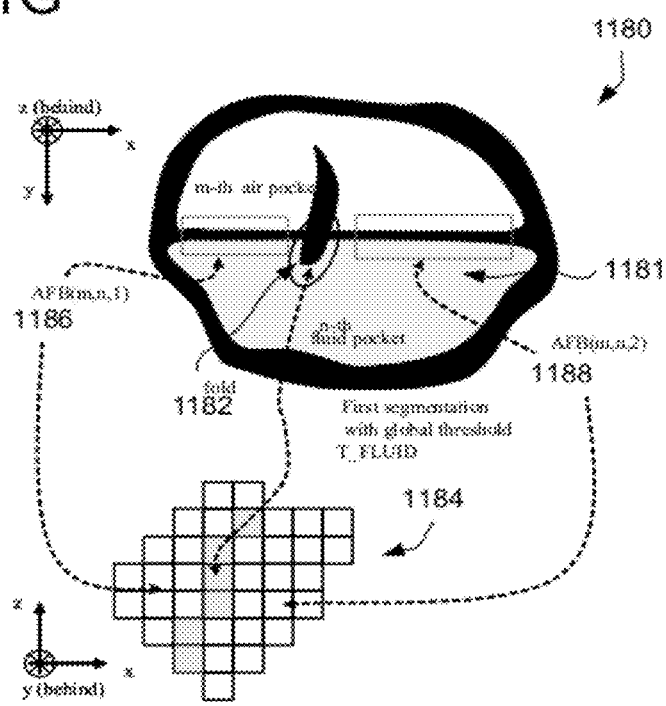
Figure 11H:
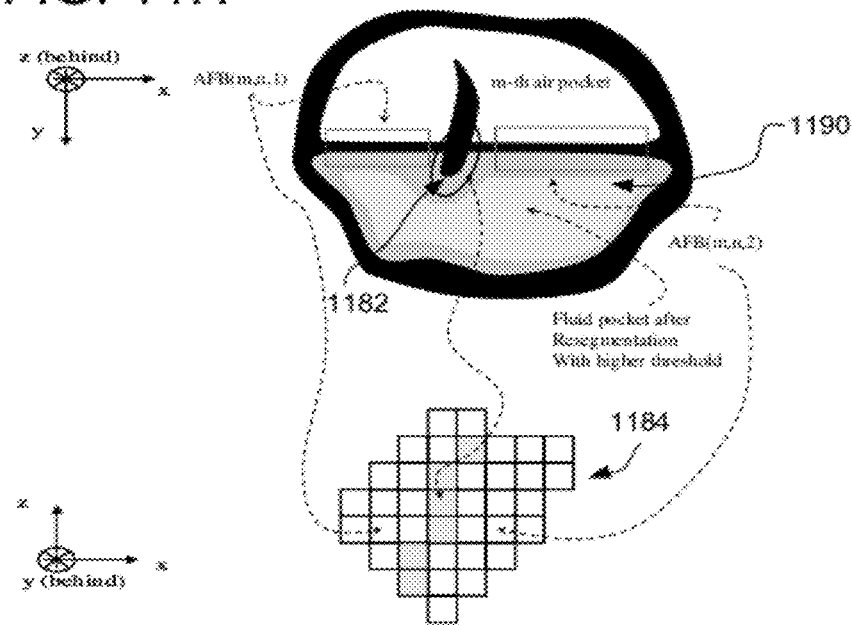

FIGS. 11G-H shows the case where a pocket with a protrusion into the air-fluid boundary gives rise to only one fluid pocket in the initial trial segmentation, and also remains one fluid pocket after resegmentation, such as by the hierarchical pocket tree constructor 830. At 1180 (FIG. 11G), a fold 1182 can be seen protruding into the fluid pocket 1181, splitting the AFB 1184 into two distinct parts, AFB(m,n,1) 1186 and AFB(m,n,2) 1188. However, because the two AFB's belong to a single connected fluid pocket, this configuration generates a single fluid pocket. When the fluid pocket 1190 is resegmented with a tailored threshold, the fold 1182 does not extend deep enough into the fluid pocket 1190 to produce two distinct pockets.

EXAMPLE 16

Exemplary Screen Shot Showing an Exemplary Threshold Voxel Location

Figure 12:
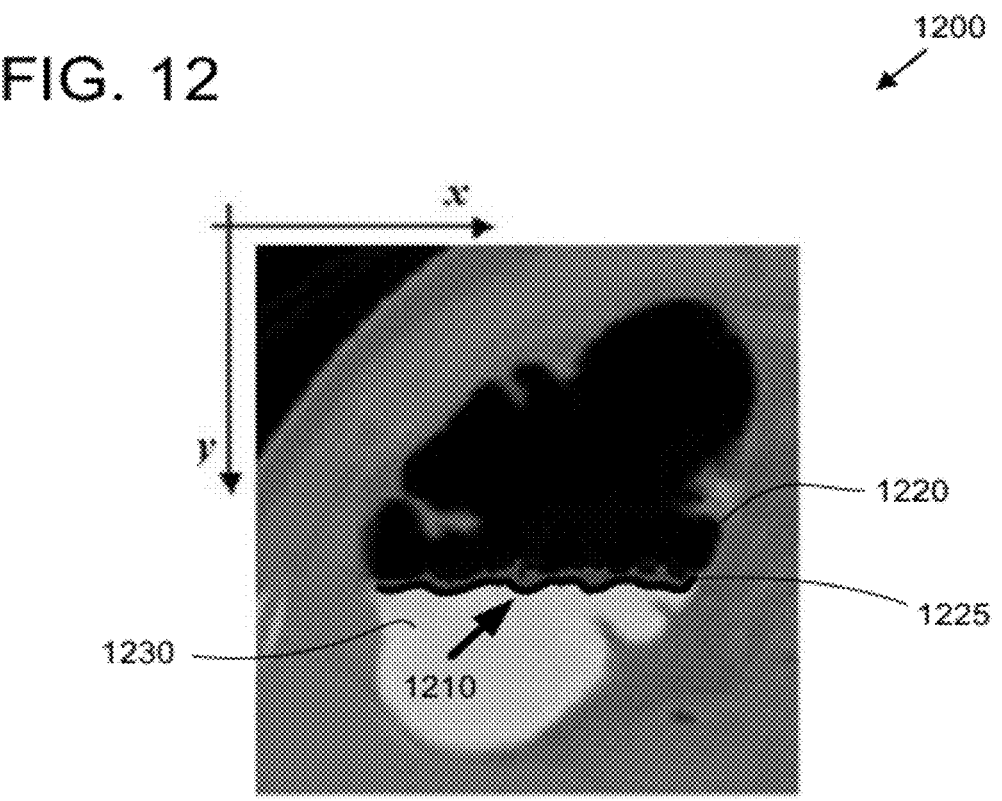
FIGS. 12, 18A-C, 24A-D, 27B-C, 27E-F, and 28A-F are in color.

FIG. 12 at 1200 shows an exemplary threshold voxel location which can be used to determine a per-pocket threshold in any of the examples herein. FIG. 12 comprises an air pocket 1220, a fluid pocket 1230, and the air-fluid boundary 1225 between them. The voxels marked 1210 just below the air-fluid boundary 1225 can be used to determine the threshold for this fluid pocket. In this example, the voxels used follow the air-fluid boundary, which is not straight in the X direction. In other exemplary embodiments, a straight x-line (that is, y is held constant) is used for the threshold voxels. It may be advantageous to choose the threshold voxels at a lower depth in larger and/or deeper pockets and at a higher depth for threshold voxels in smaller and/or shallower pockets.

EXAMPLE 17

Figure 13:
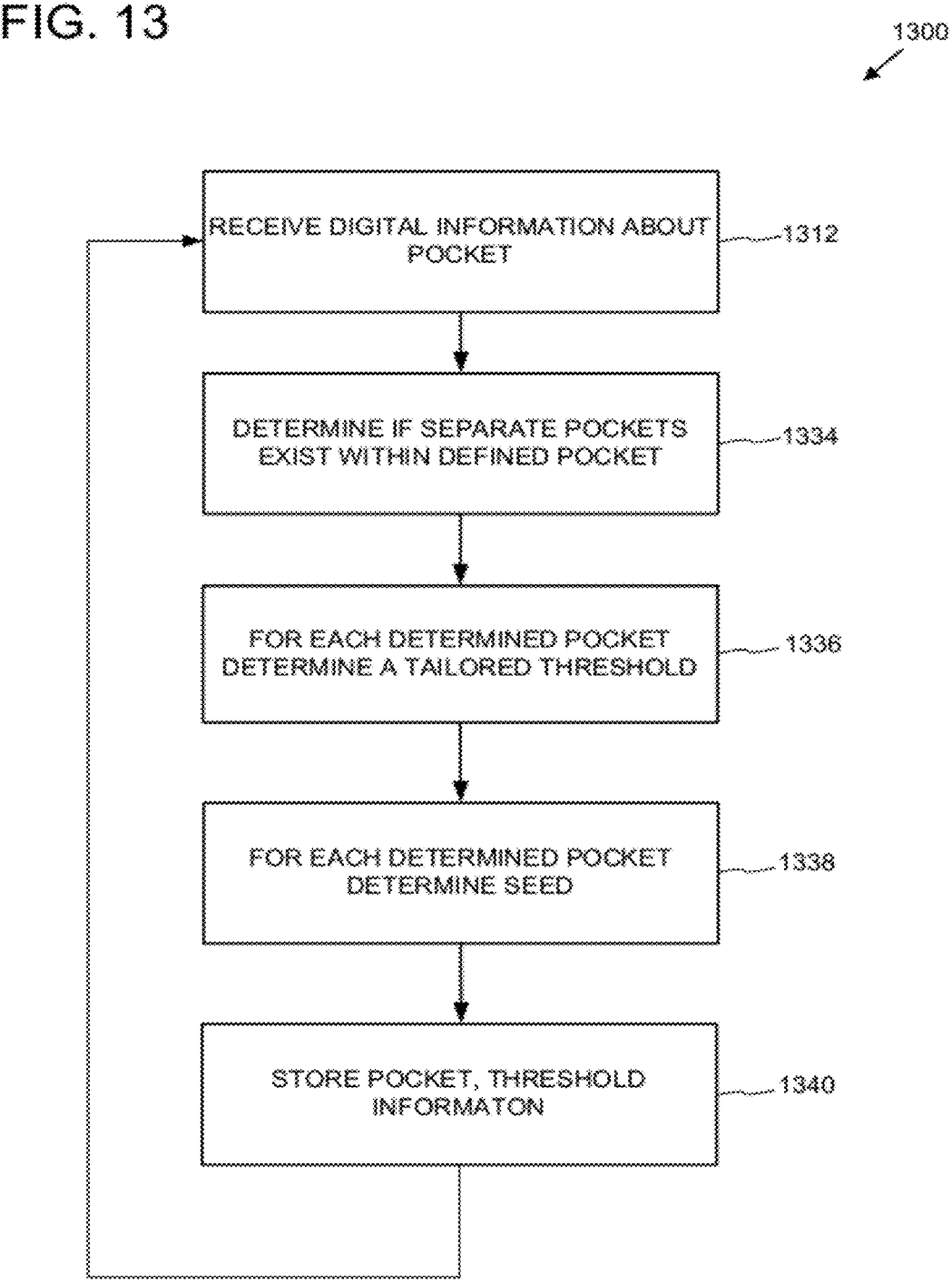
FIG. 13 is a flowchart of an exemplary method to split pockets to determine tailored thresholds.

Exemplary Method for Determining if Separate Pockets Exist within Defined Pockets FIG. 13 shows an exemplary method for determining whether multiple pockets (obtained with a tailored segmentation) exist within a previous pocket obtained with a trial segmentation, such as the fluid pocket 1124 in FIG. 11B, 1163 in FIG. 11E and 1181 in FIG. 11G. The method 1300 can be performed, for example, by the individual air or fluid pocket extractor 810, shown in FIG. 8. At 1312, information is received about a specific pocket, such as the fluid pocket 1115 in FIG. 11A. At 1334 it is determined if a separate pocket exists within the pocket already known.

The boundaries between air and fluid pockets are labeled AFB(m,n,j) where m and n are indices labeling neighboring air and fluid pockets. Identified pockets (such as those identified in the trial segmentation at 222 in FIG. 2A) may have a j index equal to 1 (as in FIG. 11B) or may have multiple AFB(m,n,j) with $j_{max} \geq 2$ (as in FIG. 11E and in FIG. 11G). After resegmenting n-th fluid pocket, a number of individual AFBs may increase (for example, from $j_{max}=1$ in FIG. 11B to $j_{max}=2$ in FIG. 11C) or may stay the same (as shown in FIGS. 11E & F and FIGS. 11G & H). Furthermore, resegmenting can split an n-th fluid pocket into two or more pockets indexed by j, corresponding to the individual AFB(m,n,j) (as in FIG. 11C and FIG. 11F) or may only decrease a volume of an n-th fluid pocket without causing a split (as in FIG. 11H). Whether the n-th fluid pocket is split or not after resegmenting can be checked by performing multiple region growing segmentations (pocket extractor 810 in FIG. 8) initiated from seeds associated with every individual AFB(m,n,j). FIG. 11F shows a case where two resegmentations started from seeds associated with AFB(m,n,j=1) and AFB(m,n,j=2) yield creation of two pockets, while in FIG. 11H, two resegmentations (resegmentation of AFB(m,n,1) and AFB(m,n2) result in the same segmented volume.

In an exemplary embodiment, a modified version of 2-D region growing is used in the x, z plane to determine the existence and location of multiple air-fluid boundaries. A point saved as an air-fluid boundary crossing is used as a seed for 2-D region growing. The region is then grown, with the expectation that it will grow a region equivalent to the air-fluid boundary of the specific pocket that the particular point occupies. After the region is grown, successive points saved as crossings for this particular fluid pocket are checked against the list of points that have been recorded as being at the air-fluid boundary of this pocket. If a point is discovered as previously being on the air-fluid boundary that is not within the borders of this specific AFB, then the missing point is used as a starting seed for a new 2-D boundary growing region, and the (formerly single) air-fluid boundary is known to comprise at least two separate AFBs. This procedure continues until the previously recorded locations of the air-fluid boundary have been accounted for.

As shown, for example, by the jump determiner 626 of FIG. 6, in another exemplary embodiment, the jump locations are saved as the location of a jump on the (x, z) plane (i.e., [$x_0$, $z_0$]) and the endpoints of the jump along the y direction, i.e., $y_{0,f}$ for fluid jumps and $y_{0,a}$ for air jumps. As an example, the k-th point shown at 1125 would have the coordinates $x_k$, $z_k$.

More specifically, a starting seed, [$x_0$, $z_0$], for this example, is taken from the recorded crossings shown above. Then, for the four nearest neighbors of [$x_0$, $z_0$], the following procedure is repeated: for a given [$x_m$, $z_m$], where m=1, . . . , 4 and $x_m = x_0 \pm 1$, and $z_m = z_0 + 1$, a test along the y direction is performed. Starting points for the test are $y_{m,f} = y_{0,f}$ and $y_{m,a} = y_{0,a}$.

During the test, $y_{m,a}$ is gradually decreased (that is, the air boundary is brought closer to the fluid boundary) and $y_{m,f}$ is gradually increased (that is, the fluid boundary is brought closer to the air boundary) as long as the maximum separation conditions holds: $y_{m,f} - y_{m,a} \leq 6$ voxels. The test is concluded positive and the point [$x_m$, $z_m$] is added to the identified air-fluid boundary if for any $y_{m,f}$ and $y_{m,a}$ the separation condition, CT attenuation $I_{CT}(x_m, y_{m,f}, z_m) > T_{FLUID}$, and $I_{CT}(x_m, y_{m,a}, z_m) > T_{AIR}$ holds. The test along the y direction stops when the first qualified $y_{m,f}$ and $y_{m,a}$ are found. Once a given [$x_m$, $z_m$] is accepted, its currently unchecked nearest neighbors are checked and the process continues until the [$x_k$, $z_k$] points constituting a given AFB(m,n,j) are exhausted.

In some embodiments, a depth in the fluid pocket which will be used for determining a specific threshold is also determined. Generally, the smaller the pocket, a shallower depth will be used to determine the threshold. The reason for only choosing points near the air-fluid boundary is that there may be leakage in the pocket, and so averaging values which actually are not part of the structure being determined (because they represent a leaked area) will give an incorrect value. Averaging values near the surface which are less likely to be leaked has a better chance of determining a more-correct value.

In some embodiments, for every accepted point [$x_k$, $z_k$], the largest possible $Y_D(x_k, z_k)$ satisfying $Y_D - y_{k,a} \leq a$ threshold value is stored. The threshold value can be a constant (e.g., 6 or some other value.) Then, a test along the y direction is repeated for the next kth neighbor of [$x_0$, $z_0$]. Every newly added point [$x_k$, $z_k$] becomes a new starting point [$x_0$, $z_0$] and the process is continued until the connected points satisfying the described properties are exhausted and AFB(m,n,j=1) is built, such as the points represented by 1125 in FIG. 11A that form AFB(m,n,1) 1127 in FIG. 11B.

At 1336, a tailored threshold is determined for fluid pockets. Rather than using all of the possible voxels in a fluid pocket to determine the threshold, a portion of the voxels near the air-fluid boundary (e.g., immediately under) can be used. For example, FIG. 12 at 1200 shows an air pocket 1220, a fluid pocket 1230, and the air-fluid boundary 1225 between them. The voxels marked 1210 just below the air-fluid boundary 1225 can be used to determine the threshold for this fluid pocket. In this example, the voxels used follow the air-fluid boundary, which is not straight in the X direction. In other exemplary embodiments, a straight x-line (that is, y is held constant) can be used for the threshold voxels.

In an exemplary embodiment, the threshold is determined as follows. For every AFB(m,n,j) resulting from a trial segmentation, the fluid threshold is determined as the mean of the CT attenuations $I_{CT}(x_k, Y_D(x_k, z_k), z_k)$ over all (independent) k points for each $x_k$, $z_k$.

At 1338, a seed is determined which will be used the next time these pockets are segmented. In an exemplary embodiment, a seed $S_{AFB}(m,n,j)$ can be chosen from any voxel from AFB(m,n,j) which satisfies the condition $I_{CT}(x, Y_D(x, z), z) > T_{AFB}(m,n,j)$.

Then, another point from a list of recorded crossings is taken, and if it is not a member of a previously segmented air-fluid boundary (AFB), it can become the starting seed for a new 2D segmentation. If a point within 1147 (FIG. 11D) was chosen as the next point, the area represented by 1147 would be segmented, producing AFB(m,n,j=2).

Thus, for (m,n) air-fluid pairs, the pair's $J_{AFB}$ disconnected AFB(m,nj) regions can be identified, where j=1, . . . $J_{AFB}$.

At 1340, information associated with the pockets (such as multiple pocket locations, a tailored threshold for at least some pockets and the seed for at least some pockets) is stored for later reference.

EXAMPLE 18

Exemplary System for Determining a Specific Threshold for Fluid Pockets

Figure 14:
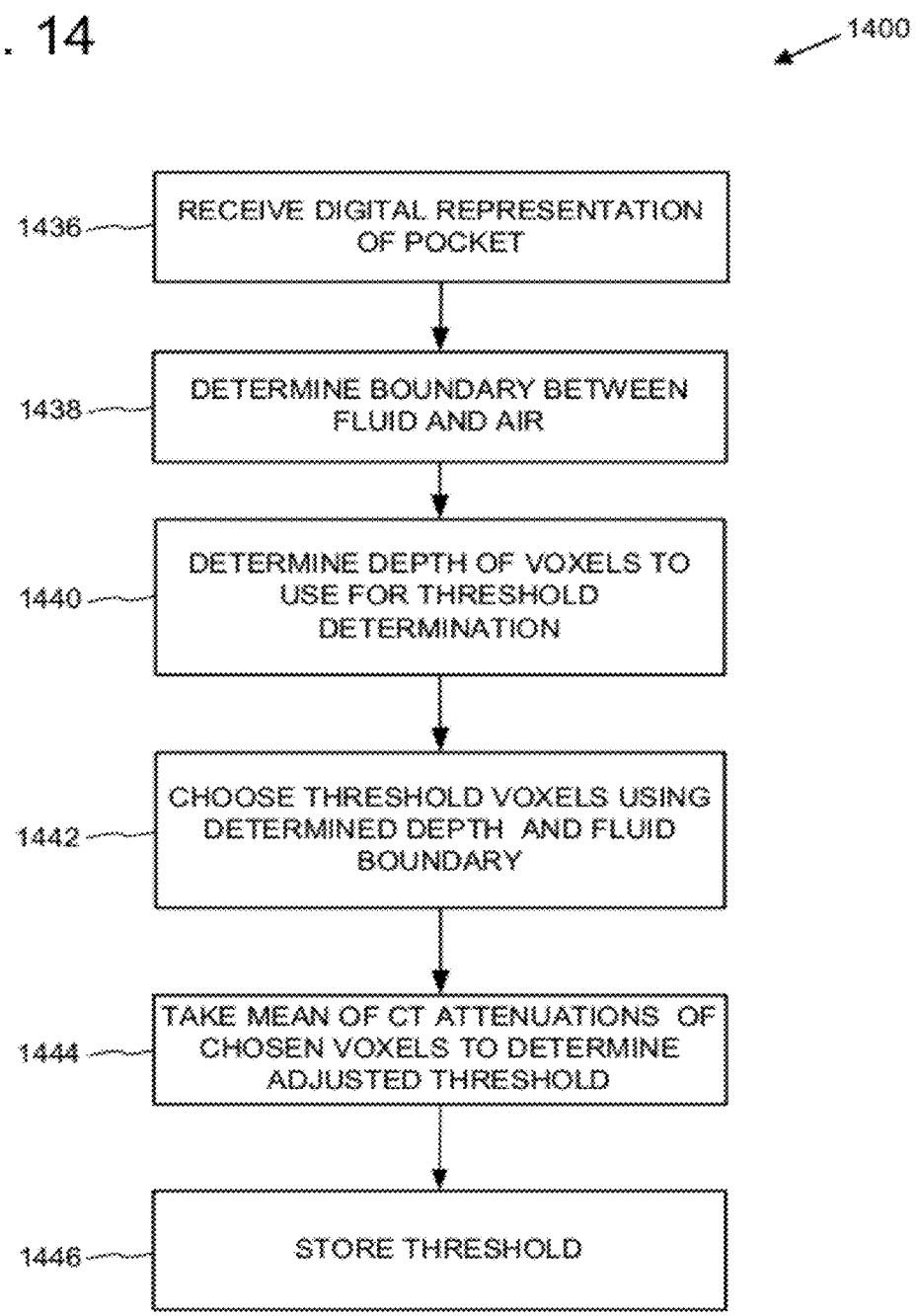
FIG. 14 is a flowchart of an exemplary method to determine a tailored threshold of an individual pocket.

FIG. 14 shows an exemplary method 1400 to determine a tailored threshold for a specific fluid pocket. The method 1400 can be performed in any of the examples herein involving a tailored (e.g. per-pocket) threshold (e.g., action 1336 in FIG. 13). At 1436, a digital representation can be received about a specific pocket, such as the individual pocket information 815 at FIG. 8. At 1438, a boundary is then determined between successive air and fluid pockets, such as the one shown, for example, at 1110 within FIG. 11A, creating, for at least some of the air and fluid pockets within the digital representation, a fluid-air boundary. At 1440, the depth of voxels or pixels to use for threshold determination within a fluid pocket is determined. Not every voxel (or pixel) within a fluid pocket is used to determine a tailored threshold, as some of the voxels could be a portion of a leaked area, and therefore would have an incorrect value. In an exemplary embodiment, a shallow depth near the air-fluid boundary is chosen to determine a tailored threshold.

At 1442, voxels within a fluid pocket at the depth determined at 1440 are chosen. At 1444, the mean of a predetermined characteristic of the fluid is calculated to determine a threshold value. For example, the predetermined characteristic can be CT attenuation. At 1446, the determined threshold is stored.

EXAMPLE 19

Exemplary Colon Representation via Pockets

Figure 15A:
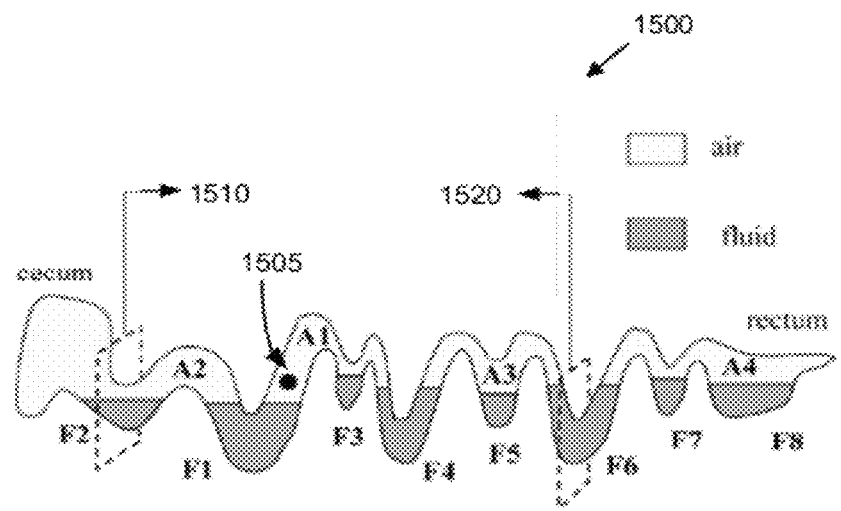
FIGS. 15A-B are a schematic diagram of an exemplary colon comprised of air and fluid pockets, and a screenshot of a view of a portion of the colon representing corresponding locations in the schematic diagram.

A schematic diagram of an exemplary colon comprised of air and fluid pockets is shown at 1500 in FIG. 15A. In it, two types of pockets which can be placed in the pocket tree are shown. Air pockets are shown at A1-A4, while fluid pockets are shown at F1 through F8. A starting seed which can be used for segmentation is shown at 1505. Cross-sections of the schematic diagram are shown at 1510 and 1520.

EXAMPLE 20

Figure 15B:
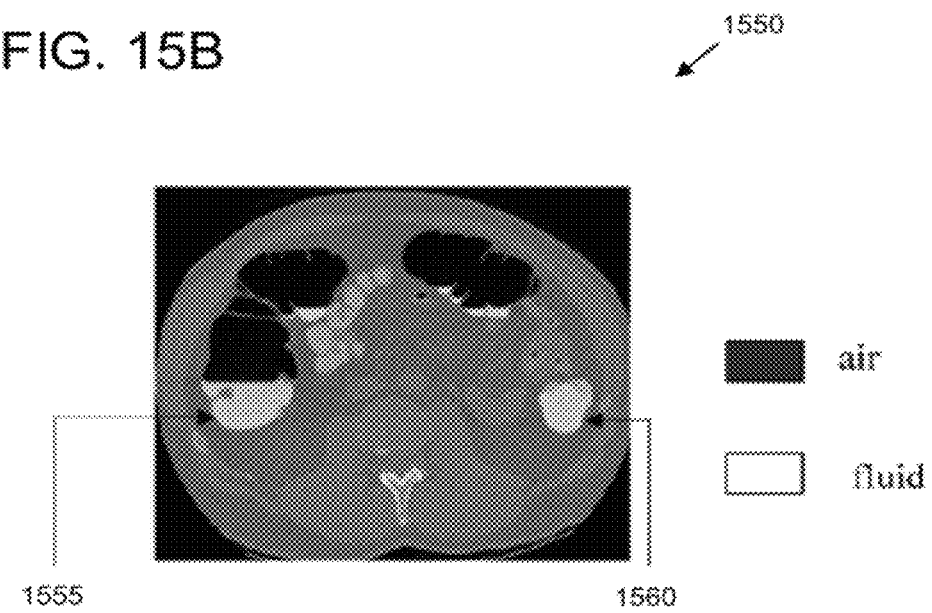

Exemplary Screen Shot Showing Two Types of Fluid Pockets that Can Occur in a Pocket Tree A screen shot of a view of an exemplary depiction of a colon is shown in FIG. 15B at 1550. In it, two cross-sections which produce different pocket tree representations are shown. The cross-section 1555 is partially filled with fluid and air; a representative cross section of an air pocket and a fluid pocket is shown at 1510 in FIG. 15A, where the cross section shows both air and fluid. A cross-section can also be completely filled with fluid, as shown at 1560. A representative pocket filled with fluid alone in cross-section is shown at 1520.

EXAMPLE 21

Exemplary Schematic Diagram of a Pocket Tree

Figure 16:
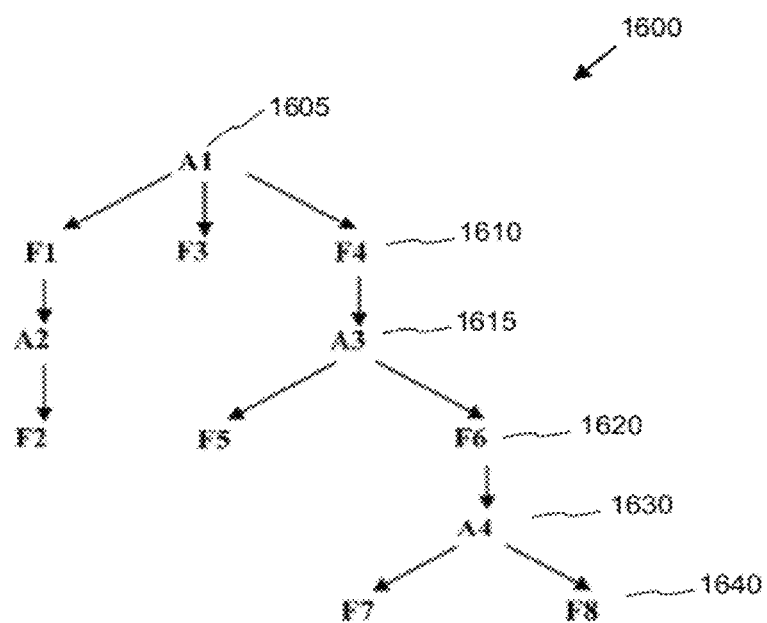
FIG. 16 is a schematic representation of a hierarchical pocket tree based on the schematic diagram shown at FIG. 15A.

FIG. 16 shows a pocket tree 1600 which represents a colon (shown in FIG. 15A) partially filled with fluid. The starting seed (which can be in any pocket) for the segmentation of this anatomical structure is shown at 1505 (FIG. 15A). The root of the pocket tree can be a representation of the pocket in the colon representation 1500 (FIG. 15A) which contains the starting seed 1505. If the anatomical structure consists of disconnected segments then each separate section can have its own seed which can be used to generate a separate pocket tree.

The pocket tree can be constructed by making as children of the root representations of all pockets which touch the initial pocket. For the colon shown at 1500, pockets F1, F3, and F4 all touch pocket A1, and so nodes F1, F3 and F4 (shown at 1600) can be created as children 1610 of the root A1 1605, representing the hierarchical structure of the colon 1500. On the same level of an exemplary pocket tree 1600 are pockets of one type only (fluid or air). The children of the air root pocket A1 1605 are all fluid pockets 1610. The children of these pockets are all air pockets 1615, and so on. Different seeds will create different pocket trees, but the location of the starting seed, in an exemplary embodiment, is arbitrary.

The trial segmentation, such as that performed at 222 (FIG. 2A), may produce a "leaky segmentation." That is, areas may be incorrectly segmented as belonging to a target anatomical structure which are actually outside the anatomical structure-leakage. When a given fluid pocket is discovered as containing leakage it means that the pocket extends beyond the boundaries of the structure to be segmented. When this occurs, the pockets below the "leaked" pocket may be deleted without the need for them to be separately checked for signs of leakage, as they can also be assumed to reside outside the target anatomical structure.

The pocket tree can be used to remove leaked regions from an image. Because the nodes in the pocket tree correspond to regions in the trial segmentation, the pocket tree can be processed to determine which regions should be removed (e.g., via pocket tree trimming) from the resegmented image. Removing or deleting a node from the pocket tree results in the corresponding region being removed from the resulting resegmented image. Or, regions can simply be removed from the image without removing from the tree. Similarly, removing leakage from an image can be done by deleting leaked regions, denoting leaked regions as leaked (e.g., as not to be considered when detecting anomalies of interest), or creating a new image without the leaked regions.

For example, if pocket F6 1520 in an digital representation of the colon 1500 was discovered to extend outside the colon itself, then pockets corresponding to nodes below F6 1620 in the pocket tree 1600 can be safely removed from the resegmented image. In the example above, that would be pockets corresponding to nodes A4 1630, and F7 and F8 1640.

EXAMPLE 22

Exemplary Method to Determine Leakage

Figure 17:
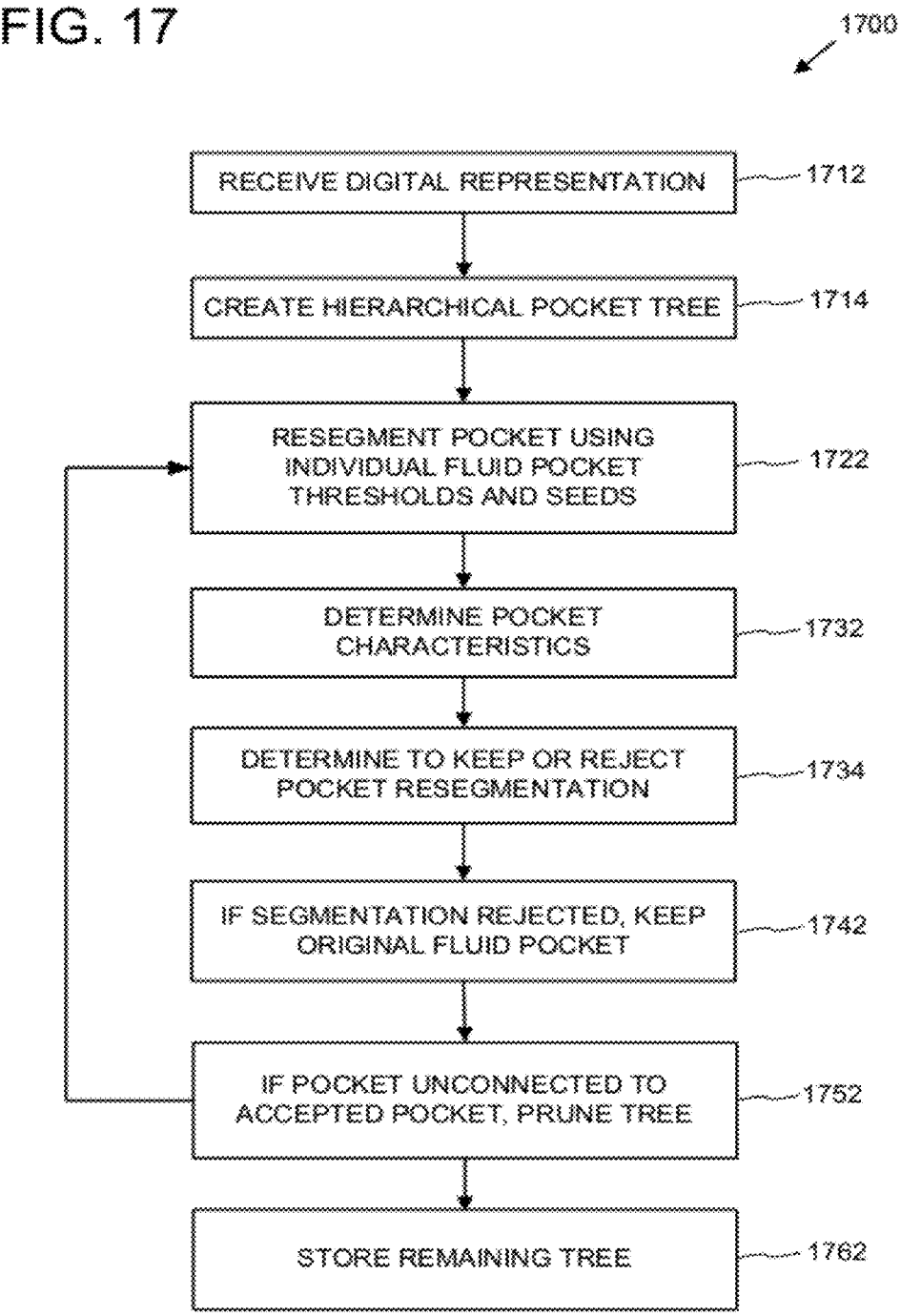
FIG. 17 is a flowchart showing an exemplary method to create and prune a pocket tree.

FIG. 17 shows an exemplary method 1700 for determining leakage using a pocket tree, such as the pocket tree shown in FIG. 16 at 1600. The method 1700 can be performed, for example, by the system 800 of FIG. 8.

At 1712, a digital representation is received. This representation, in an exemplary embodiment, comprises, at a minimum, a threshold and seed for each pocket which will be used in the pocket tree 1600 (FIG. 16), such as determined in the system 1300 shown in FIG. 13.

At 1714, a pocket hierarchy is created. An example of such a pocket hierarchy is shown in FIG. 16. An exemplary embodiment chooses the pocket with the initial seed as the root of the pocket tree, such as that shown at 1505 in FIG. 15, used to perform the trial segmentation, such as is done at 222 (FIG. 2).

This pocket tree creation can be based on information of connectivity previously determined, for example, the jump boundary 628 and the feature boundary 630 of FIG. 6. Individual pockets are organized into a hierarchical tree, with, in an exemplary embodiment, a root given by the pocket tree in which a starting seed for a segmentation was located.

At 1722, a fluid pocket representation is resegmented using its individual fluid pocket threshold, such as the threshold determined at 1336 in FIG. 13. In an illustrative embodiment, the pocket represented by the root of the pocket tree 1605 (FIG. 16) is not resegmented, as it is an air pocket. However, pockets F1, F3 and F4 are resegmented using the threshold and seed previously determined, such as at FIG. 13. In an exemplary embodiment, the threshold is represented by $T_{AFB}(m,n,j)$ and the seed is represented as $S_{AFB}(m,n,j)$. When the new segmentation of the fluid pocket is complete, the characteristics of the fluid pocket are determined 1732.

One determined characteristic is whether resegmenting using the tailored threshold has produced multiple pockets within what was formerly a single pocket. Multiple pockets can be determined here using the method 1300 shown in FIG. 13. An example of a single pocket which splits into multiple pockets after the individual segmentation 1722 using a tailored threshold is shown in FIGS. 11B and 11C. In FIG. 11B, a fluid pocket 1124 is shown which has a fold extending into the lumen, but which does not touch the air-fluid boundary, as shown in the surface voxel representation of the air-fluid boundary 1126. FIG. 11C 1128 shows the fluid pocket boundary after resegmentation with a tailored threshold. Thresholding with the tailored value produced a thicker structure wall, such that the fold 1134 now touches the air-fluid boundary, the voxel representation of which is shown at 1136. This breaks the formerly-single pocket up into two pockets, with corresponding boundaries AFB(m,n,1) 1130 and AFB(m,n,2) 1132.

Another characteristic determined is the volume of the fluid. The volume of the fluid pocket resegmented here, using a tailored threshold, is expected to be lower than the fluid pocket segmented with a generalized threshold, for example using the method 222 of FIG. 2A.

At 1734, it is determined whether or not the resulting resegmented fluid pocket representation has produced a better representation than the original trial segmentation (222 of FIG. 2A) of the fluid pocket, and so should replace the initial trial segmentation (222 of FIG. 2A) fluid pocket representation, or if the initially segmented fluid pocket representation (222 of FIG. 2A) should be kept. If the first trial segmentation fluid pocket is accepted it means that the result of the first segmentation (222 of FIG. 2A) should be kept. However, if the result of the resegmentation 1722, is accepted, then the results from the first segmentation 222 (FIG. 2A) should not be retained.

In some embodiments, the resultant volume $V(T_{AFB}(m,n,j)) < V(T_{FLUID})$ because the locally estimated threshold $T_{AFB}(m,n,j) > T_{FLUID}$. A relative volume change $p(m,n,j)$ is defined as:

$$\rho(m, n, j) = \frac{(V(T_{FLUID}) - V(T_{AFB}(m, n, j)))}{V(T_{FLUID})} \quad (1)$$

This relative volume change is used to make the decision whether or not to accept or reject the result of the previous segmentation at 1734. If a predetermined condition indicating that the segmentation at 1722 is more accurate than the initial segmentation, such as the one at 222 in FIG. 2, then this segmentation 1722 will be saved. Otherwise, at 1742, the original pocket segmentation 222 (FIG. 2A) is retained.

In an exemplary embodiment, if one of the following three conditions is fulfilled, then the representation is accepted, otherwise it is not.

1) $V(T_{FLUID}) > 30.5$ cc (~50,000 voxels) and $p > 0.95$;
2) $0.25 < p < 0.95$;
3) $p < 0.95$ and $pV(T_{FLUID}) > 91.6$ cc (~150 000 voxels)

For a given (m, n) air-fluid pair the procedure is repeated for pockets found within an initial fluid pocket, such as those determined by the method 1300 in FIG. 13. In an exemplary representation, the procedure is repeated for all $j=1, \ldots, J_{AFB}$.

The process from 1722 then repeats. If for any j the result of the segmentation 1722 is rejected, then the loop over j terminates and the whole original fluid pocket is kept while the air pockets directly connected to it are added to the pruned tree.

If the results of $J_{AFB}$ segmentations are accepted, then for every j, voxels (or pixels, etc.) located at $[x, Y_D(x, z), z]$ are checked, where [x, z] belongs to a given AFB(m,n,j).

At 1752, it is determined if a given pocket has at least one component (voxel, pixel, etc.) which connects to a previously-determined valid pocket. If so, then the pocket is saved. Otherwise, the pocket is pruned. In an exemplary embodiment, if, for any j, there is at least one component such as a voxel which is in the region of accepted segmentation, then the current (mth) air pocket is added to the pruned tree, or not pruned from an existing tree, etc. Otherwise, the mth air pocket is not accessible from the nth fluid pocket and is deleted, along with its descendent pockets on the pocket tree.

It should be mentioned that the tree analysis and resultant leakage removal is invariant with respect to the location of the starting seed for the segmentation. Differently located seeds will yield a different tree, in that it will have a different root and the hierarchical relationship will be, thus, different; the analysis, however, will be the same. It could be that the anatomical feature has a collapsed section that is not composed of air and fluid pockets. In such a case, the technique must be repeated for individual non-collapsed sections.

EXAMPLE 23

Exemplary Screen Shots Showing Trimming the Pocket Tree Due to Leakage

Figure 18A:
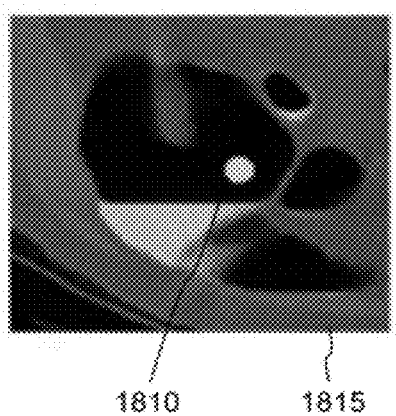
Figure 18B:
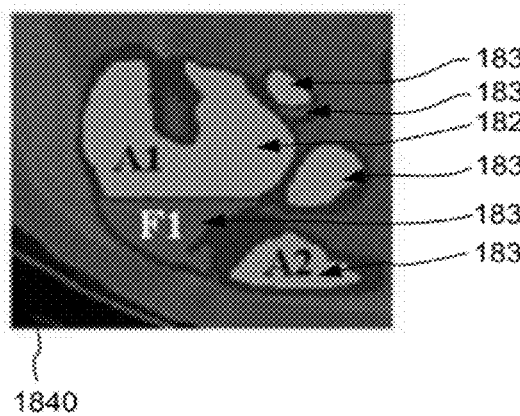
Figure 18C:
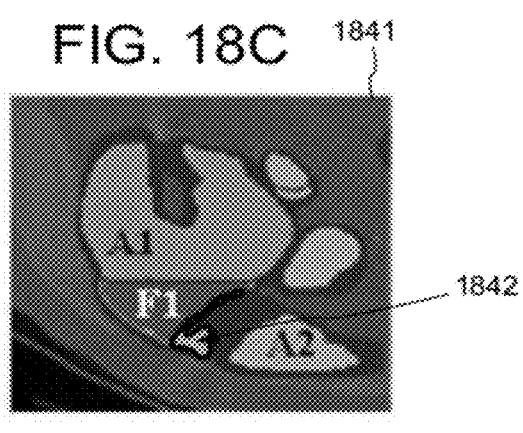
Figure 18D:
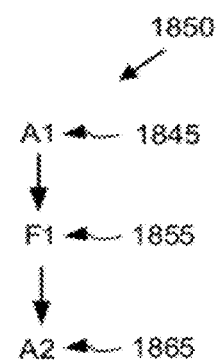

Screen shots of an exemplary depiction of a method of trimming a pocket tree representing aspects of a digital representation of an anatomical structure due to leakage are shown in FIGS. 18A-C. A pocket tree which can be used to represent the structure of FIGS. 18A-C is shown in FIG. 18D.

FIGS. 18A-C show three different stages of at least an embodiment of pocket tree trimming. FIG. 18A at 1815 shows the original digital representation of a fluid pocket and two air pockets such as the digital representation 112 shown in FIG. 1. The starting seed for a first segmentation is shown at 1810. FIG. 18B at 1840 shows a version of the digital representation after the digital representation has been segmented using a global threshold for air and fluid, having three pockets: an air pocket A1 1825, a fluid pocket F1 1830, and an air pocket A2 1835. Pockets 1836-1838 are descendents of other pockets. FIG. 18D at 1850 shows a pocket tree constructed for the digital representation 1840, with A1 1845 corresponding to the air pocket A1 1825, F1 1855 corresponding to the fluid pocket F1 1830, and A2 1865 corresponding to the air pocket 1835. It can be seen that the fluid pocket F1 1830 is a child of the air pocket A1 1825, as fluid pocket F1 1830 touches air pocket A1 1825. Similarly, the air pocket A2 1835 is a child of F1 1830, as A2 1835 touches F1 1830.

FIG. 18C 1841 shows the result of a segmentation with a threshold tailored specifically for pocket F1, such as the segmentation at 1722 in FIG. 17, creating a smaller pocket. Here, the area in F1 1842 that was not resegmented is shown outlined in black. Pockets below F1 1855 on the pocket tree (e.g., air pocket A2 1865) would not be resegmented, as the bottom of the pocket has been determined to be leakage. For example, if A2 1835 of FIG. 18B had children pockets on the pocket tree 1850 of FIG. 18D, they also would not be included in a final digital representation of the anatomical structure.

EXAMPLE 24

Exemplary Method to Determine Leakage

FIG. 19 shows an exemplary method 1900 for determining leakage using a pocket tree, such as the pocket tree shown in FIG. 16 at 1600. The method 1900 can be performed, for example, by the system 800 of FIG. 8.

At 1912 a digital representation can be received. This representation can comprise the pocket tree 1600 of FIG. 16 and information about the virtual anatomical structure such as the digital representation 912 (FIG. 9). The pocket tree is useful to identify leakage.

At 1944, it can be determined if type A leakage has occurred. Type A leakage is a mixture of leaked air and leaked fluid. This type of leakage can be detected by checking for the existence of closed loops in a pocket tree. As shown with reference to FIGS. 20A-C, if type A leakage is discovered, by, for example, discovering a closed loop in a pocket tree, the leaked pocket can be deleted. An example of type A leakage is shown with reference to example 25.

At 1946, it is determined if a pocket has type B leakage. Type B leakage is leaked fluid only. This leakage can be detected by determining the number of discrete pockets associated with a given air-fluid boundary, as, for example, with reference to FIG. 13. In most cases, there is only one discrete fluid pocket per air fluid boundary, as shown at 1102 in FIG. 11A. If a given fluid pocket has more than one air-fluid boundary, as shown at 1180 in FIG. 11G, this may indicate type B leakage in an anatomical structure. This occurs when two distant parts of the same air pocket are connected with the same fluid pocket. In other words, the nth fluid pocket may contain a leaked segment when it is possible to jump from the mth air pocket to the nth fluid pocket via one AFB(m,n,j) and later return back to the same mth air pocket through another AFB(m,n,l) where l≠j.

Type B leakage does not create a closed loop within a tree, and so cannot be used to detect leakage by merely examining the topology of the pocket tree. Type B leakage can also be thought of as occurring when the segmentation procedure segments across a structure wall, segmenting areas outside of the desired anatomical structure.

In some circumstances, the existence of more than one discrete pocket within a single air fluid boundary does not indicate a real leakage, as two apparently disconnected air fluid boundaries may be parts of one large air fluid boundary which could not be entirely segmented in the x, z plane because of noise, a fold touching the air-fluid level, or some other reason.

One way to determine if the existence of more than one discrete pocket within a single air fluid boundary is to check the distance between voxels (or pixels, etc.) between the two pockets, as actually different pockets can have a distance larger than a certain threshold. The specific threshold used depends on a variety of factors. An example of type B leakage is shown with reference to example 26.

At 1948, it is determined if type C leakage has occurred. This type of leakage arises when a part of a fluid pocket contains a correctly segmented anatomical structure region, such as a colonic region, while another part of the same fluid pocket comprises a leaked segment of a region that does not belong to the anatomical structure, such as a portion of the small bowel. If this fluid pocket has only one air fluid boundary with its adjacent air pocket, and the leaked segment does not give rise to a pocket tree with a closed loop, then this type of leakage cannot be detected by the type A and the type B technique. Rather, large differences in volumes must be noted between a first trial segmentation and a subsequent resegmentation such as shown in the method 200 described in FIG. 2. An example of type C leakage is shown with reference to example 27.

At 1950, the digital representation is trimmed, if leakage has been discovered. At 1952, the digital representation is stored.

EXAMPLE 25

Exemplary Schematic Diagrams Showing Type A Leakage

FIGS. 20A-D show exemplary schematic diagrams showing type A leakage. This type of leakage can be detected by checking for the existence of closed loops in a pocket tree. If there are a pair of different paths which start from the same pocket and later meet again in another pocket, then a closed loop exists, which violates the geometrical property of a continuous anatomical structure comprised of fluid and air pockets. Existence of such a loop indicates that leakage has occurred, and this conclusion can be made without otherwise examining segmentation results.

Figure 20A:
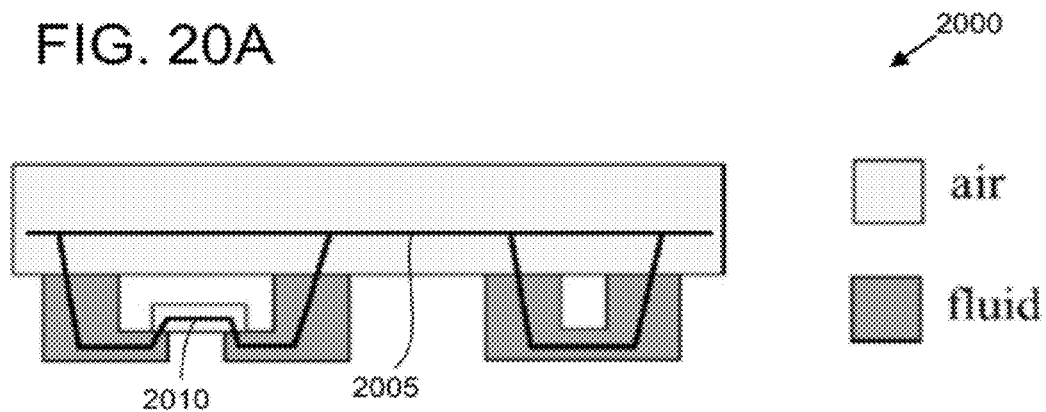
FIGS. 20A-D are schematic representations showing type A leakage.
Figure 20B:
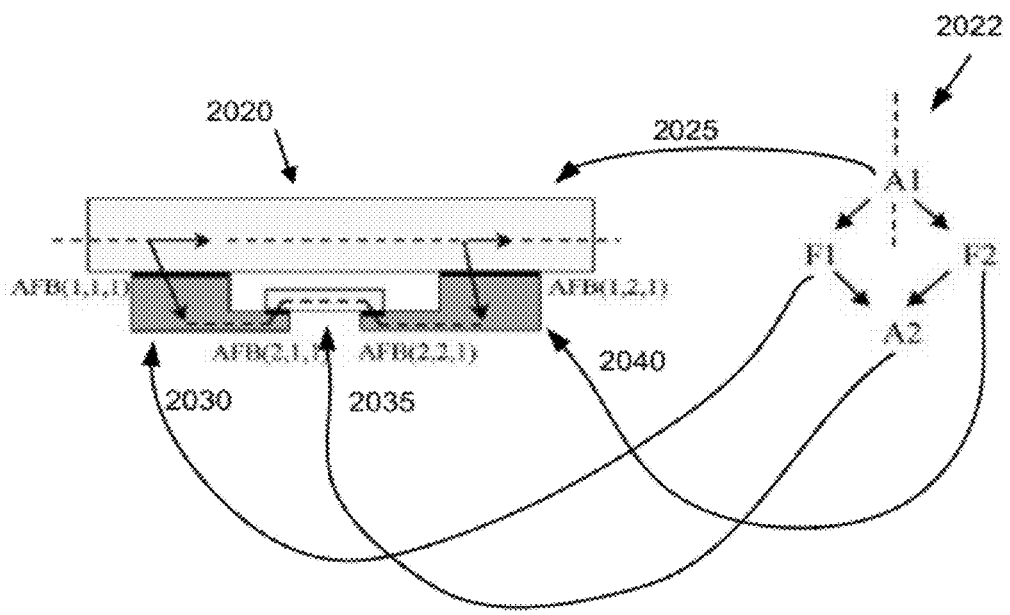

FIG. 20A at 2000 shows a representation of an anatomical structure with a closed loop, and FIG. 20B shows an example of a pocket tree representing such a closed loop. The centerline of the anatomical structure 2005 is flawed because an air pocket 2010 lies between two fluid pockets. In FIG. 20B, the pocket tree 2022 generated from such an air-fluid pocket relationship is shown. The air pocket A2 2035, shown at 2010 in FIG. 20A is connected to both F1 2030 and F2 2040, both of which are themselves connected to air pocket A1 2025, forming a closed loop (A1-F1-A2-F2-A1) in the pocket tree.

Figure 20C:
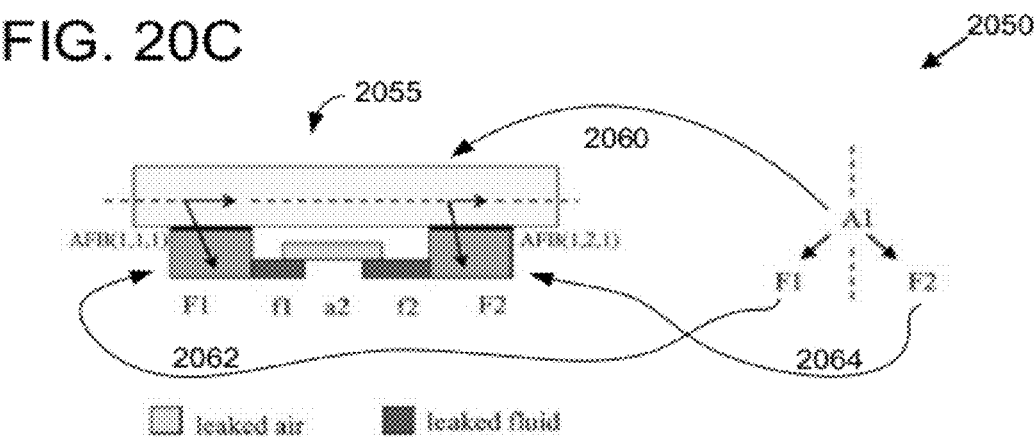

FIG. 20C at 2055 shows the result after the fluid pockets F1 and F2 have been resegmented using tailored thresholds, as, for example, can be done at 1722 in FIG. 17. After resegmentation F1 2062 lost the portion of its fluid pocket represented by f1, and F2 2064 lost the portion of its fluid pocket represented by f2, leaving the result that the air pocket A2 is no longer connected to either F1 or F2, and so is deleted. This produces the pocket tree 2050, which no longer comprises a closed loop, as the pocket A2 2035 (FIG. 20B) has been removed.

Figure 20D:
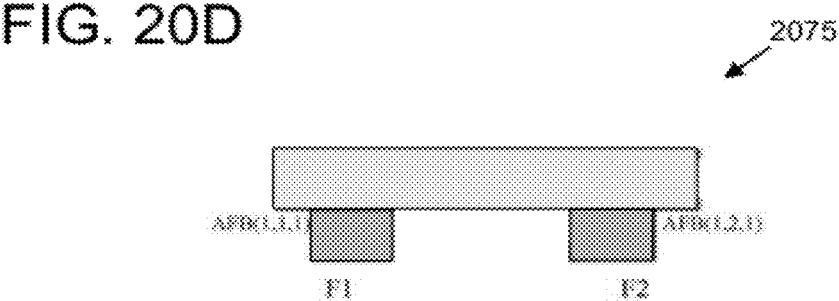

FIG. 20D at 2075 shows the results after the leaked portions (all of air pocket A2 and portions of fluid pockets F1 and F2) of the virtual anatomical structure were removed.

EXAMPLE 26

Exemplary Schematic Diagrams Showing Type B Leakage

Figure 21A:
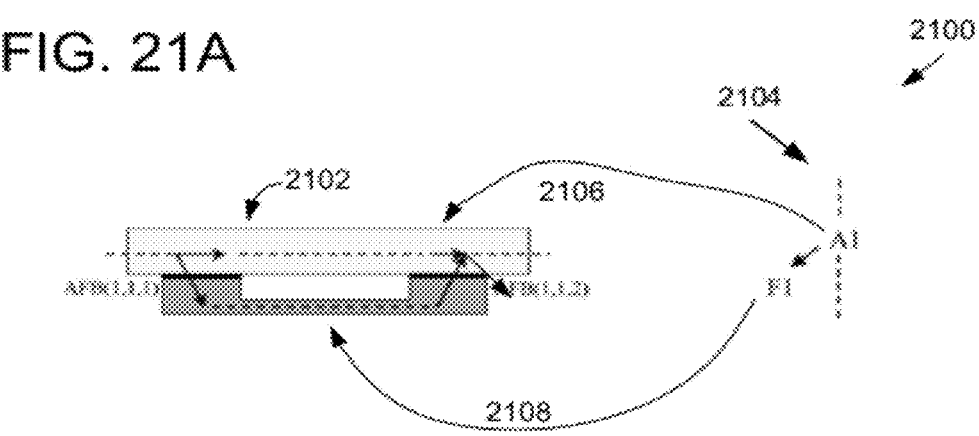
FIGS. 21A-B are schematic representations showing type B leakage.
Figure 21B:
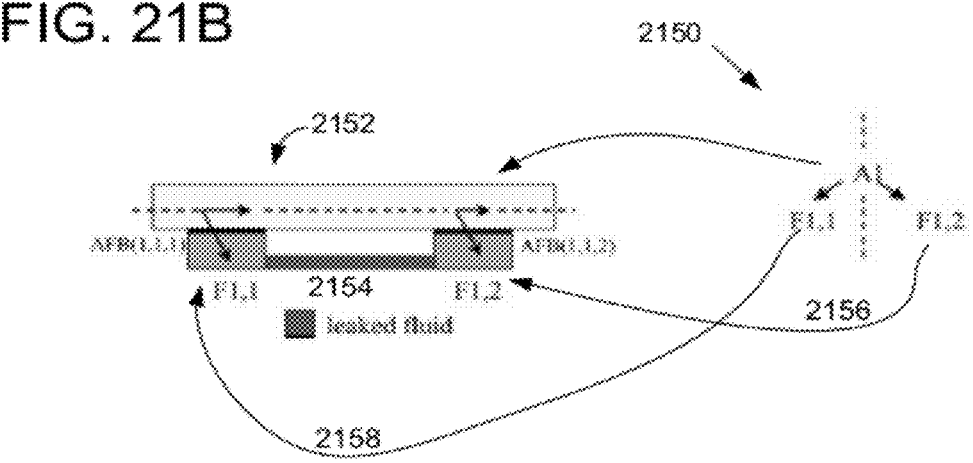

FIGS. 21A-B show exemplary schematic diagrams showing type B leakage. Type B leakage is leaked fluid only. This leakage can be detected by determining the number of discrete pockets associated with a given air-fluid boundary, as, is done, for example, using method 1300, with reference to FIG. 13.

The diagram 2100 of the leaked fluid pocket of FIG. 21A displays schematically 2102 and by use of a pocket tree 2104 the nature of a pocket with type B leakage after a first segmentation, such as, for example the trial segmentation performed by system 222 of FIG. 2A. Fluid pocket F1 2108 has two distinct areas within the air-fluid boundary—AFB(1,1,1) and AFB(1,1,2)—connected to the same air pocket A1 2106.

FIG. 21B at 2150 shows the results after the fluid pockets F1 and F2 have been resegmented using tailored thresholds, as, for example, can be done at 1722 in FIG. 17. Fluid pocket F1,1 2158 and fluid pocket F1,2 2156 were both resegmented each with a tailored threshold and starting seed. The segment 2154 was not considered a portion of either pocket after being resegmented with a tailored threshold, so has been relabeled as leakage, and therefore, will be trimmed, such as is done at 1950 (FIG. 19). As a result, the segment 2154 will not be included in the resegmented virtual anatomical structure.

EXAMPLE 27

Exemplary Schematic Diagrams Showing Type C Leakage

Figure 22A:
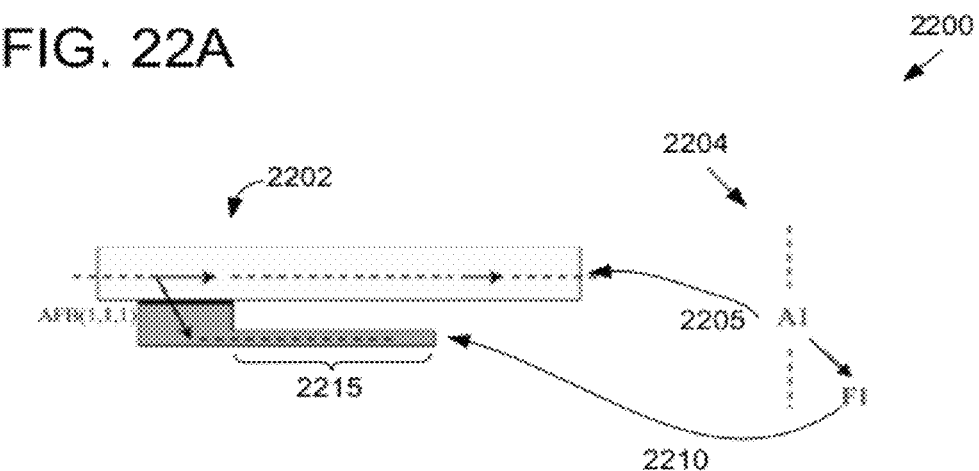
FIGS. 22A-B are schematic representations showing type C leakage.
Figure 22B:
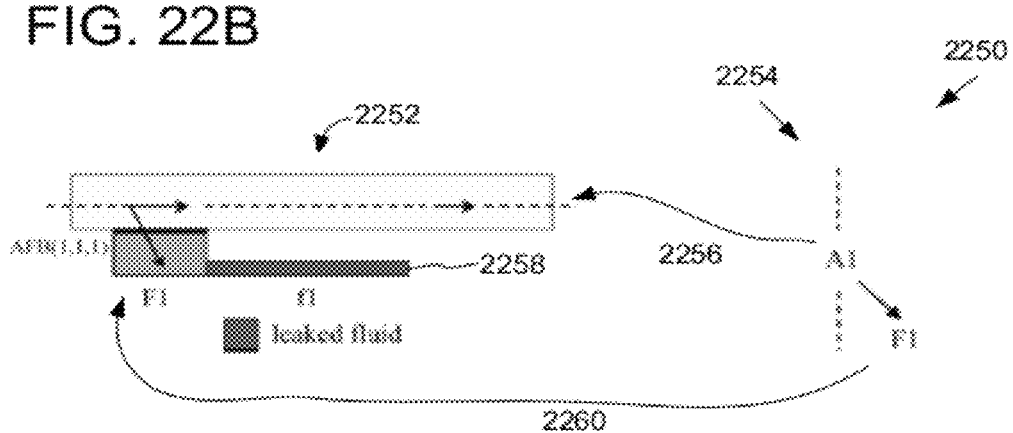

FIGS. 22A-B are exemplary schematic diagrams showing type C leakage. FIG. 22A at 2200 shows a schematic representation of type C leakage 2202 and the corresponding pocket tree structure 2204 after a first segmentation, such as, for example the trial segmentation performed by system 200 of FIG. 2A. This type of leakage can be detected by determining a large volume difference between the volume of a pocket segmented with an initial leaky threshold and the same pocket segmented with a tailored threshold.

The air pocket 2205 has an attached fluid pocket 2210 which contains an extra area of fluid 2215 within fluid pocket 2210, which could otherwise help determine if the area 2215 is leakage.

FIG. 22B at 2250 shows a schematic representation of type C leakage 2252 and the corresponding pocket tree structure 2254 after the fluid pocket F1 2260 connected to air pocket A1 2256 has been resegmented using a tailored threshold, as, for example, can be done at 1722 in FIG. 17. A portion of the fluid in F1 2210 in FIG. 22A has been determined to be leaked, as shown at f1 2258. As a result, the leaked fluid f1 2258 is not included in the resegmented virtual anatomical structure

EXAMPLE 28

Exemplary Level Set Techniques

In any of the examples herein using level set techniques, any of a variety of level set techniques (e.g., Laplacian and the like) can be used.

EXAMPLE 29

Exemplary System Using Equalization, Gap Filling, and Level Set Segmentation to Determine an Enclosing Boundary FIG. 23 shows an exemplary system 2300 for using fuzzy connectedness, gap filling, and level set segmentation to better determine an enclosing boundary for an anatomical structure.

A digital representation 2310 is received. For example, this digital representation 2310 can be a representation of a virtual anatomical structure which has already been segmented and pruned, as is done, for example, in the method 1700 shown in FIG. 17. Other exemplary embodiments receive other digital representations, such as for example, the one shown at 275 in FIG. 2B.

At 2320, an equalizer transforms the digital representation. The equalizer sets the values of all or substantially all the voxels (or pixels) within the interior of a virtual anatomical object to the same or a substantially similar value. For example, an exemplary anatomical structure is a colon filled with air and fluid pockets, such as is shown with reference to FIG. 15. At a minimum, the air pockets and the fluid pockets are represented in the digital representation 2310 with different values. The equalizer sets the fluid and air values to a substantially similar value. In an exemplary embodiment, the fluid values are set to the air values; in another exemplary embodiment, the air values are set to the fluid values. In yet another exemplary embodiment, the fluid and air values are set to a different value altogether.

The equalizer 2320 can use fuzzy connectedness segmentation to perform the equalization. In an exemplary embodiment, fuzzy connectedness segmentation is performed for pockets accepted (or not deleted from) a pocket tree, such as the pruned pocket tree 845 in FIG. 8. Segmentation can be limited to bounding boxes, such as the one described with reference to 1024 in FIG. 10. In an exemplary fuzzy segmenter, the strengths of all paths connecting voxel pairs p, q are calculated; only voxels connected to a starting seed by paths whose strength exceeds a predefined threshold $T_{FUZZ}$ are kept. The strength of the individual path is calculated as the smallest fuzzy affinity between two consecutive voxels on the path where fuzzy affinity between voxels p and q may be defined as:

$$f(p, q) = f_0 \exp\left(-\frac{\Delta^2(p, q)}{2\sigma^2}\right)$$

where $\Delta(p, q)=(I_p+I_q)/2-\mu$, $I_p$ and $I_q$ are CT attenuation of voxels p and q, and $f_0$ is the maximum strength. $\mu$ and $\sigma$ are the mean and standard deviation of CT attenuation calculated individually for pockets originally determined, for example at 722 with reference to FIG. 7, and corrected, when needed by a pruning procedure, such as that shown, for example, at FIG. 17.

After accepted pockets are processed, the union of the subregions resulting from separate fuzzy connectedness segmentations is formed and passed to the next step. For any pocket type, that is, for fluid with high CT attenuation or air with low CT attenuation, the fuzzy connectedness values are mapped on the same interval $[0, f_0]$. Different values of fuzzy connectedness assigned to different voxels reflect differences in the strength of binding to a starting seed. Contrary to a standard threshold-based region-growing procedure, where a given voxel is added to segmented neighbors based solely on its attenuation, fuzzy connectedness adds voxels based on non-local information, as well.

The equalizer 2320 generates an equalized image, which may be a fuzzy connectedness image 2330 of the anatomical structure which may contain gaps between air and fluid regions. It may also contain occasionally isolated small spots where local values of equalization are below a threshold, such as the threshold $T_{FUZZ}$.

A gap filler 2340 may be employed to fill the gaps left in the anatomical structure representation 2330 to produce a three-dimensional representation with fewer gaps 2350. An exemplary system to fill the gaps employs a two-dimensional region growing procedure. The procedure is applied to the equalized image and only one threshold is used, for example, $T_{FUZZ}$, which may have the same threshold value used at 2320, or may have a different value. The new two-dimensional region growing does not rely on the previously air fluid boundary AFB(m,n,j), such as shown with reference to the drawings of FIG. 11C, as some of the (m, n) air-fluid connections could have been deleted by the pruning process previously discussed, and so may no longer exist in the equalized image. In addition, for a given air-fluid boundary, some of the individual disjoint pockets may merge during the equalizer 2320 (such as a fuzzy connectedness segmentation). Therefore, an independent starting point $[x_0, z_0]$ is determined independently by finding a point satisfying the following conditions:

$$I_{FUZZ}(x_0, y_{0,a}, z_0) > T_{FUZZ}, I_{FUZZ}(x_0, y_{0,f}, z_0) > T_{FUZZ}.$$

and vertical separation $y_{0,f} - y_{0,a} \leq 6$. Other implementations can use different conditions. Then, a test along the y direction starts for each $[x_k, z_k]$ from the nearest neighborhood of the starting point. If the vertical separation condition holds and $$I_{FUZZ}(x_k, y_{k,a}, z_k) > T_{FUZZ}, I_{FUZZ}(x_k, y_{k,f}, z_k) > T_{FUZZ}.$$

then $[x_k, z_k]$ is added to $AFB_{FUZZ}(m,n,j)$. Then, for every [x, z] belonging to an identified $AFB_{FUZZ}(m,n,j)$, voxels with fuzzy connectedness values $I_{FUZZ}(m,n,j)$ below a threshold $T_{FUZZ}$ are replaced with values linearly interpolated between $I_{FUZZ}(x, y_a, z)$ and $I_{FUZZ}(x, y_f, z)$, where $I_{FUZZ}(x, y_a, z) > T_{FUZZ}, I_{FUZZ}(x, y_f, z) > T_{FUZZ}$. After the gaps between air and fluid pockets are filled, isolated holes in fuzzy space are also filled by a flooding technique. That is, voxels inside a bounding box but outside of a segmented pocket are identified, and remaining voxels which have fuzzy connectedness values below a threshold are replaced with a new value $T_{FUZZ}+1$. This prevents a boundary wall from being built in spurious places, such as inside an air or fluid pocket but away from an anatomical wall.

A segmenter, such as a level set segmenter, 2360, which can be a Laplacian level set segmenter, then takes as input the three-dimensional representation with fewer gaps 2350 (in some implementations) and performs level set segmentation to give a more accurate representation of the anatomical structure, which may be an optimized three dimensional representation 2370.

In an exemplary implementation, threshold $T_{FUZZ}$ in fuzzy space defines an isosurface which is used as the starting surface for level set segmentation. Its purpose is to calculate a smoother version of an anatomical surface, which in an exemplary embodiment, is a colonic wall. In a framework of level set methods, the initial surface is embedded in a higher dimensional function $\Psi(x, y, z, t)$, whose spatio-temporal evolution is governed by the partial differential equation $$\frac{\partial \psi}{\partial t} = -S(x, y, z) \|\nabla \psi\| \qquad (3)$$

and whose speed function S(x, y, z) is given by:

$$S(x, y, z) = \alpha - \beta Z(x,y,z)\kappa \qquad (4)$$

where the function Z is a spatial modifier of the mean curvature $\kappa$. Parameters $\alpha$ and $\beta$ measure relative strength of the propagation and smoothing terms. Here the function Z (which can serve as any feature derived from fuzzy connectedness space) can be used as a Laplacian. If the starting surface is close to its asymptotic limit, then equation (3) converges quickly to the desired solution. At any time t, the corresponding surface $\Gamma$ can be extracted from the higher dimensional level set function as $\Gamma(x, y, z, t) = \{\Psi(x, y, z, t) = 0\}$. In a typical implementation, a desired surface is $\Gamma(x, y, z, t)$, 2370, with t being sufficiently large (i.e., at or near convergence). Numerically, this can be performed by solving equation (3) first, and then extracting an isosurface, 2380, by means of a marching cube algorithm in level set space for a zero threshold, such as is described at W. Lorensen and H. Cline, "Marching cubes: A high resolution 3D surface construction algorithm," *Comput. Graphics*, vol. 21, pp. 321-331, 1987. In an exemplary embodiment, the Laplacian zero level set procedure described at L. Ibanez, W. Schroer, L. Ng, and J. Cates, *The ITK Software Guide*, Clifton Park, N.Y.: Kitware, Inc., 2003 can be used. An optimized surface 2390, which may include an optimized boundary wall, is received from the isosurface extractor 2380.

In an alternative implementation, the isosurface extractor, 2380, can be applied directly to the three-dimensional representation with fewer gaps, 2350. In this case, the resulting boundary wall, 2390, will be less smooth than in the case where the level set segmenter 2360 is used. This alternative implementation may be desirable for finding smaller anatomic abnormalities that could be obscured by oversmoothing.

EXAMPLE 30

Exemplary Screen Shots Showing Pruning to Determine a Three-Dimensional Digital Representation Screen shots of views of an exemplary depiction of a method of pruning a pocket tree to determine a digital representation of an anatomical structure are shown in FIGS. 24A-D. An original CT image is shown at 2410 in FIG. 24A. The image is of a colon with air and fluid pockets, the air pockets being significantly darker than the fluid pockets.

Figure 24A:
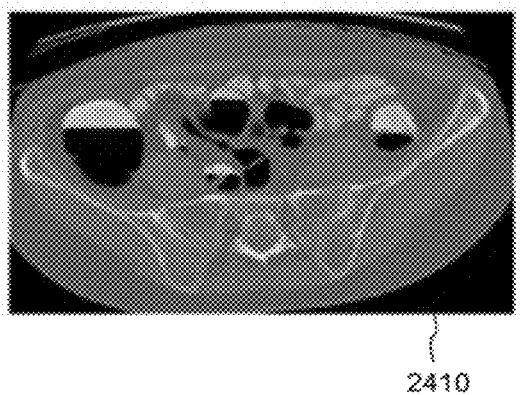
Figure 24B:
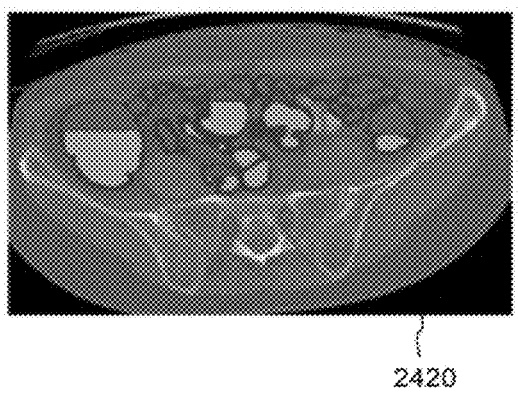

FIG. 24B at 2420 shows a digital image of the colon after a first segmentation, such as that performed by the trial segmenter 270 in FIG. 2B. The orange areas are voxels labeled as fluid, while the violet voxels are labeled as air. The dark purple voxels are the wall layer, i.e., voxels which are in contact with a voxel labeled orange or violet but whose value falls between the air threshold and the fluid threshold.

Figure 24C:
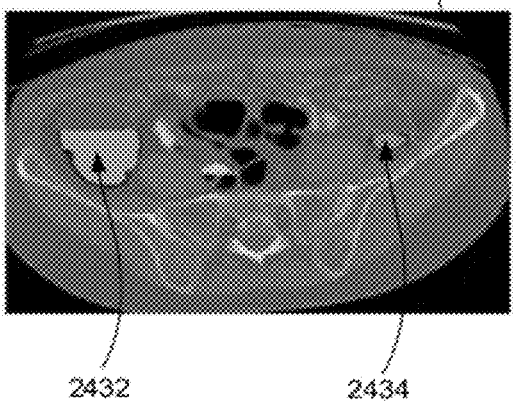

FIG. 24C at 2430 shows the digital image after individual fluid pockets are extracted, as for example, using system 600 in FIG. 6. As in FIG. 24B, the orange areas indicate fluid. The violet voxels 2432 indicate one air pocket, while the green voxels 2434 indicate another air pocket connected by the same fluid pocket. Other fluid and air pockets labeled in FIG. 24B are not shown in FIG. 24C.

Figure 24D:

FIG. 24D shows the image after resegmentation, as is done, for example, in the method 1700 of FIG. 17. Orange is accepted fluid after pruning, violet indicates accepted air regions, purple indicates wall areas, while the yellow indicates leakage. Note that also there are small spots of yellow in accepted orange fluid pockets: this is because the orange areas are the result of segmentation with higher individually adjusted thresholds. So, not all old orange voxels from the segmentation shown at 24B survived this higher thresholding even if they were located in fluid pockets which were eventually accepted.

EXAMPLE 31

Figure 25:
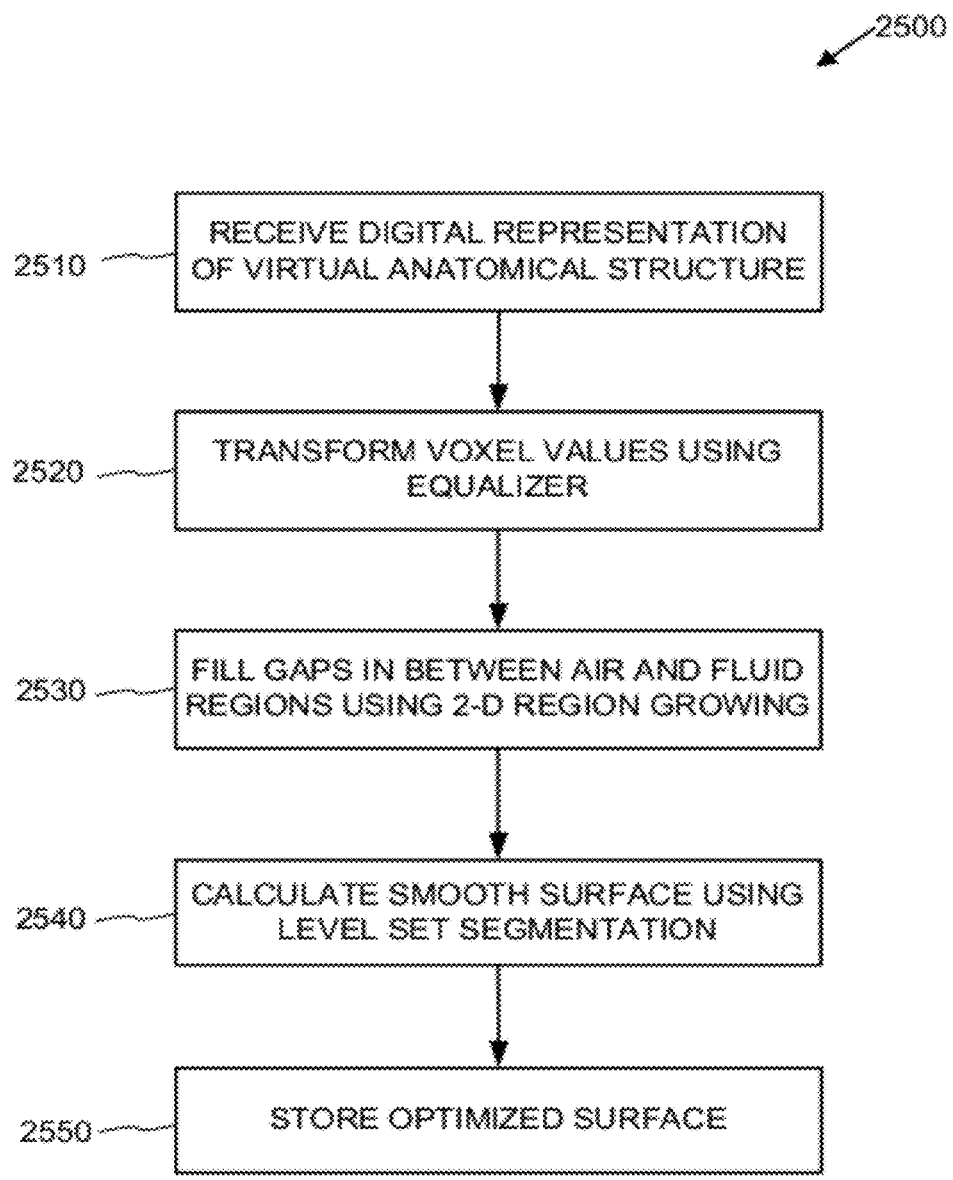
FIG. 25 is a flowchart showing an exemplary method to determine an optimized surface of a virtual anatomical structure by using a series of segmentation methods.

Exemplary System Using Fluid-Air Equalization, Gap Filling, and Level Set Segmentation to Determine an Enclosing Boundary FIG. 25 illustrates a method 2500 for using fluid-air equalization, gap filling, and level set segmentation to determine an enclosing boundary of a digital representation. At 2510, a digital representation is received.

For example, the digital representation 2510 can be received is a representation of an anatomical structure which has already been segmented and pruned, as is done, for example, in the method 1700 shown in FIG. 17. Other exemplary embodiments receive other digital representations, such as for example, the virtual anatomical structure with expected leakage found at 275 in FIG. 2B. The digital representation is expected to have at least two levels of intensity modeled. For example, in the virtual anatomical structure 275, the structure comprises both fluid pockets with a fluid threshold and air pockets with a separate air threshold.

At 2520, a transform is determined using a fluid-air equalizer to transform the voxel values. This equalizer can be a fuzzy connectedness segmenter. At 2530, gaps in the equalized image determined at 2520 are filled in using, in an exemplary embodiment, 2-D region growing. At 2540, a smooth surface is calculated at the boundary of the virtual anatomical object using, for example, level set segmentation. This controls smoothness of the entire surface in a way, acting in fuzzy space, that is blind to the particular type of media (for example, air or fluid) filling the lumen. This ensures that a classifier in a further procedure receives unbiased data regardless of whether an anomaly of interest (e.g., polyp candidate, polyp, or the like), for example, is in the air- or fluid-filled part of, for example, a colonic lumen. At 2550, the surface optimized at some combination of actions 2520, 2530, and 2540, is stored.

EXAMPLE 32

Figure 26A:
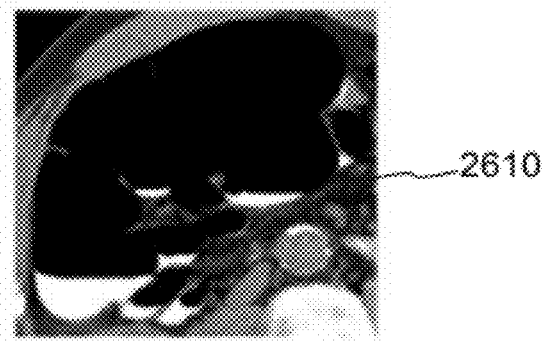
FIGS. 26A-C are screen shots showing a CT image of a colon and results of two sequential segmentations using exemplary embodiments described herein.
Figure 26B:
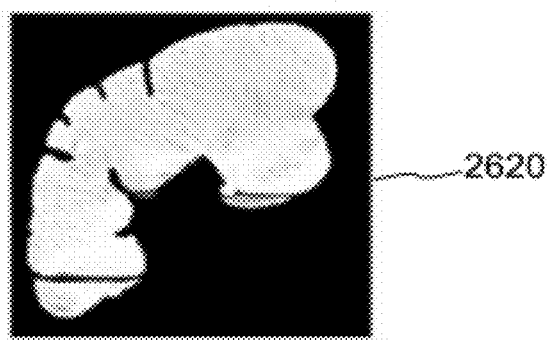
Figure 26C:
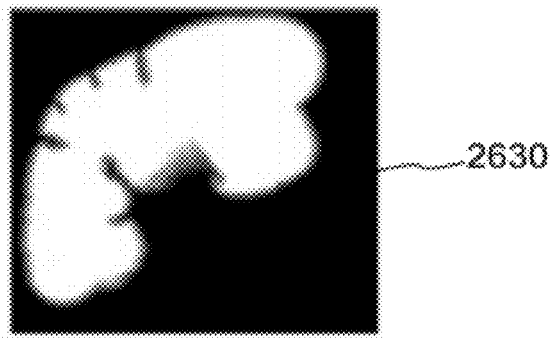

Exemplary Screen Shots Showing Using Multiple Segmentation Techniques To Determine a Boundary of a Digital Representation Screen shots of views of an exemplary depiction of a method of using multiple segmentation techniques to determine a digital representation of an anatomical structure are shown in FIGS. 26A-C. An original CT image 2610 is shown in FIG. 26A. The image is of a colon with air and fluid pockets, the fluid pockets being significantly whiter than the air pockets, which appear almost black. A representation 2620 generated by running a fuzzy connectedness segmenter on the image 2610 of FIG. 26A, (for example, the equalizer 2320 of FIG. 23) is shown in FIG. 26B. A representation 2630 generated by running a gap filler (for example, the gap filler 2340 of FIG. 23) and Laplacian level set segmentation (for example, the level set segmenter 2360 of FIG. 23) is shown at 2630 in FIG. 26C.

EXAMPLE 33

Figure 27A:
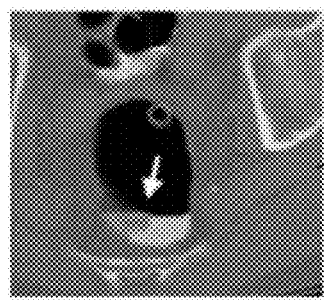
Figure 27D:
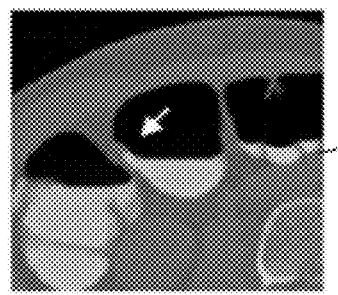
Figure 27B:
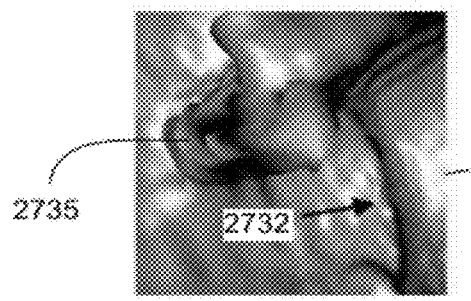

Exemplary Screen Shots Showing Results of Using Multiple Segmentation Techniques To Determine a Boundary of a Digital Representation Screen shots of views of an exemplary depiction of a method of using multiple segmentation techniques to determine a digital representation of an anatomical structure are shown in FIGS. 27A-F. An original CT image 2710 of a colonic wall around a polyp is shown in FIG. 27A. The location of a polyp of size 1.1 cm. is marked with a white arrow. FIG. 27B at 2730 shows the results after a first segmentation with a single threshold for air regions and a single threshold for fluid regions, such as that performed by the trial segmenter 270 of FIG. 2B. The colon surface is represented as an isosurface in an original CT attenuation space. The arrow 2732 points to the colonic wall adjacent to the air fluid boundary. As can be seen, the wall has a definite indentation at the air-fluid boundary, giving the possibility that anomalies of interest, such as polyps, could be missed. The blue and orange area 2735 indicate a polyp detected using CTCCAD (Computed-Tomography-Colonography-Computer-Aided-Detection.)

Figure 27E:
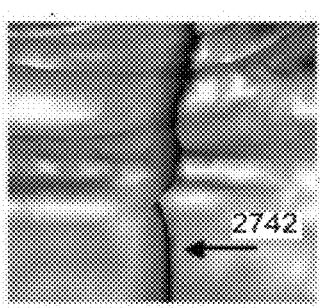
Figure 27C:
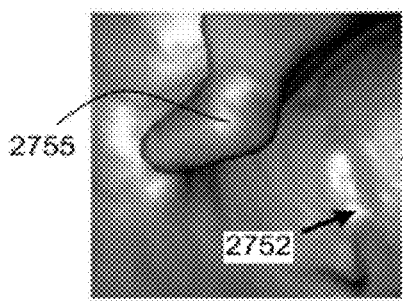

FIG. 27C at 2750 show the resulting image after using techniques taught herein including using multiple segmentation techniques such as those taught in system 2300 of FIG. 23. The screen shot shows the colon wall as an isosurface in level set space. Notice how the indented region 2752 corresponding to 2732 in FIG. 27B within the colon wall at the air-fluid boundary has been considerably smoothed. The polyp 2755, initially detected at 2735, has been considerably smoothed by the added segmentation steps.

Another original CT image 2720 of a colonic wall around a polyp is shown in FIG. 27D. The polyp, marked with a white arrow, is of size 0.8 cm. FIG. 27E at 2740 shows the results after a first segmentation with a single threshold for air regions and a single threshold for fluid regions, such as that performed by the trial segmenter 270 of FIG. 2B. The colon surface is represented as an isosurface in an original CT attenuation space. The arrow 2742 points to the colonic wall adjacent to the air fluid boundary. The air-fluid boundary can clearly be seen as a flaw in the colonic wall, which in this case has led to the polyp shown at 2720 being missed when CTC-CAD is used on the resulting image 2740.

Figure 27F:
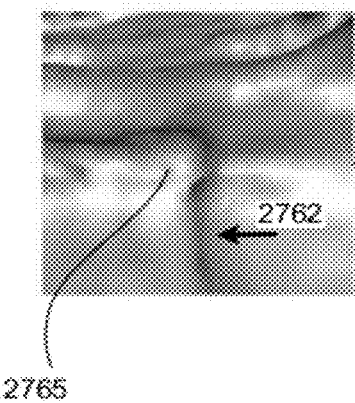

FIG. 27F at 2760 show the resulting image after using techniques taught herein including using multiple segmentation techniques such as those taught in system 2300 of FIG. 23. The screen shot shows the colon wall as an isosurface in level set space. Notice how the flawed region 2762 at the air-fluid boundary has been significantly repaired, which has allowed the polyp (the blue and orange areas) 2765 to be revealed, which was not found when employing segmentation using a single air threshold and a single fluid threshold as shown at FIG. 27E.

EXAMPLE 34

Exemplary Experimental Method

The CT Colonography data used in an experiment were obtained from 80 asymptomatic adults, and were performed at three different medical centers. The study was approved by the institutional review boards. Each patient had a contrast-enhancing fluid partially filling the colon. To input the fluid, each patient underwent a 24-hour colonic preparation that consisted of oral administration of 90 ml sodium phosphate, 10 mg bisacodyl, 500 ml of barium, (2.1% by weight) and 120 ml of diatrizoate meglumine and diatrizoate sodium given in divided doses. Every patient was scanned both supine and prone during a single breathhold. A four- or eight-channel CT scanner was used with section collimation of either 1.25 mm or 2.5 mm. The table speed was 15 mm/sec, and the reconstruction interval was 1 mm.

101 unique polyps were found by examining the scans. The polyps' sizes ranged from 0.3 to 3 cm. Polyps could be seen on the supine scan, the prone scan, or both scans, with a total of 183 polyp occurrences. 82 polyps could be seen on both scans, 9 could only be detected on the supine scan, and 10 could only be detected on the prone scan. Every polyp was manually segmented with the spatial coordinates of every segmented voxel written into a file. Of the 183 polyps, 96 were surrounded by air, 7 were totally submerged in fluid, with 80 partially in air and partially in contrast fluid. Computer segmentation using the technique described here was applied to all 160 CT scans.

Verification of the scans were done as follows: the total volume $V_k$ (air plus fluid) of the segmented colon was reported at three different checkpoints of the processing pipeline:

Checkpoint 1) after the initial threshold segmentation was run, ($V_1$)

Checkpoint 2) after pruning the pocket tree ($V_2$), and

Checkpoint 3) after level set segmentation ($V_3$).

In addition, every time a tree analysis detected the existence of leakage of type A (FIGS. 20A-C) or type B (FIG. 21A-B) a corresponding message was written into a log file.

For every scan the relative change between total colonic volume $V_{2,1}$ at checkpoint 2 (after pruning the pocket tree) and volume $V_{3,2}$ at checkpoint 3, where $V_k$ was considered the volume at checkpoint k, and where $V_{k,k-1} = V_k - V_{k-1}/V_k$.

The total data set was then separated into two categories: category I, where both $V_{2,1}$ and $V_{3,2}$ are less than 5%, and there is neither type A nor type B leakage; and category II where $V_{2,1}$ and $V_{3,2}$ are greater than 5% or there is leakage of any type. In category I, the small relative change may indicate one of two scenarios, one good, and one less so. One possible scenario is that the first threshold segmentation (checkpoint 1) was good enough for the entire colon to be segmented properly, and the rest of the procedure did not harm the good outcome. The other scenario is that the first segmentation yielded an incorrectly segmented colon, and the rest of the procedure failed to discover and fix this.

In category II, large relative changes in the volume may signal two possible scenarios: 1) there was leakage in the first threshold segmentation (of any of the types) which successfully identified by the remaining steps of the procedure, or 2) the first threshold was correct, and the rest of the procedure destroyed the prior good outcome. If the procedure is working properly, then cases where the first segmentation included leakage should have been caught and placed in category II.

Assessing the quality of the colon segmentation involved two steps: first correctly identifying any leaked or missing colon segments in the first segmentation step, and second, evaluating that the reconstructed colon wall is of sufficient quantity to discover abnormalities on it. To perform these assessing steps, visual inspection was used.

The quality of the computer segmentation described herein was assessed by randomly selecting 12 CT scans in each of the two categories (I and II) and visually inspecting them by both scrolling CT slices with segmented colon regions and by looking at the generated colon wall with a 3-D viewer.

In addition to the visual inspection, the spatial coordinates of known polyps were matched with the output of the colonic segmentation procedure. For this verification, the manually segmented ground truth polyps were manually dilated by two voxels and are used as landmarks to check if the portion of the colon adjacent to each polyp was segmented. This was done by computing the overlap between the segmented colon and the landmark.

The performance of the hybrid segmentation method described herein was compared with an earlier two-phase region growing algorithm described in Summers et al., "Computer-aided detection of polyps on oral contrast-enhanced CT colonography," *AJR* vol. 184, pp. 105-108 (2005). The comparison was done by calculating an overlapping ratio between regions segmented by both algorithms for two classes of voxels labeled as air and fluid. For each class, the overlapping ratio $\Omega$ is defined as:

$$\Omega = \frac{N(S_H \cap S_{RG})}{N(S_H)}$$

where N is the number of voxels in a given region, and $S_H$ and $S_{RG}$ refer to the regions segmented by the current hybrid segmenter and the two-phase region growing procedures, respectively. The two ratios $\Omega_{AIR}$ and $\Omega_{FLUID}$ were calculated for every case selected for visual inspection.

EXAMPLE 35

Exemplary Experimental Results

Seventy scans were in Category I and the remaining 90 scans were in category II. In category I, all 12 visually inspected cases had no leakage after both the first and last stages of the exemplary embodiments shown herein. Two cases had small fluid pockets lost at the first region growing due to the threshold $T_{FLUID}$ being at too high a value.

In category II there were three cases which had false warnings about type B leakage (such as that described at FIGS. 21A-B and the associated text). Visual inspection revealed that the colon was correctly segmented. These three cases had small volume changes reported at both checkpoints (below 1%). The remaining 9 cases from category II had initial leakage visible after the first region growing which was later properly identified and corrected by the continuation of the procedure. In category II there was also one case with a missed fluid pocket as a result of the threshold $T_{FLUID}$ being at too high a value. The volume of the largest of three missed pockets was 6.2 cc (~15,000 voxels), which corresponds to 5.4% of the total fluid-filled region, or 0.8% of the total segmented colon volume.

Mean overlapping ratios in category I were:

$\overline{\Omega_{AIR}}$=0.93±0.01 and $\overline{\Omega_{FLUID}}$=0.84±0.04

In category II, corresponding ratios were:

$\overline{\Omega_{AIR}}$=0.94±0.01 and $\overline{\Omega_{FLUID}}$=0.89±0.03

All 183 polyps used as landmarks were found by the computer program that matched the segmented colonic volumes and polyp coordinates.

Average processing time of a single CT scan (512×512×400) on a 1.8 GHz PC was 18 minutes without I/O operations. Fuzzy connectedness and level set segmentation took half that time.

EXAMPLE 36

Figure 28A:
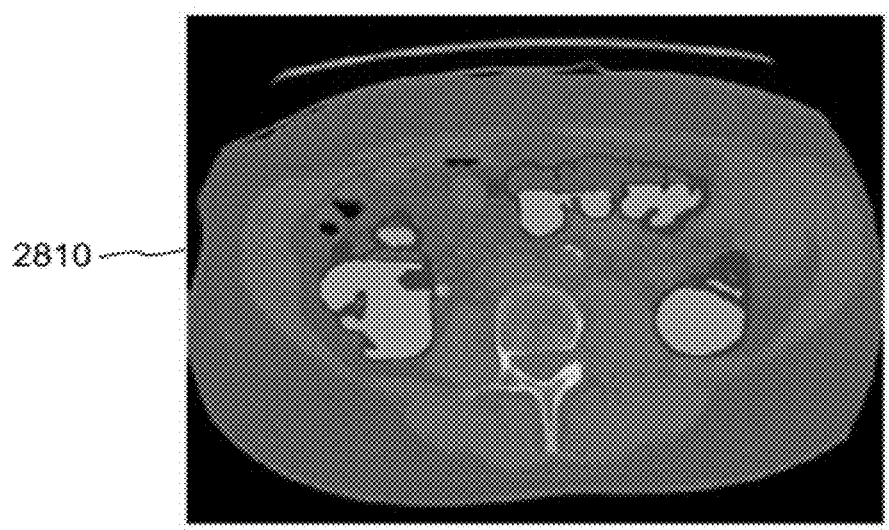
Figure 28B:

Exemplary Screen Shots Showing Difference in Virtual Colons Between a First and Last Segmentation FIGS. 28A-F comprises screen shots showing the difference between a first trial segmentation such as that performed by a trial segmenter 270 in FIG. 2B and a last segmentation, such as that performed by the resegmenter 280 in FIG. 2B. FIG. 28A at 2810 shows a screen shot of a colon segmentation after an initial leaky segmentation. FIG. 28B at 2820 shows a screen shot of the same colon after a final, tailored segmentation. This example belongs to category I of testing cases.

Figure 28C:
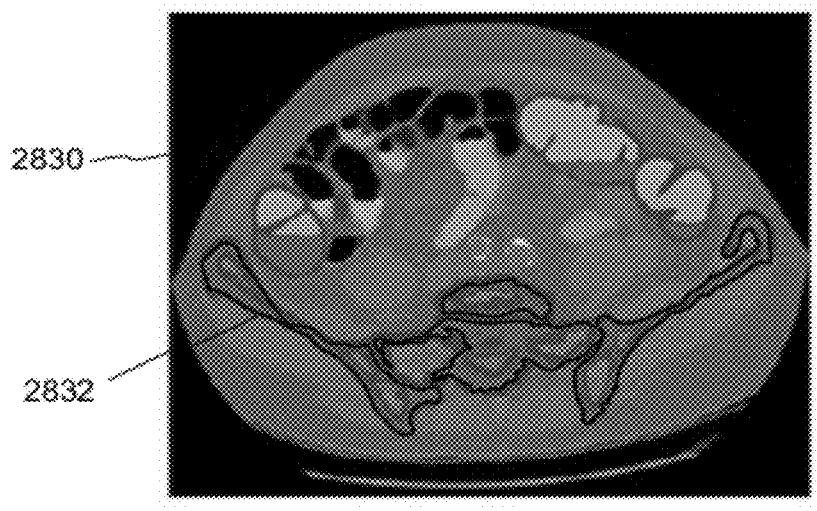
Figure 28D:

FIG. 28C at 2830 shows a screen shot of a colon after an initial segmentation and FIG. 28D at 2840 shows the same colon after a final segmentation using embodiments taught herein. This example belongs to category II of the testing cases. Leakage into the bones visible at 2832 in FIG. 28C has been correctly removed by the last segmentation, as shown at 2842 in FIG. 28D.

Figure 28E:
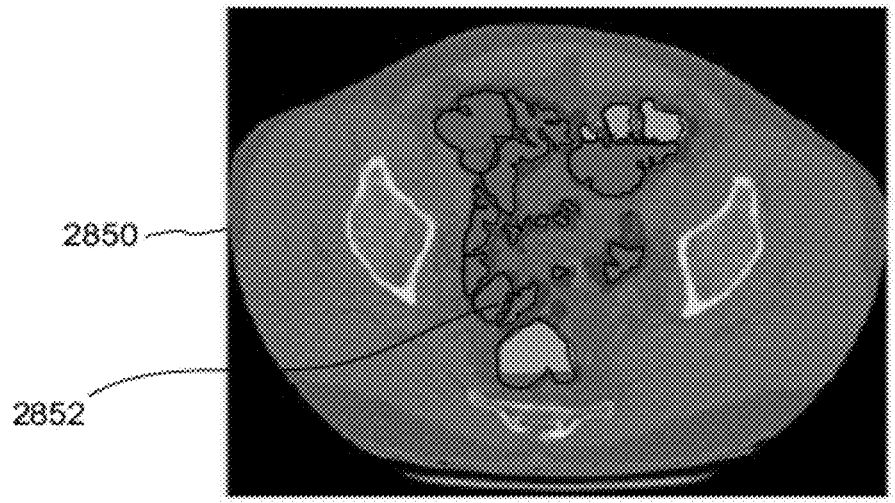
Figure 28F:
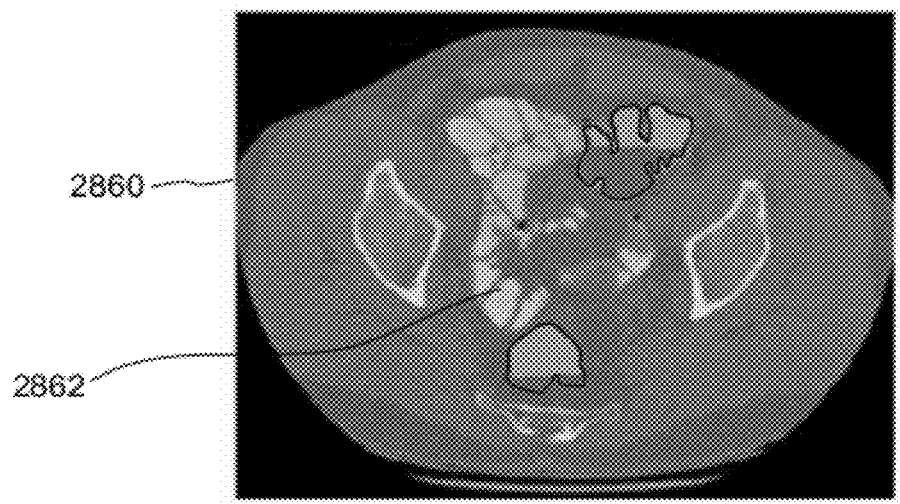

FIG. 28E at 2850 shows a screen shot of a colon after an initial segmentation and FIG. 28F at 2860 shows the same colon after a final segmentation using embodiments taught herein. This example belongs to category II of the testing cases. Leakage into the small bowels visible at 2852 in FIG. 28E has been correctly removed by the last segmentation, as shown at 2862 in FIG. 28F.

EXAMPLE 37

Exemplary Improvements Gained by using Exemplary Embodiments Herein

The embodiments disclosed herein present an algorithm that can be implemented fully-automatically, and which does not require user interaction. It may be used either with manually or automatically placed starting seeds. The presented examples show that the hybrid procedure can successfully identify and correct leaked regions. The generated surfaces tend to be smooth. Moreover, even the polyps located close to the air-fluid boundary, such as shown with reference to example 33, where the partial volume effect impairs many segmentation techniques, can be detected. These results suggest that these exemplary embodiments may also be beneficial for revealing, for example, the submerged colonic wall prior to radiologist interpretation (with or without CAD) of 3D virtual colonoscopy endoluminal images. These exemplary embodiments were designed to check for possible leakage and to correct it. However, once a fluid pocket is lost, for example, in the trial segmentation 222 of FIG. 2A, then the pocket cannot be retrieved later. However, based on visual inspection, and reported with reference to example 35, this problem occurred infrequently (3 out of 24 cases). Even when volume was missed, the amount was small (~6.8% of total lumen (space within a tube) volume). All 183 polyps, located in different parts of the colon in 160 CT scans were found in segmented regions. This supports the conclusion that the problem of missing fluid pockets is marginal.

Contrary to the electronic cleansing technique, the approach discussed herein treats both air- and fluid-filled parts of an exemplary anatomical structure, such as a colon, in the same way. For example, smoothness of the entire surface can be controlled by the level set procedure, which, acting in fuzzy space, is blind to the particular type of media filling the lumen. This adds to the confidence that the classifier in a CAD program receives unbiased data regardless of whether a polyp or other structure of interest is in an air-or fluid-filled portion of a target lumen.

EXAMPLE 38

Exemplary Screen Shots Showing Difference in Virtual Colons Between a First and Last Segmentation FIGS. 29A-B comprises screen shots showing the difference between a first trial segmentation such as that performed by a trial segmenter 270 in FIG. 2B and a last segmentation, such as that performed by the resegmenter 280 in FIG. 2B. FIG. 29A at 2910 shows a screen shot of a colon segmentation after an initial leaky segmentation. The white arrow points to non-colonic leaked features. FIG. 29B at 2950 shows a screen shot of the same colon after a final segmentation. The non-colonic leaked features shown in FIG. 29A have been correctly removed, as shown by the white arrow.

EXAMPLE 39

Exemplary Acquisition of Digital Representations

A variety of techniques can be used to acquire digital representations for use with the technologies described herein. In practice, a digital representation of an anatomical structure can be acquired; plural digital representations of portions of the anatomical structure can then be extracted therefrom.

Acquisition of a representation of an anatomical structure is typically done by performing a scan of the soft tissues of the patient. For example, a CT scan can be performed according to any number of standard protocols. CT scans can be used to generate thin-section CT data (for example, helical scan CT data). The representation can be analyzed immediately after the scan, or the representation can be stored for later retrieval and analysis. Exemplary techniques for acquiring scans are described in Pickhardt et al., "Computed Tomographic Virtual Colonoscopy to Screen for Colorectal Neoplasia in Asymptomatic Adults," *New Engl. J. Med.,* 349:2191 (2003), Vining et al., "Virtual Colonoscopy," *Radiology* 193(P):446 (1994), Vining et al., "Virtual Bronchoscopy," *Radiology* 193 (P):261 (1994), and Vining et al., "Virtual bronchoscopy. Relationships of virtual reality endobronchial simulations to actual bronchoscopic findings" *Chest* 109(2): 549-553 (February 1996), all of which are hereby incorporated herein by reference.

Any number of hardware implementations can be used to acquire a representation of an anatomical structure. For example, the GE HiSpeed Advantage scanner of GE Medical Systems, Milwaukee, Wis. can be used.

Techniques for classifying a portion as an anomaly of interest (e.g., polyp candidate, polyp, or the like) include analyzing neck characteristics, wall thickness, template matching, and the like. Any other approach capable of detecting anomalies in a representation of an anatomical structure can be used as an alternative.

Additional exemplary segmentation techniques are described in U.S. Pat. No. 6,556,696 to Summers et al., filed Feb. 5, 2002, entitled, "METHOD FOR SEGMENTING MEDICAL IMAGES AND DETECTING SURFACE ANOMALIES IN ANATOMICAL STRUCTURES," which is hereby incorporated herein by reference.

EXAMPLE 40

Exemplary Computer System for Conducting Analysis

Figure 30:
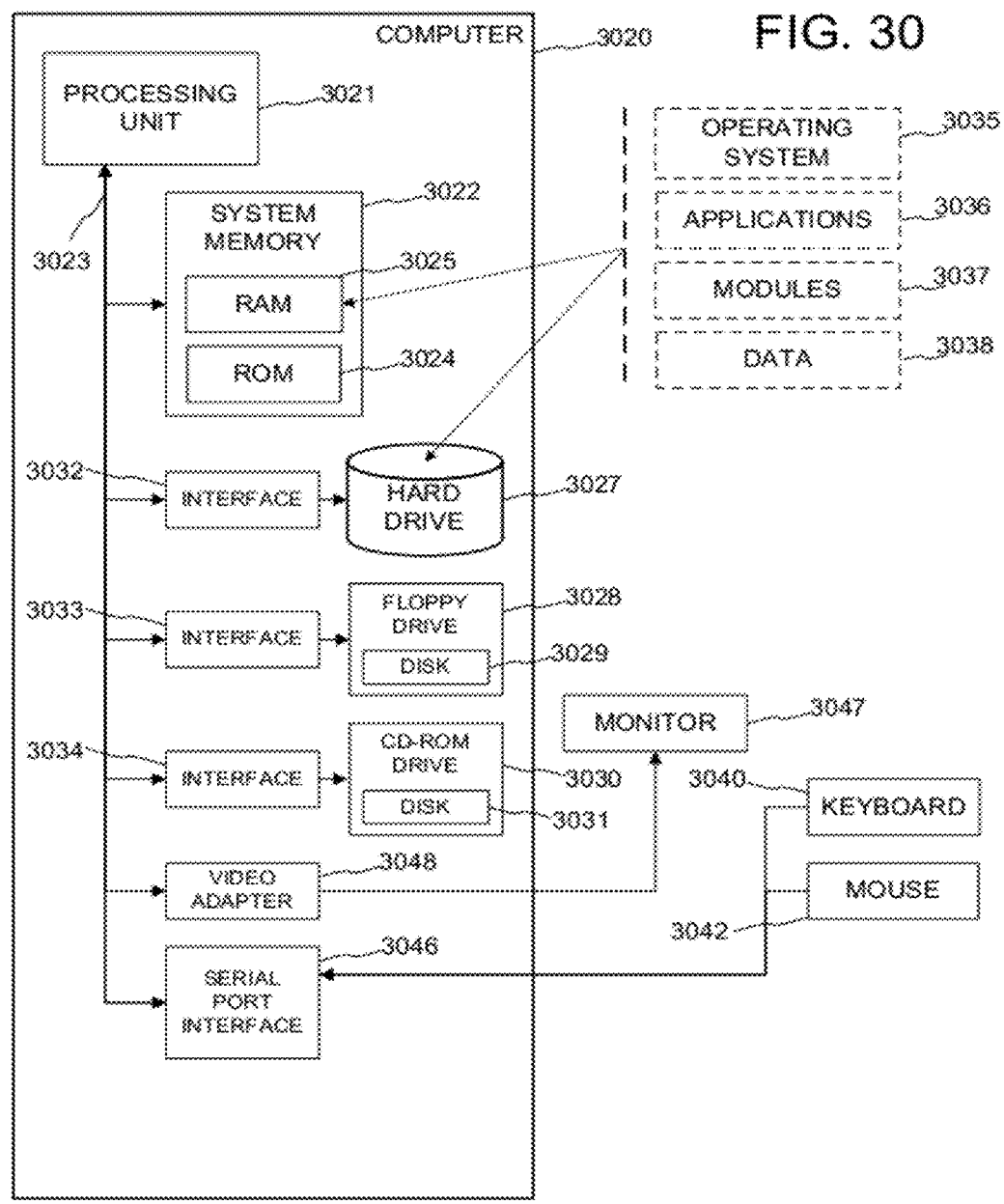
FIG. 30 is a block diagram of an exemplary computer system for implementing the described technologies.

FIG. 30 and the following discussion provide a brief, general description of a suitable computing environment for the software (for example, computer programs) described above. The methods described above can be implemented in computer-executable instructions (for example, organized in program modules). The program modules can include the routines, programs, objects, components, and data structures that perform the tasks and implement the data types for implementing the techniques described above.

While FIG. 30 shows a typical configuration of a desktop computer, the technologies may be implemented in other computer system configurations, including multiprocessor systems, microprocessor-based or programmable consumer electronics, minicomputers, mainframe computers, and the like. The technologies may also be used in distributed computing environments where tasks are performed in parallel by processing devices to enhance performance. For example, tasks related to measuring characteristics of anomalies of interest can be performed simultaneously on multiple computers, multiple processors in a single computer, or both. In a distributed computing environment, program modules may be located in both local and remote memory storage devices.

The computer system shown in FIG. 30 is suitable for implementing the technologies described herein and includes a computer 3020, with a processing unit 3021, a system memory 3022, and a system bus 3023 that interconnects various system components, including the system memory to the processing unit 3021. The system bus may comprise any of several types of bus structures including a memory bus or memory controller, a peripheral bus, and a local bus using a bus architecture. The system memory includes read only memory (ROM) 3024 and random access memory (RAM) 3025. A nonvolatile system (for example, BIOS) can be stored in ROM 3024 and contains the basic routines for transferring information between elements within the personal computer 3020, such as during start-up. The personal computer 3020 can further include a hard disk drive 3027, a magnetic disk drive 3028, for example, to read from or write to a removable disk 3029, and an optical disk drive 3030, for example, for reading a CD-ROM disk 3031 or to read from or write to other optical media. The hard disk drive 3027, magnetic disk drive 3028, and optical disk drive 3030 are connected to the system bus 3023 by a hard disk drive interface 3032, a magnetic disk drive interface 3033, and an optical drive interface 3034, respectively. The drives and their associated computer-readable media provide nonvolatile storage of data, data structures, computer-executable instructions (including program code such as dynamic link libraries and executable files), and the like for the personal computer 3020. Although the description of computer-readable media above refers to a hard disk, a removable magnetic disk, and a CD, it can also include other types of media that are readable by a computer, such as magnetic cassettes, flash memory cards, DVDs, and the like.

A number of program modules may be stored in the drives and RAM 3025, including an operating system 3035, one or more application programs 3036, other program modules 3037, and program data 3038. A user may enter commands and information into the personal computer 3020 through a keyboard 3040 and pointing device, such as a mouse 3042. Other input devices (not shown) may include a microphone, joystick, game pad, satellite dish, scanner, or the like. These and other input devices are often connected to the processing unit 3021 through a serial port interface 3046 that is coupled to the system bus, but may be connected by other interfaces, such as a parallel port, game port, or a universal serial bus (USB). A monitor 3047 or other type of display device is also connected to the system bus 3023 via an interface, such as a display controller or video adapter 3048. In addition to the monitor, personal computers typically include other peripheral output devices (not shown), such as speakers and printers.

The above computer system is provided merely as an example. The technologies can be implemented in a wide variety of other configurations. Further, a wide variety of approaches for collecting and analyzing data related to processing anomalies of interest is possible. For example, the data can be collected, characteristics determined and measured, anomalies classified and reclassified, and the results presented on different computer systems as appropriate. In addition, various software aspects can be implemented in hardware, and vice versa.

EXAMPLE 41

Exemplary Methods

Any of the methods described herein can be performed by software executed by software in an automated system (for example, a computer system). Fully-automatic (for example, without human intervention) or semi-automatic operation (for example, computer processing assisted by human intervention) can be supported. User intervention may be desired in some cases, such as to adjust parameters or consider results.

Such software can be stored on one or more computer-readable media (e.g., storage media) comprising computer-executable instructions for performing the described actions.

REFERENCES

The following references are hereby incorporated by reference herein:

[1] S. L B. Libutti S. K., A. K. Rostgi. and I. E. Tepper, "Cancer of the Colon," in *Cancer, Principles, and Practice of Oncology*, S. H. V. T. De-Vita and S. A. Rosenberg, Eds. Philadelphia Pa.: Lippincott, Williams and Wilkins, 2005, ch. 29.8, pp. 1061-1109.

[2] J. Nappi and H. Yoshida, "Feature-guided Analysis for Reduction of False Positives in CAD of Polyps for Computed Tomographic Colonography," *Med. Phys.* vol. 30, pp. 1592-1601, 2003.

[3] B. C. Pineau et al, "Virtual Colonoscopy Using Oral Contrast Compared with Colonoscopy for the Detection of Patients with Colorectal Polyps," *Gastroenterology*, vol. 125, pp. 304-310, 2003.

[4] P. J. Pickhardt and J. R. Choi, "Electronic cleansing and stool tagging in CT colonography: Advantages and pitfalls with primary three-dimensional evaluation," *AJR*, vol. 181, pp. 799-805, 2003.

[5] P. J. Pickhardt, J. R. Choi, I. Hwang, J. A. Butler, M. L. Puckett, H. A. Hildebrandt, R. K. Wong, P. A. Nugent. P. A. Mysliwiec, and W. R. Schindler, "Computed Tomographic Virtual Colonoscopy to Screen for Colorectal Neoplasia in Asymptomatic Adults," *New Engl. J Med.*, vol. 349, p. 2191, 2003.

[6] R. Iannaccone, A. Laghi, C. Catalano, F. Mangiapane. A. Lamazza, A. Achillaci, G. Sinibaldi, T. Murakami, P. Sammartino, M. Hori, F. Piacentini, L. Nofroni, V. Stipa, and R. Passariello, "Computed Tomographic Colonography Without Cathartic Preparation for the Detection of Colorectal Polyps" *Gastroenterology*, vol. 127, pp. 1300-1311, 2004.

[7] Z. Liang, D. Chen, R. Chiou, B. Li, A. Kaufman, and M. Wax, "On Segmentation of Colon Lumen for Virtual Colonoscopy," *Proc. SPIE* (Medical Imaging), 1999.

[8] P. Sahoo, S. Soltani, and A. Wong, "A Survey of Thresholding Techniques," *Comput. Vis., Graphics Image Process.*, vol. 41, pp. 233-260, 1988.

[9] J. K. Udupa and S. Samarasekera, "Fuzzy Connectedness and Object Definition: Theory, Algorithms, and Applications in Image Segmentation," *Graphical Models Image Process.*, vol. 58, pp. 246-261. 1996.

[10] J. Sethian, *Level Set Methods and Fast Marching Methods Evolving Interfaces in Computational Geometry, Fluid Mechanics, Computer Vision, and Materials Science.* Cambridge Univ. Press, 1999.

[11] S. Lakare, M. Wan, and A. Kaufman, "3D Digital Cleansing Using Segmentation Rays, in *Proc. IEEE Visualization*, 2000, pp. 37-44, 538.

[12] M. E. Zalis, J. Perumpillichira, C. D. Frate, and P. F. Hahn, "CT Colonography: Digital Subtraction Bowel Cleansing with Mucosal Rreconstruction—Initial Observations, *Radiology*, vol. 226, pp. 911-917, 2003.

[13] I. Serlie, R. Truyen, G. d. Vires, F. Post, and F. Vos, "A probabilistic method for virtual colonoscopy cleansing," in *Proc. SPIE*, vol. 5031, 2003, pp. 405-412.

[14] I. Serlie, R. Truyen, J. Florie, F. Post, L. v. Vliet, and F. Vos, "Computed Cleansing for Virtual Colonoscopy Using a Three-Material Transition Model," in *Lecture Notes in Computer Science*. Berlin, Germany: Springer-Verlag, 2003, vol. 2879, pp. 175-183.

[15] M. E. Zalis and P. F. Hahn, "Digital Subtraction Bowel Cleansing in CT Colonography *AJR*, vol. 176, pp. 646-648, 2001.

[16] M. E. Zalis, J. Perumpillichira, and P. F. Hahn, "Digital Subtraction Bowel Cleansing for CT Colonography Using Morphological and Linear Filtration Methods," *IEEE Trans. Med. Imag.*, vol. 23, no. 11, pp. 1335-1343, November 2004.

[17] G. Iordanescu, P. J. Pickhardt, J. R. Choi, and R. M. Summers, "Automated seed placement for colon segmentation in computed tomography colonography." *Academic Radiol.*, vol. 12. pp. 182-190, 2005.

[18] C. L. Wyatt, Y. Ge, and D. J. Vining, "Automatic segmentation of the colon," in *Proc. SPIE*, vol. 3660, 1999, pp. 139-148.

[19] M. Sato, S. Lakare, M. Wan, A. Kaufman, Z. Liang, and M. Wax, "An Automatic Colon Segmentation for 3D Virtual Colonoscopy," *IEEE Trans. Inf Syst*, vol. E84, pp. 201-208, 2001.

[20] R. M. Summers, M. Miller, M. Franaszek, P. J. Pickhardt, P. Nugent, R. Choi, and W. Schindler, "Assessment of bowel opacification on oral contrast-enhanced CT colonography—multi-institutional trial in *Abdominal Radiology*

*Course Syllabus,*" Society of Gastrointestinal Radiologists and Society of Uroradiology, pp. 34-35 (2004).

[21] T. S. Yoo, Ed., *Insight Into Images Principles and Practice for Segmentation, Registration, and Image Analysis*. Wellesley. Mass.: A. K. Peters, 2004.

[22] L. Ibanez, W. Schroeder, L. Ng, and J. Cates, *The ITK Software Guide*. Clifton Park, NY: Kitware, Inc., 2003.

[23] R. M. Summers, M. Franaszek, M. T. Miller, P. J. Pickhardt, J. R. Choi, and W. R. Schindler, "Computer-Aided Detection of Polyps on Oral Contrast-Enhanced CT Colonography," *AJR*, vol. 184, pp. 105-108, 2005.

[24] I. Bitter, A. E. Kaufman, and M. Sato, "Penalized-Distance Volumetric Skeleton Algorithm," *IEEE Trans. Vis, Comput. Graphics*, vol. 7, no. 3, pp. 195-206, July-September 2001.

[25] G. Iordanescu and R. M. Summers, "Automated Centerline for Computed Tomography Colonography," *Academic Rad.*, vol. 10, pp. 1291-1301, 2003.

[26] W. Lorensen and H. Cline, "Marching cubes: A high resolution 3D surface construction algorithm," *Comput. Graphics*, vol. 21, pp. 321-331, 1987.

Alternatives

Having illustrated and described the principles of the invention in exemplary embodiments, it should be apparent to those skilled in the art that the described examples are illustrative embodiments and can be modified in arrangement and detail without departing from such principles. Techniques from any of the examples can be incorporated into one or more of any of the other examples.

In view of the many possible embodiments to which the principles of the invention may be applied, it should be understood that the illustrative embodiments are intended to teach these principles and are not intended to be a limitation on the scope of the invention. We therefore claim as our invention all that comes within the scope and spirit of the following claims and their equivalents.

We claim:

1. One or more non-transitory computer-readable media comprising computer-executable instructions for performing a method comprising:

receiving a digital representation of an anatomical structure, wherein the digital representation comprises representations of a plurality of fluid pockets of the anatomical structure, wherein the plurality of fluid pockets have different amounts of oral contrast agent therein;

performing a trial segmentation of the digital representation, wherein performing the trial segmentation comprises segmenting the digital representation into at least trial air pockets and a plurality of trial fluid pockets, producing a trial representation, wherein segmenting comprises locating an air-fluid boundary between a trial air pocket and an adjacent trial fluid pocket;

for at least a subset of the trial fluid pockets, determining at least one per-fluid-pocket tailored threshold for each trial fluid pocket in the subset, wherein determining the at least one per-fluid-pocket tailored threshold comprises determining separate thresholds for respective trial fluid pockets in the subset and at least one of the trial fluid pockets comprises a plurality of voxels or pixels, whereby a first trial fluid pocket out of the subset is associated with a first per-fluid-pocket tailored threshold and a second trial fluid pocket out of the subset is associated with a second per-fluid-pocket tailored threshold and the first per-fluid-pocket tailored threshold is different from the second per-fluid-pocket tailored threshold, and the per-fluid-pocket tailored thresholds take into account an amount of the oral contrast agent within respective of the trial fluid pockets in the subset; and resegmenting at least a portion of the trial representation, wherein the re-segmenting segments at least a portion of the anatomical structure comprising the first trial fluid pocket via the first per-fluid-pocket tailored threshold and segments at least a portion of the anatomical structure comprising the second trial fluid pocket via the second per-fluid-pocket tailored threshold;

wherein determining a per-fluid-pocket tailored threshold for a trial fluid pocket comprises choosing a plurality of voxels or pixels near the air-fluid boundary of the trial fluid pocket and using attenuation values of the chosen plurality of voxels or pixels near the air-fluid boundary of the trial fluid pocket to determine the per-fluid-pocket tailored threshold for the trial fluid pocket, wherein the trial fluid pocket comprises a plurality of possible voxels or pixels, and wherein determining the per-fluid-pocket tailored threshold for the trial fluid pocket does not use all the possible voxels or pixels in the trial fluid pocket.

2. The computer-readable media of claim 1, wherein the method further comprises:

using the at least one per-fluid-pocket tailored threshold, resegmenting at least a portion of the trial representation, the resegmenting determining an enclosing boundary of at least a portion of the anatomical structure.

3. The one or more computer-readable media of claim 1 wherein the determining the at least one per-fluid-pocket tailored threshold further comprises taking mean CT attenuation of a plurality of components.

4. The computer-readable media of claim 1 wherein segmenting the digital representation further comprises using a trial air threshold for the trial air pockets and a trial fluid threshold for the trial fluid pockets during segmentation.

5. The one or more computer-readable media of claim 4 wherein the trial fluid threshold for the trial fluid pocket comprises a threshold set at a value sufficient to segment at least 95% of the anatomical feature.

6. The one or more computer-readable media of claim 1 wherein the method further comprises determining at least one selected from the group consisting of: a mean of CT attenuation for the trial fluid pocket, a standard deviation of CT attenuation for the trial fluid pocket, volume of the trial fluid pocket, and a bounding box of the trial fluid pocket.

7. The one or more computer-readable media of claim 1 wherein determining the at least one per-fluid-pocket tailored threshold comprises:

determining a pixel or voxel depth based on size of the air-fluid boundary; and using the pixel or voxel depth and the air-fluid boundary to choose a plurality of threshold pixels or voxels.

8. The one or more computer readable media of claim 2 wherein the method further comprises:

determining a location of at least one trial fluid pocket; and storing the location of the trial fluid pocket to determine if the trial fluid pocket comprises separate fluid pockets.

9. The one or more computer-readable media of claim 8 wherein resegmenting at least a portion of the digital representation further comprises resegmenting at least one trial fluid pocket using the per-fluid-pocket tailored threshold to produce at least one tailored fluid pocket.

10. The one or more computer-readable media of claim 9 wherein the method further comprises:

organizing the at least one tailored fluid pocket and trial air pockets into a hierarchical pocket tree wherein tailored fluid pockets touching a same trial air pocket are at a same level in a hierarchy of the hierarchical pocket tree.

11. The one or more computer-readable media of claim 10 wherein air pockets touching a same fluid pocket are at a same level in a hierarchy of the hierarchical pocket tree.

12. One or more non-transitory computer-readable media comprising computer-executable instructions for performing a method comprising:

receiving a digital representation of an anatomical structure, wherein the digital representation comprises representations of a plurality of fluid pockets of the anatomical structure, wherein the plurality of fluid pockets have different amounts of oral contrast agent therein;

performing a trial segmentation of the digital representation, wherein performing the trial segmentation comprises segmenting the digital representation into at least trial air pockets and a plurality of trial fluid pockets, producing a trial representation, wherein segmenting comprises locating an air-fluid boundary between a trial air pocket and an adjacent trial fluid pocket;

for at least a subset of the trial fluid pockets, determining at least one per-fluid-pocket tailored threshold for each trial fluid pocket in the subset, wherein determining the at least one per-fluid-pocket tailored threshold comprises determining separate thresholds for respective trial fluid pockets in the subset and at least one of the trial fluid pockets comprises a plurality of voxels or pixels, whereby a first trial fluid pocket out of the subset is associated with a first per-fluid-pocket tailored threshold and a second trial fluid pocket out of the subset is associated with a second per-fluid-pocket tailored threshold and the first per-fluid-pocket tailored threshold is different from the second per-fluid-pocket tailored threshold, and the per-fluid-pocket tailored thresholds take into account an amount of the oral contrast agent within respective of the trial fluid pockets in the subset;

resegmenting at least a portion of the trial representation, wherein the re-segmenting segments at least a portion of the anatomical structure comprising the first trial fluid pocket via the first per-fluid-pocket tailored threshold and segments at least a portion of the anatomical structure comprising the second trial fluid pocket via the second per-fluid-pocket tailored threshold;

wherein determining a per-fluid-pocket tailored threshold for a trial fluid pocket comprises choosing a plurality of voxels or pixels near the air-fluid boundary of the trial fluid pocket and using attenuation values of the chosen plurality of voxels or pixels near the air-fluid boundary of the trial fluid pocket to determine the per-fluid-pocket tailored threshold for the trial fluid pocket, wherein the trial fluid pocket comprises a plurality of possible voxels or pixels, and wherein determining the per-fluid-pocket tailored threshold for the trial fluid pocket does not use all the possible voxels or pixels in the trial fluid pocket;

using the at least one per-fluid-pocket tailored threshold, resegmenting at least a portion of the trial representation, the resegmenting determining an enclosing boundary of at least a portion of the anatomical structure;

determining a location of at least one trial fluid pocket; and storing the location of the trial fluid pocket to determine if the trial fluid pocket comprises separate fluid pockets;

wherein resegmenting at least a portion of the digital representation further comprises resegmenting at least one trial fluid pocket using the per-fluid-pocket tailored threshold to produce at least one tailored fluid pocket;

organizing the at least one tailored fluid pocket and trial air pockets into a hierarchical pocket tree wherein tailored fluid pockets touching a same trial air pocket are at a same level in a hierarchy of the hierarchical pocket tree;

analyzing tailored fluid pockets to determine whether a given tailored fluid pocket belongs to a leaked regions and responsive to determining that the given tailored fluid pocket belongs to a leaked region, deleting pockets below the given tailored fluid pocket in the hierarchical pocket tree.

13. The one or more computer-readable media of claim 12 wherein analyzing tailored fluid pockets to determine whether a given fluid pocket belongs to a leaked region comprises determining if the given tailored fluid pocket is a child of two or more pockets in the hierarchical pocket tree.

14. The one or more computer-readable media of claim 2 wherein the method further comprises:

using at least a portion of results of the resegmenting to perform a third segmentation on at least portions of the digital representation to determine an enclosing boundary of the anatomical structure.

15. The one or more computer-readable media of claim 1 wherein the method further comprises:

performing equalization on at least a portion of the digital representation using the at least one per-fluid-pocket tailored threshold for at least a portion of the trial fluid pockets to determine an equalized image of the at least a portion of the anatomical structure.

16. The one or more computer-readable media of claim 15 wherein performing equalization on at least a portion of the digital representation comprises performing fuzzy connectedness segmentation on at least a portion of the digital representation.

17. One or more non-transitory computer-readable media comprising computer-executable instructions for performing a method comprising:

receiving a digital representation of an anatomical structure;

performing a trial segmentation of the digital representation, wherein performing the trial segmentation comprises segmenting the digital representation into at least trial air pockets and a plurality of trial fluid pockets, producing a trial representation, wherein segmenting comprises locating an air-fluid boundary between a trial air pocket and an adjacent trial fluid pocket;

for at least a subset of the trial fluid pockets, determining at least one per-fluid-pocket tailored threshold for each trial fluid pocket in the subset, wherein determining the at least one per-fluid-pocket tailored threshold comprises determining separate thresholds for respective trial fluid pockets in the subset and at least one of the trial fluid pockets comprises a plurality of voxels or pixels, whereby a first trial fluid pocket out of the subset is associated with a first per-fluid-pocket tailored threshold and a second trial fluid pocket out of the subset is associated with a second per-fluid-pocket tailored threshold and the first per-fluid-pocket tailored threshold is different from the second per-fluid-pocket tailored threshold;

resegmenting at least a portion of the trial representation, wherein the re-segmenting segments at least a portion of the anatomical structure comprising the first trial fluid pocket via the first per-fluid-pocket tailored threshold and segments at least a portion of the anatomical structure comprising the second trial fluid pocket via the second per-fluid-pocket tailored threshold;

wherein determining a per-fluid-pocket tailored threshold for a trial fluid pocket comprises choosing a plurality of voxels or pixels near the air-fluid boundary of the trial fluid pocket and using attenuation values of the chosen plurality of voxels or pixels near the air-fluid boundary of the trial fluid pocket to determine the per-fluid-pocket tailored threshold, wherein the trial fluid pocket comprises a plurality of possible voxels or pixels, and wherein determining the per-fluid-pocket tailored threshold for the trial fluid pocket does not use all the possible voxels or pixels in the trial fluid pocket;

performing equalization on at least a portion of the digital representation using the at least one per-fluid-pocket tailored threshold for at least a portion of the trial fluid pockets to determine an equalized image of the at least a portion of the anatomical structure;

wherein performing equalization on at least a portion of the digital representation comprises performing fuzzy connectedness segmentation on at least a portion of the digital representation;

determining a gap between an air region and a fluid region in the fuzzy connectedness image; and filling the gap using a two-dimensional region-growing procedure.

18. The one or more computer-readable media of claim 17 wherein the method further comprises:
using level set segmentation to determine an enclosing boundary of the at least a portion of the anatomical structure.

19. A system for determining an enclosing three-dimensional colon boundary comprising:
means for receiving a digital representation of a colon, wherein the digital representation comprises representations of a plurality of fluid pockets of the colon, wherein the plurality of fluid pockets have different amounts of oral contrast agent therein;

means for performing a trial segmentation of the digital representation, wherein performing the trial segmentation comprises segmenting the digital representation into at least air pockets and fluid pockets using an initial threshold for the air pockets and an initial threshold for the fluid pockets;

for at least a portion of the fluid pockets, means for extracting the fluid pockets, wherein extracting comprises determining at least one tailored threshold per fluid pocket, wherein determining at least one tailored threshold per fluid pocket comprises choosing voxels or pixels near the air-fluid boundary of the fluid pocket and using attenuation values of the chosen voxels or pixels near the air-fluid boundary of the fluid pocket, and wherein determining the at least one tailored threshold per fluid pocket does not use all possible voxels or pixels in the trial fluid pocket, whereby a first trial fluid pocket is associated with a first per-fluid-pocket tailored threshold and a second trial fluid pocket is associated with a second per-fluid-pocket tailored threshold and the first per-fluid-pocket tailored threshold is different from the second per-fluid-pocket tailored threshold, and the per-fluid-pocket tailored thresholds take into account an amount of the oral contrast agent within respective of the trial fluid pockets in the portion; and means for using the at least one tailored threshold for at least a portion of the fluid pockets to resegment at least a portion of the digital representation to determine an enclosing boundary of at least a portion of the colon, wherein the resegmenting segments at least a portion of the anatomical structure comprising the first trial fluid pocket via the first per-fluid-pocket tailored threshold and segments at least a portion of the anatomical structure comprising the second trial fluid pocket via the second per-fluid-pocket tailored threshold.

20. The one or more computer-readable media of claim 1 wherein choosing the voxels or pixels near the air-fluid boundary of the trial fluid pocket comprises:
choosing voxels or pixels immediately under the air-fluid boundary.

21. The one or more computer-readable media of claim 1 wherein choosing the voxels or pixels near the air-fluid boundary comprises:
choosing voxels or pixels forming a straight line.

22. The one or more computer-readable media of claim 1 wherein choosing the voxels or pixels near the air-fluid boundary comprises:
following the air-fluid boundary.

23. The one or more computer-readable media of claim 1 wherein:
the voxels or pixels consist of voxels only; and
the voxels near the air-fluid boundary consist of voxels following the air-fluid boundary.

24. The one or more computer-readable media of claim 1 wherein determining a per-fluid-pocket tailored threshold for a trial fluid pocket comprises:
calculating a mean of attenuation values of the voxels or pixels near the air-fluid boundary of the trial fluid pocket.

25. A method comprising:
receiving a digital representation of an anatomical structure, wherein the digital representation comprises representations of a plurality of fluid pockets of the anatomical structure, wherein the plurality of fluid pockets have different amounts of oral contrast agent therein;

performing a trial segmentation of the digital representation, wherein performing the trial segmentation comprises segmenting the digital representation into at least trial air pockets and a plurality of trial fluid pockets, producing a trial representation, wherein segmenting comprises locating an air-fluid boundary between a trial air pocket and an adjacent trial fluid pocket;

for at least a subset of the trial fluid pockets, determining at least one per-fluid-pocket tailored threshold for each trial fluid pocket in the subset, wherein determining the at least one per-fluid-pocket tailored threshold comprises determining separate thresholds for respective trial fluid pockets in the subset and at least one of the trial fluid pockets comprises a plurality of voxels or pixels, whereby a first trial fluid pocket out of the subset is associated with a first per-fluid-pocket tailored threshold and a second trial fluid pocket out of the subset is associated with a second per-fluid-pocket tailored threshold and the first per-fluid-pocket tailored threshold is different from the second per-fluid-pocket tailored threshold, and the per-fluid-pocket tailored thresholds take into account an amount of the oral contrast agent within respective of the trial fluid pockets in the subset; and resegmenting at least a portion of the trial representation, wherein the re-segmenting segments at least a portion of the anatomical structure comprising the first trial fluid pocket via the first per-fluid-pocket tailored threshold and segments at least a portion of the anatomical structure comprising the second trial fluid pocket via the second per-fluid-pocket tailored threshold;

wherein determining a per-fluid-pocket tailored threshold for a trial fluid pocket comprises choosing a plurality of voxels or pixels near the air-fluid boundary of the trial fluid pocket and using attenuation values of the chosen plurality of voxels or pixels near the air-fluid boundary of the trial fluid pocket to determine the per-fluid-pocket tailored threshold for the trial fluid pocket, wherein the trial fluid pocket comprises a plurality of possible voxels or pixels, and wherein determining the per-fluid-pocket tailored threshold for the trial fluid pocket does not use all the possible voxels or pixels in the trial fluid pocket.

* * * * *